(12) United States Patent
Baratta

(10) Patent No.: US 7,018,279 B2
(45) Date of Patent: Mar. 28, 2006

(54) MOVABLE MACHINERY, INCLUDING PAVEMENT WORKING APPARATUS AND METHODS OF MAKING

(75) Inventor: Anthony Baratta, Oak Park, CA (US)

(73) Assignee: Electrolux Professional Outdoor Products, Inc., Cleveland, OH (US)

(*) Notice: Subject to any disclaimer, the term of this patent is extended or adjusted under 35 U.S.C. 154(b) by 0 days.

(21) Appl. No.: 10/392,369

(22) Filed: Mar. 18, 2003

(65) Prior Publication Data

US 2004/0007225 A1 Jan. 15, 2004

Related U.S. Application Data

(63) Continuation-in-part of application No. 10/101,473, filed on Mar. 18, 2002.

(51) Int. Cl.
*B24B 23/00* (2006.01)
(52) U.S. Cl. .................. 451/344; 451/451; 125/21
(58) Field of Classification Search .............. 451/344, 451/451; 125/21, 16.01, 16.02; 74/606 R, 74/607–609, 612–617
See application file for complete search history.

(56) References Cited

U.S. PATENT DOCUMENTS

| | | | |
|---|---|---|---|
| 3,124,998 A | 3/1964 | Raehrs | |
| 3,323,507 A | 6/1967 | Schuman | |
| 3,903,440 A * | 9/1975 | Paule et al. | 310/50 |
| 3,988,285 A | 10/1976 | De Vrieze | 260/33.6 PQ |
| 4,306,479 A | 12/1981 | Eberhardt | |
| 4,557,245 A | 12/1985 | Bieri | |
| 4,631,012 A | 12/1986 | Eckman | |
| 4,702,124 A | 10/1987 | Schleicher | |
| 4,979,412 A | 12/1990 | Anders | 83/397 |
| 4,986,252 A | 1/1991 | Holmes et al. | |
| 4,989,686 A | 2/1991 | Miller et al. | |
| 4,998,775 A | 3/1991 | Hollifield | |
| 5,055,087 A | 10/1991 | Koch | 474/73 |
| 5,078,119 A | 1/1992 | Holmes et al. | |
| 5,245,770 A | 9/1993 | Ko et al. | |
| 5,299,885 A | 4/1994 | Prassas et al. | 405/45 |
| 5,370,341 A | 12/1994 | Leon | |
| 5,588,418 A | 12/1996 | Holmes et al. | |
| 5,679,432 A | 10/1997 | Holmquest et al. | |
| 6,314,826 B1 | 11/2001 | Cunningham et al. | |

(Continued)

FOREIGN PATENT DOCUMENTS

DE 199 42 993 3/2001

(Continued)

OTHER PUBLICATIONS

Dimas U.S.A., Instruction Manual, 360-1500H, Wall Saw, Operation Maintenance Parts, Issue No. 4144, Oct. 1, 1993, Torrance, CA.

(Continued)

*Primary Examiner*—Dung Van Nguyen
(74) *Attorney, Agent, or Firm*—Henricks, Slavin & Holmes LLP

(57) ABSTRACT

A movable machine, for example a saw, has a light construction using composite materials such as fiber reinforced resins and a closed cell foam. The saw may have a housing formed from multiple skins of the composite materials in which is located the closed cell foam. Metallic inserts may be used to bond to either or both of the foam and the composite skin to accept working components. A saw is also described which uses gears sharing the same support element.

48 Claims, 45 Drawing Sheets

U.S. PATENT DOCUMENTS 6,401,673 B1 * 6/2002 Linsbauer et al. ....... 123/73 PP

FOREIGN PATENT DOCUMENTS

| DE | 100 06 001 | 8/2001 |
|----|------------|--------|
| EP | 0 633 106 | 1/1995 |
| EP | 0 822 062 | 2/1998 |
| EP | 0 950 482 | 10/1999 |
| EP | 1 072 396 | 1/2001 |
| FR | 2 624 049 | 6/1989 |
| GB | 2 050 213 | 1/1981 |
| GB | 2 300 589 | 11/1996 |
| JP | 02076684 | 3/1990 |
| JP | 06039747 | 2/1994 |

OTHER PUBLICATIONS

Dimas U.S.A., Instruction Manual, 360-2100S, Wall Saw, Operation Maintenance Parts, Issue No. 101, May 10, Torrance, CA.

Compositetek; Composites Design Guide; Sep. 1, 1999; Revision 1; Boulder, Colorado 80301.

"Neues Getriebe mit Timken-Wälzlager ausgerüstet", ATZ Automobiltechnische Zeitschrift, Franckkh' sche Verlagshandlung., vol. 94, No. 12, Dec. 1, 1992, p. 629.

* cited by examiner

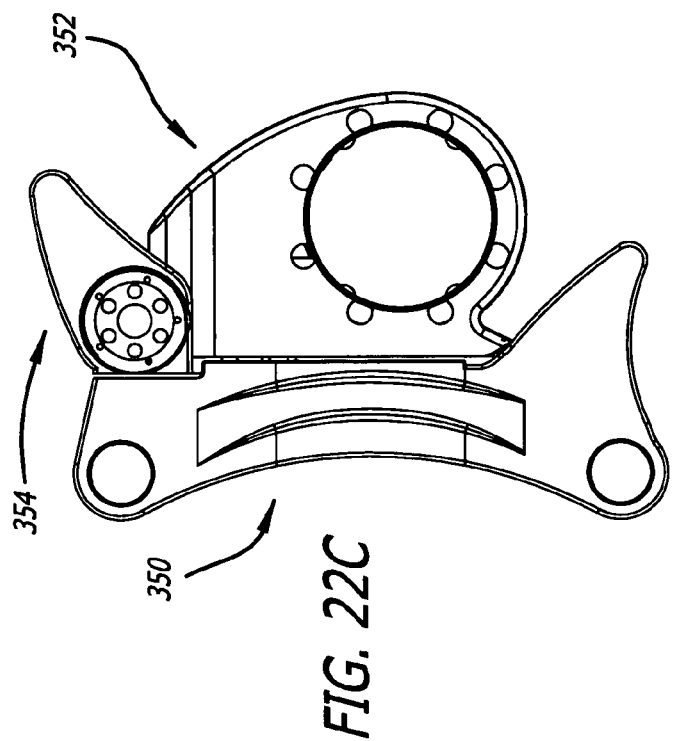
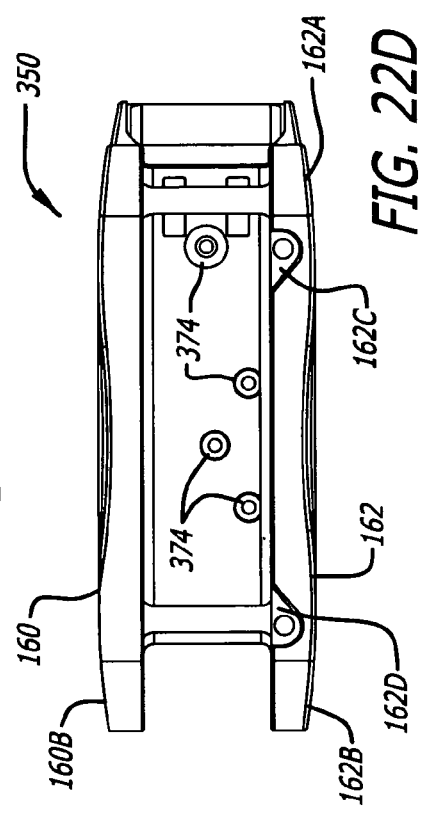
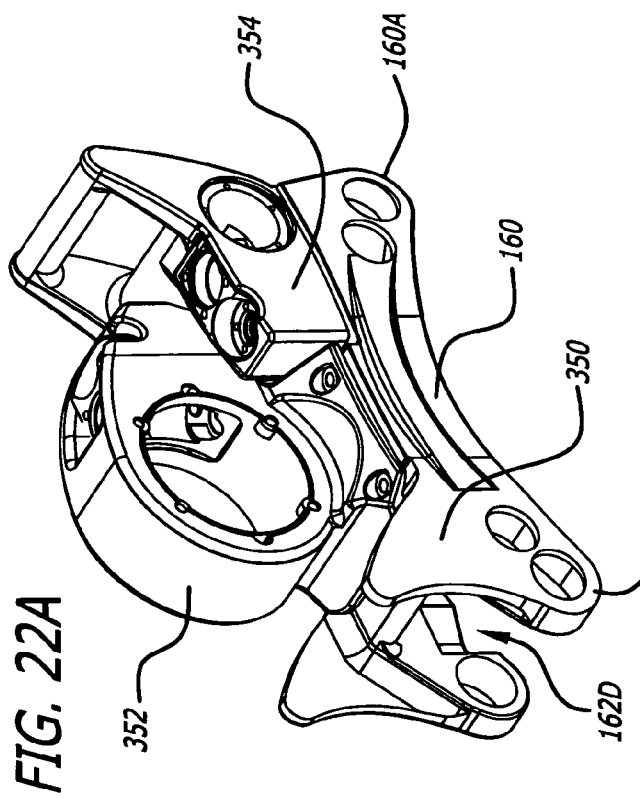
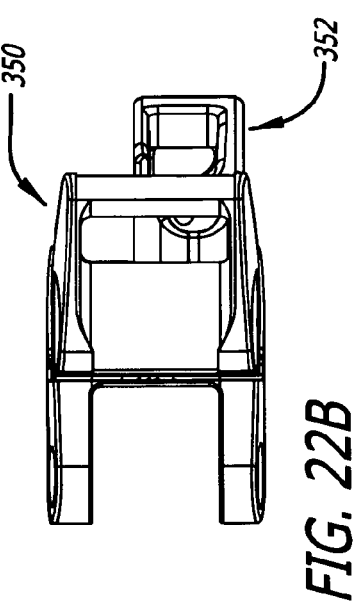
FIG. 22A
FIG. 22B
FIG. 22C
FIG. 22D

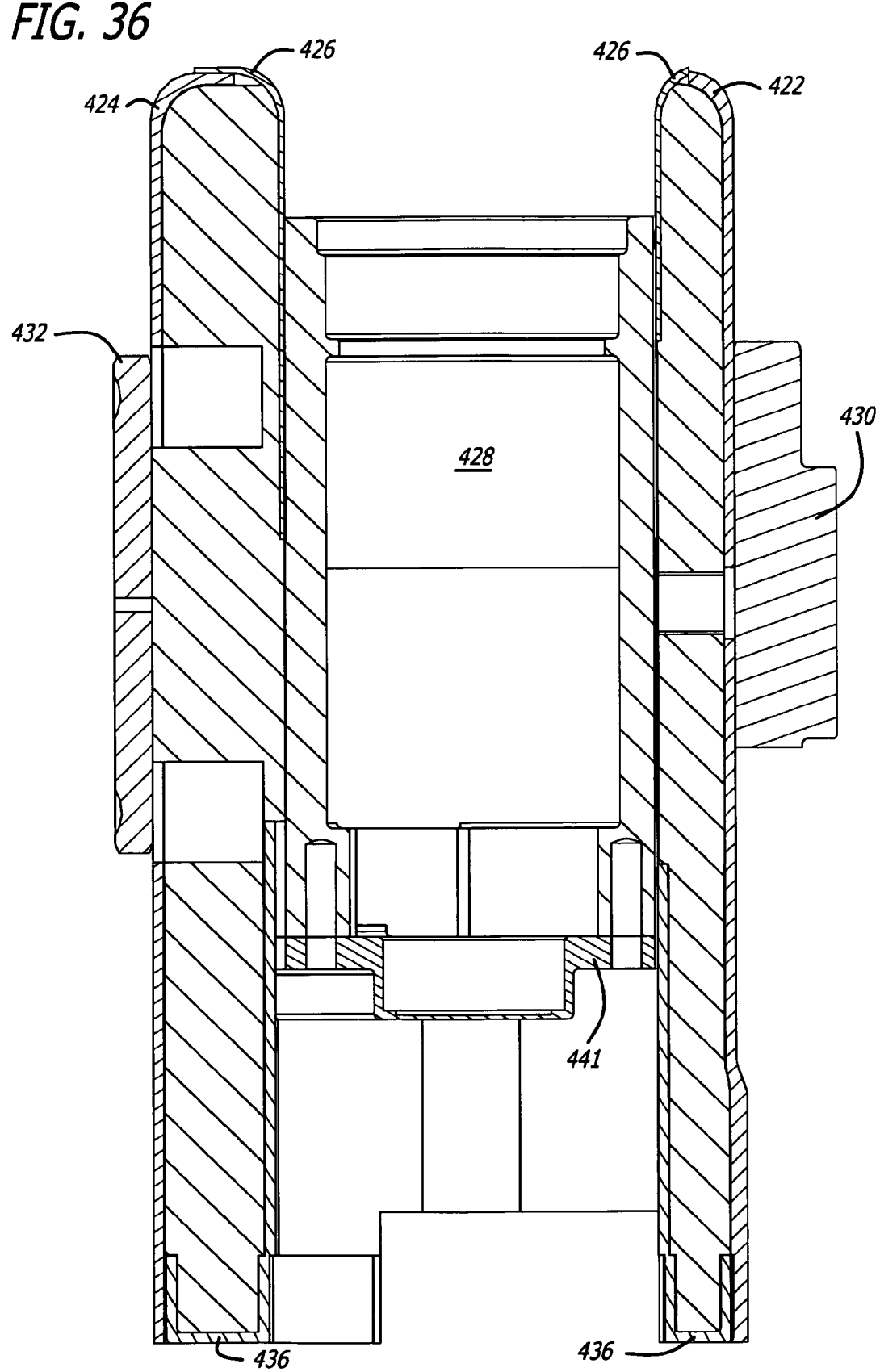

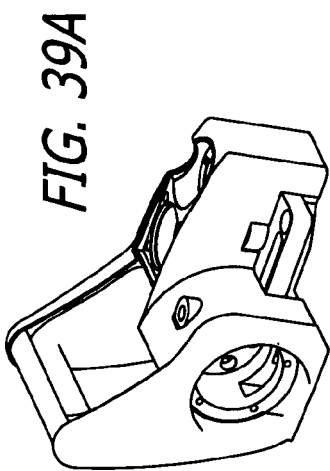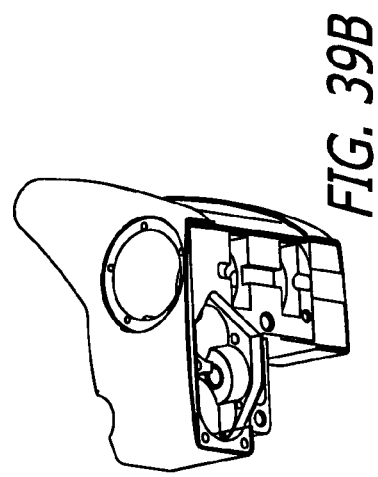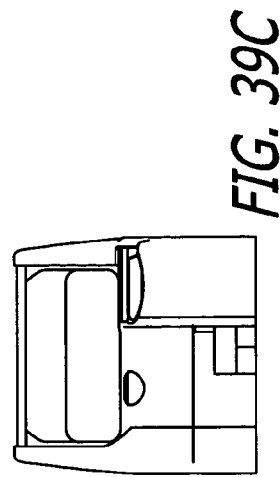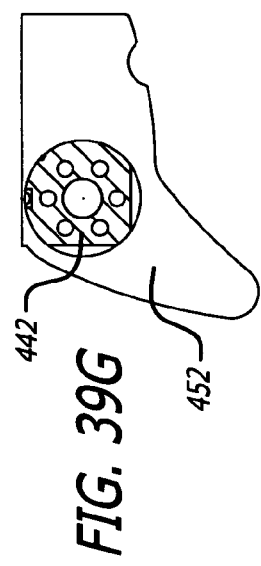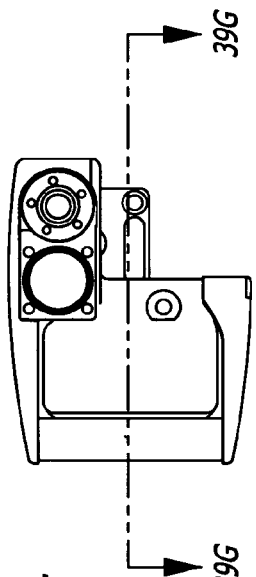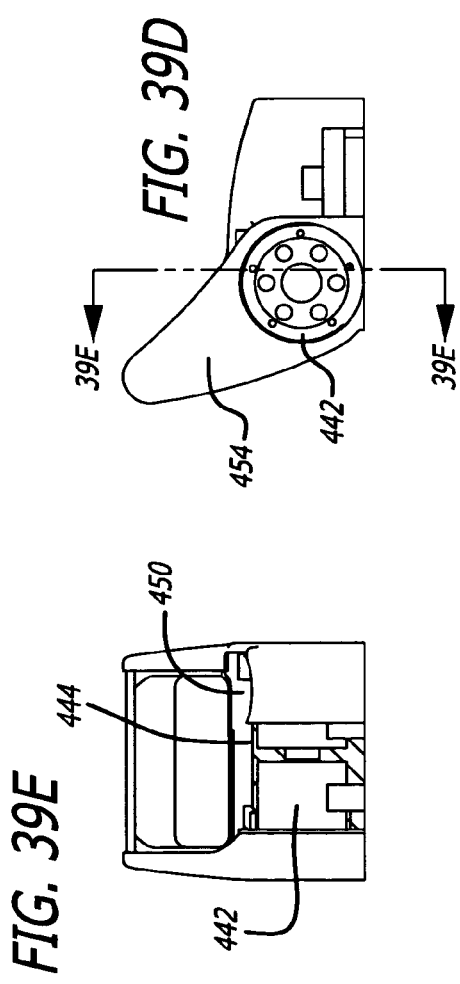

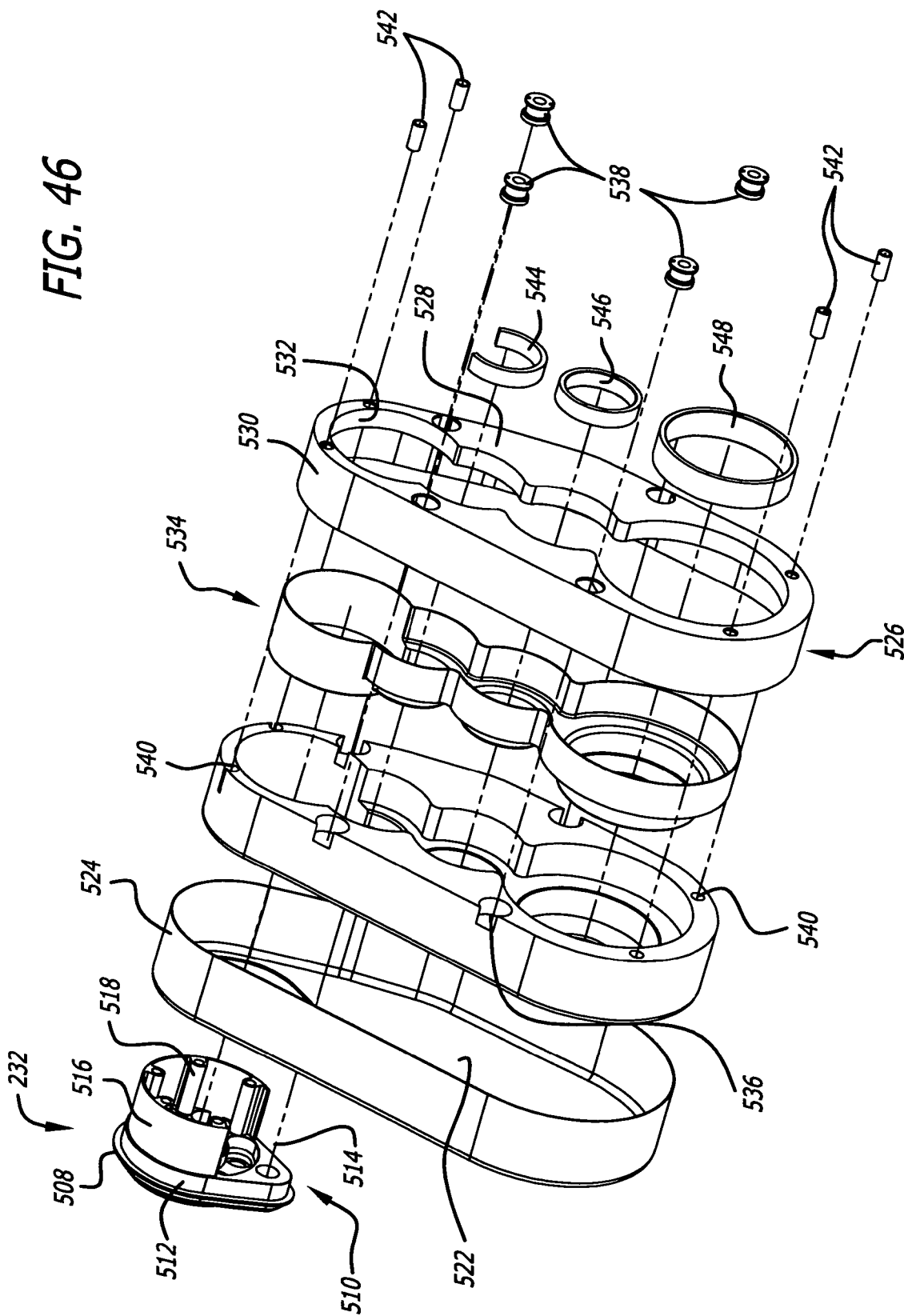

MOVABLE MACHINERY, INCLUDING PAVEMENT WORKING APPARATUS AND METHODS OF MAKING

CROSS-REFERENCE TO RELATED APPLICATION

This is a continuation-in-part of Ser. No. 10/101,473, filed Mar. 18, 2002.

BACKGROUND OF THE INVENTIONS

1. Field of the Invention

This relates to movable machinery, including hand-held, portable, self propelled and similar machinery, and including saws, drills for example coring drills, cutting and grinding machinery and other machinery for treating concrete, paving, masonry and the like.

2. Related Art

Machinery design for movable machinery takes into account the function of the machinery, strength and reliability, cost of materials and similar considerations. Machine design sometimes results in machines that are difficult to maneuver and heavy. Depending on the application, machinery such as saws are made primarily of metal parts and sometimes plastic housings, switches or controls to lower the weight of the product.

While it should be understood that the present inventions may apply to a wide variety of different types of movable machinery, the present discussion and examples will be directed to wall saws, such as those used to cut lines or openings in walls, such as those made by Dimas and sold under model number 360-1500H or 360-2100S, the instruction manuals for which are incorporated herein by reference. Elements of model No. 360-2100S are also described in U.S. Pat. No. 5,588,418, also incorporated herein by reference.

One example of a wall saw is shown in FIGS. 1–2, in which are shown a concrete wall 100 (FIG. 1) a track 102 mounted to the wall through clamps 104 and having a gear track 106 along which the saw 108 travels. A typical saw includes a carriage 110, a bearing housing and assembly 112, a gearbox 114, saw blade 116 and a blade guard 118 (FIGS. 1 and 2).

Considering the saw and track in more detail with respect FIG. 2, the bracket 104 includes leveling screws 120 and track 102 is mounted to the brackets 104 through cap screws 122. The saw is mounted and retained on the track through retention rollers 124 positioned at least at respective ends of four legs extending downwardly from the carriage 110 alongside the track. Only one retention roller 124 is shown in FIG. 2. A plurality of guide rollers 126 are supported by the carriage 110 and guide the carriage along the track. A manual travel control 128 is accessible from the top of the saw. The travel control 128 is turned with a suitable wrench so as to move a gear (not shown) under the carriage along the track rack 106 through a series of intermediate gears.

The bearing housing and assembly 112 include an outer housing 130 and suitable gears, drive shaft and bearings. The assembly 112 receives drive input from a hydraulic drive motor (not shown) mounted to the housing opposite the gearbox 114 and drives the saw blade through the gearbox 114. The assembly 112 also includes gears for positioning the blade relative to the work piece, such as the concrete wall 100 (FIG. 1).

A blade depth control 132 (FIG. 2) is also accessible from the top of the saw. It is turned with a suitable wrench so as to move the gear (not shown) in the bearing assembly 112, which then pivots the gearbox about the drive shaft, which in turn adjusts the position of the saw blade relative to the work piece.

The gearbox 114 transmits drive power to the saw blade mounted to a blade drive shaft through inner and outer blade flanges 134. The blade flanges 134 also include internal structures for passing fluid along the sides of the saw blade. A blade guard coupler 136 mounts a blade guard support 138 to a blade guard support bracket for supporting the blade guard.

SUMMARY OF THE INVENTIONS

Methods and apparatus are described for producing a movable machine, for example a wall saw, having a light construction. Methods and apparatus are also described for producing a movable machine having light components and having strength sufficient to operate as a movable machine, for example in a wall saw. Methods and apparatus are discussed for producing components of a movable machine that can form a final assembly wherein at least one or part of one of the components is formed as a composite material, at least one component of which is plastic, for example a thermosetting resin. Methods and apparatus are also disclosed that can produce a movable machine that is more versatile and easier to use.

In one example of methods and apparatus disclosed herein, a movable machine, in one example a saw such as a wall saw, is formed with at least one housing formed from a composite material. In one example, the composite material includes fibers, for example carbon fibers, glass fibers, Kevlar or other reinforcing material. The composite material may include a thermosetting resin, and the material may include both a reinforcing fiber and a thermosetting resin. Where the term "composite" is used, it is preferably a composite of fibers and resin as disclosed herein, and preferably carbon fibers. In an example of a component made with a composite material, a carriage for a wall saw is formed with composite material skins. In another example of a component made with a composite material, a bearing housing for a wall saw is formed with composite material skins, and in another example a travel gear housing is formed from a composite material. In a further example, a gearbox is formed from a composite material, and in another example a gearbox is formed from a combination of composite material and metal to form the gearbox housing and support for the gears and bearings. In a preferred form, the skin thickness ranges from about 0.030 inch to about 0.060 inch, with areas having greater strength having a greater thickness. In another preferred form, the skin is formed from about six layers of fiber, and may also be formed from four layers, five layers, seven layers or eight layers. The fibers may be oriented to follow a specific and unique pattern or may follow a more general pattern, such as that used in a known 8-harness layout.

In a further example of methods and apparatus disclosed herein, a movable machine, for example a wall saw, includes least one component formed with a housing formed from multiple skins of composite material. The skins include edge portions which preferably overlap each other. In a further preferred form, the overlapping edge portions adhere to each other. In a still further preferred form, the overlapping edge portions adhere to each other through an adhesive, for example an epoxy adhesive. In a preferred form, the adhesive thickness is about 0.005 inch and may be somewhat higher up to about 0.010 inch or somewhat lower.

In another example of methods and apparatus disclosed herein, a movable machine, for example a saw, includes a housing formed from a cover material, for example a plastic skin, over a body layer, for example a foam layer. In one form, the foam layer is a high-density closed cell foam. In other forms, the body layer can be honeycomb material, a fiberglas composite, a metal or a plastic. The body layer can provide support to the plastic skin and impact resistance. In another form, the plastic skin can be formed from a composite material of reinforcing fibers and plastic, for example a thermosetting resin. In a further form, the skin and the body layer are bonded or adhered together with an adhesive.

In a further example of methods and apparatus disclosed herein, a movable machine, for example a saw, includes a carriage having a side wall for supporting carriage components, for example rollers or bearings, wherein the side wall has at least one surface that extends longitudinally as well as inward and outward relative to a longitudinal axis. For example, the longitudinal axis may coincide with a track along which the carriage travels and the surface of the side wall extends longitudinally as it extends inward and then outward relative to the track. The directional change in the surface may help to support diagonal loads in the carriage as well as loads tending to turn the carriage away from the track.

In a further example of methods and apparatus for constructing a movable machine, for example a saw, the carriage such as that described previously having a side wall extending inward and outward relative to a longitudinal axis can also include a side wall having a surface portion that extends outward when a portion of the side wall extends inward and a surface portion that extends inward when a portion of the side wall extends outward. Such surface portions can be considered complementary reinforcement portions where the surface portion extends in a direction at least partly opposite the direction in which the rest of the side wall extends. Alternatively, a movable machine such as a saw may have a wall that includes a reinforcement portion extending outwardly or inwardly relative to the adjacent surface of the wall. For example, a straight and flat wall may include a reinforcement portion that extends outwardly or inwardly relative to the flat wall.

In another example of methods and apparatus for constructing a movable machine, the machine or parts of the machine, for example a carriage, can be formed from a machined plastic material such as a machined closed cell foam. The plastic material is machined to form the desired shape and configuration. In one example, a plastic material is then adhered or bonded to parts or all of the machined plastic material. The plastic material bonded to the machined plastic may be a composite skin, for example where the composite skin and the machined plastic material have shapes that conform to each other. In one form, the plastic material and the machined plastic material are dimensioned so that a uniform spacing exists between the two so that a bonding agent can be placed between the two materials to form a bond of relatively uniform thickness. In one example described, a uniform thickness may be approximately 0.005 inch. In another form, for example where the plastic material is a carbon fiber skin, the shape and configuration of the carbon fiber skin is first selected, and the closed cell foam machined to have a shape and configuration slightly smaller than the inside dimensions of the skin. Adhesive or a bonding agent bonds the skin to the closed cell foam.

In another example of methods and apparatus disclosed herein, a movable machine, for example a wall saw, is formed with at least one component assembled from a composite skin and a foam core or body to form a housing for components or to form a support structure, for example a carriage. In one form, the foam core is formed of a closed cell foam. The foam may be machined to the desired configuration of thickness, dimensions and shape. In another example, the composite skin and the foam are bonded, adhered or fixed together. Preferably, the composite skin and the foam are bonded with an adhesive, for example an epoxy adhesive. In another form, the foam core is formed from multiple pieces of foam, adjacent ones of which are adhered or bonded or fixed to each other, for example by an adhesive. In another example, more than one component is assembled from a composite skin and foam core or body. In still another example, all of the housings enclosing or supporting moving components such as gears, shafts and the like are formed from a composite skin and foam core or body. In a further example, where the composite skin and foam are to be bonded together, the composite skin can be formed with an attached etching paper, which can later be peeled or pulled off to give a rough surface for receiving the adhesive for bonding the composite with the foam. In another example, where a closed cell foam is used within a composite skin in a component for a movable machine, the closed cell foam is preferably at least 60 percent closed cell and preferably in a range from 80 percent to 98 percent, and more preferably about 96 percent. Where closed cell foams are used, the closed cell foam is preferably a high-density foam.

In an additional example of methods and apparatus disclosed herein, a movable machine, for example a wall saw, is formed with at least one component assembled from a composite skin and inserts wherein the inserts are configured to receive other components. In several examples, the other components can be fasteners, component housings, bearing supports, motor supports, component mounts, and the like. The inserts are preferably bonded, adhered or otherwise fixed to portions of the composite skin. In a further example, at least one component of a movable machine, for example a wall saw, is formed with a housing having at least one component as a composite skin, a foam core or body and inserts, and at least two and preferably each of the composite skin, foam core and inserts are bonded or adhered to adjacent ones of the other. For example, a portion of the composite skin and an adjacent insert can be bonded together, a foam core and an adjacent insert can be bonded together or a composite skin and an adjacent foam core can be bonded together. Where a given insert is adjacent both a composite skin and a portion of foam, the insert is preferably bonded to each. In those examples using either a composite skin and a foam, a composite skin and inserts, or a foam and inserts, or any combination thereof, the equipment, procedures and materials used by Composite Tek of Boulder, Colo., or a similar company are preferably used. Possible techniques and configurations for components described herein can be found in their Composites Design Guide, Revision 2, incorporated herein by reference.

In another example of a movable machine formed with at least one component assembled from a composite skin and inserts, one insert may include a floating head insert. In one form, the floating head insert includes a rim surface that is flush with the surface of the composite skin. In another form, the floating head insert extends into an cavity formed in an underlying structure, such as a foam body underlying the skin, and the cavity is filled with a hardening material such as a hardening plastic. In one example of this form, the hardening plastic extends under both a rim surface of the floating head insert and under a portion of the adjacent composite skin. The hardening plastic anchors the floating head insert in place in the cavity, with a top rim of the floating head insert preferably flush with the composite skin.

In an example of a movable machine having a gear box or other linkage arrangement between an input and an output, the linkage arrangement is formed using first and second elements fastened together and a third element fastened to the second element but not fastened directly to the first element. In an example of a gear box, a first section can be affixed to a second section, and a third section affixed to the second section. For example, the first section can be affixed to the second section through fasteners and the third section can be affixed to the second section also through fasteners. In a further example, the first section can be affixed to a mounting element, for example a hub insert, such as through bonding between a surface on the hub insert and a surface on the first section, and second section can be mounted to the first section through appropriate fasteners. The third section can then be mounted to the second section, for example through appropriate fasteners. These arrangements, which can be termed ladder arrangements, can be used to significant advantage where one or more of the sections include composite materials, such as fiber reinforced sheets or skins and closed cell foam bodies. These arrangements can also be used to significant advantage in a gear box for a wall saw where the input is anchored to another component such as a bearing housing but where the output is not anchored to that other component.

In one example of methods and apparatus disclosed herein, a movable machine, for example a wall saw, is formed with at least one component having a housing formed from a composite skin formed from or coated with a UV absorbing material. For example, a carriage, bearing housing, motor mount, and/or gearbox have housings formed from composite materials coated with a UV absorbing material. In one example, the composite material may be coated with a PPG high-grade UV protecting clear coat automotive paint. In another example, the composite may be formed with a composite layer of fibers and/or plastic that absorbs UV radiation.

In another example of methods and apparatus disclosed herein, a movable machine, for example a wall saw, includes several transmission components, such as gears, supported on a common support, such as a common shaft. For example, idler gears may be supported on common or coaxial shafts. In the example of a wall saw, a gear for driving the saw blade may be supported on the same axis, and may be coaxial with, the gear used to keep the blade guard level relative to the work surface such as a concrete wall. In another example, the saw blade may have a blade shaft drive gearing ratio of 3.512:1, and the blade guard leveling gears may have a ratio of 1:-1.

A further example of methods and apparatus disclosed herein include a movable machine, for example a wall saw, having two drive gears, wherein a given drive gear is used to engage a track rack with the saw oriented in one direction and the other drive gear is used to engage the track rack with the saw oriented in another direction. This allows, for example, a track having an offset rack to be used with the saw going in either direction without having to reorient the track.

In an example of methods and apparatus disclosed herein, a movable machine, for example a wall saw, is formed with at least one component having a housing formed from at least one of, and preferably both, a composite and a foam with metal inserts bonded to one or both of the composite and the foam. Preferably, the inserts are formed from 6AL-4V titanium or from 2024-T351 aluminum that is hard anodized. These materials are lightweight, minimize galvanic action between the metal and carbon fiber and have high material yield properties. The gears may be formed from stainless steel, such as 416 stainless or 86L20 alloy, and the shafts may be stainless as well, but they may be lighter if formed from heat-treated aluminum or from titanium.

In another example of methods and apparatus, movable machinery may incorporate only one or may incorporate more than one of the examples described herein though not all and still achieve significant improvements over existing machinery. For a first example, though not necessarily primary or in any particular order but only for purposes of identification, movable machinery can include one or more components formed from a fiber reinforced material without a body layer formed from a closed cell foam. As a second example, one or more of the components can be formed from substantially planar fiber reinforced skins or sheets, without any significant surface undulations. Third, movable machinery can be formed from a composite fiber material in combination with an adjacent body layer. Fourth, movable machinery can also be formed from a composite fiber material having a non-planar surface, with or without surface portions extending in directions opposite to those of the adjacent surface portions. Fifth, movable machinery can be formed from a composite fiber material included with other components where the composite fiber material and the other components are held together as a unit even though there is no fastener that extends through the composite fiber material and the other components together. Sixth, movable machinery can be formed from a composite fiber material along with inserts to accept fasteners and other components to secure the fasteners or other components relative to the composite fiber material. Seventh, movable machinery can be formed such that one or more components of the machinery can support a number of gears having different functions where two of the gears are supported on a common axis. Eighth, movable machinery can be formed so that two distinct components having unrelated functions can be linked so that operation of one of the components produces a predetermined operation on the other component (an example of which is movement of a saw blade and coordinated movement of a blade guard with movement of the saw blade). Ninth, movable machinery can be formed from a composite fiber material along with a UV absorber incorporated or included in the machinery to absorb UV radiation that would otherwise be absorbed by the composite fiber material. Tenth, movable machinery can be formed from a composite fiber material along with metallic inserts formed from material, such as titanium or aluminum that is non-reactive or only slightly reactive with the composite fiber material. Eleventh, movable machinery can be formed from a composite fiber material along with a shaped or machined body layer adjacent the composite fiber material. Twelfth, and additionally, any one of the foregoing can be combined with one or more or all of the other foregoing examples or more specific or detailed implementations thereof to achieve additional or alternative benefits. Simply by way of example and not by way of limitation, movable machinery can be formed with a composite fiber material for housing, in combination with other components, nested or coaxial gear combinations, wherein the composite fiber material and the other components forming the housing can be held together through sequential or ladder securing arrangements without any given fastener extending through both the composite fiber material and the other components. All possible combinations and permutations of the foregoing as well as the combinations and permutations of exemplary detailed implementations of the foregoing examples are also intended to be within the scope of the application.

These and other aspects of the present inventions can be considered in more detail in conjunction with the drawings, a brief description of which follows, and the detailed description.

BRIEF DESCRIPTION OF THE DRAWINGS

FIG. 22A is an upper right isometric view of the housings of the saw of FIG. 3.

FIG. 22B is a rear plan view of the housings of FIG. 22A.

FIG. 22C is a left side elevation view of the carriage of FIG. 22A.

FIG. 22D is a bottom plan view of the housings of FIG. 22A.

FIG. 36 is a vertical transverse section of the housing of FIG. 32 taken along line 36—36.

FIG. 39A is a left rear isometric view of a travel housing for the saw of FIG. 3.

FIG. 39B is a bottom right rear isometric view of the travel housing of FIG. 39A.

FIG. 39C is a front elevation view of the housing of FIG. 39A.

FIG. 39D is a left side elevation view of the housing of FIG. 39A.

FIG. 39E is a vertical transverse section of the housing of FIG. 39D taken along line A—A.

FIG. 39F is a top plan view of the housing of FIG. 39A.

FIG. 39G is a vertical longitudinal section of the housing of FIG. 39F taken long line B—B.

FIG. 46 is an enlarged view of a portion of the housing components shown in FIG. 45 for the gearbox of FIG. 40.

DETAILED DESCRIPTION OF THE PREFERRED EMBODIMENTS

The following specification taken in conjunction with the drawings sets forth examples of the present inventions in such a manner that any person skilled in the art can make and use the inventions. The examples of the inventions disclosed herein are the best modes contemplated by the inventor for carrying out the inventions in a commercial environment, although it should be understood that various modifications can be accomplished within the parameters of the present inventions.

A movable or portable machine is described which is lighter than conventional counterparts, and which can be made more reliable. Methods and apparatus are also described for making an improved movable or portable machine, for example a movable machine for working on a work piece, in the disclosed example a wall saw. While the disclosed example is directed to a wall saw, the inventions can be applied to other movable machines, including hand-held machines and power tools, portable machines and power tools, self propelled machines and power tools, as well as other movable machines for operating on surfaces and work pieces. The inventions can be applied to machines used to work on concrete, pavement and other masonry forms or products, of which a wall saw and core drill are several examples. The wall saw described herein is an example of a movable or portable machine well-suited to application of the present inventions.

Figure 1:
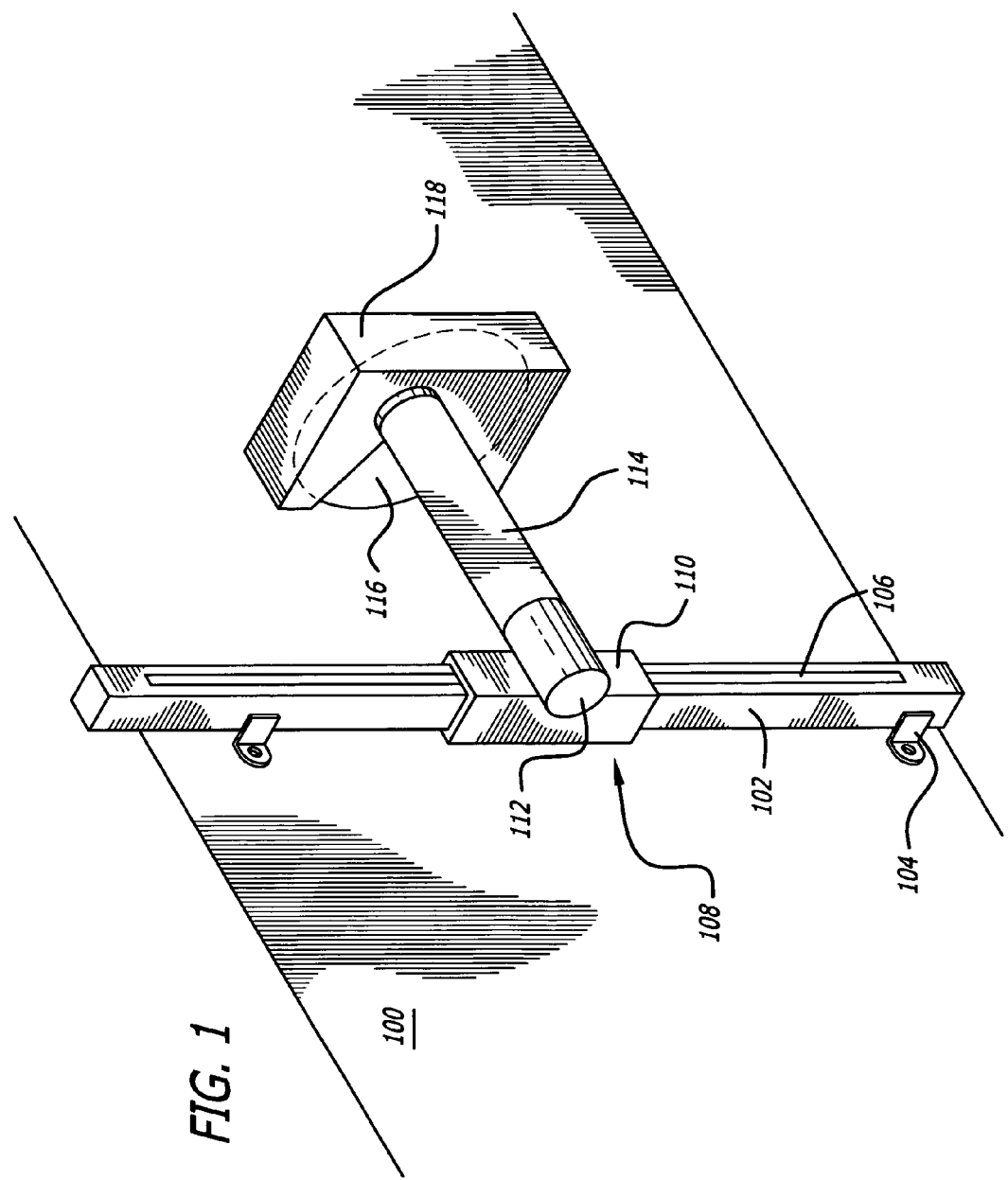
FIG. 1 is a schematic of an isometric view of a wall saw representing one example of a movable machine that can incorporate one or more of the present inventions.
Figure 2:
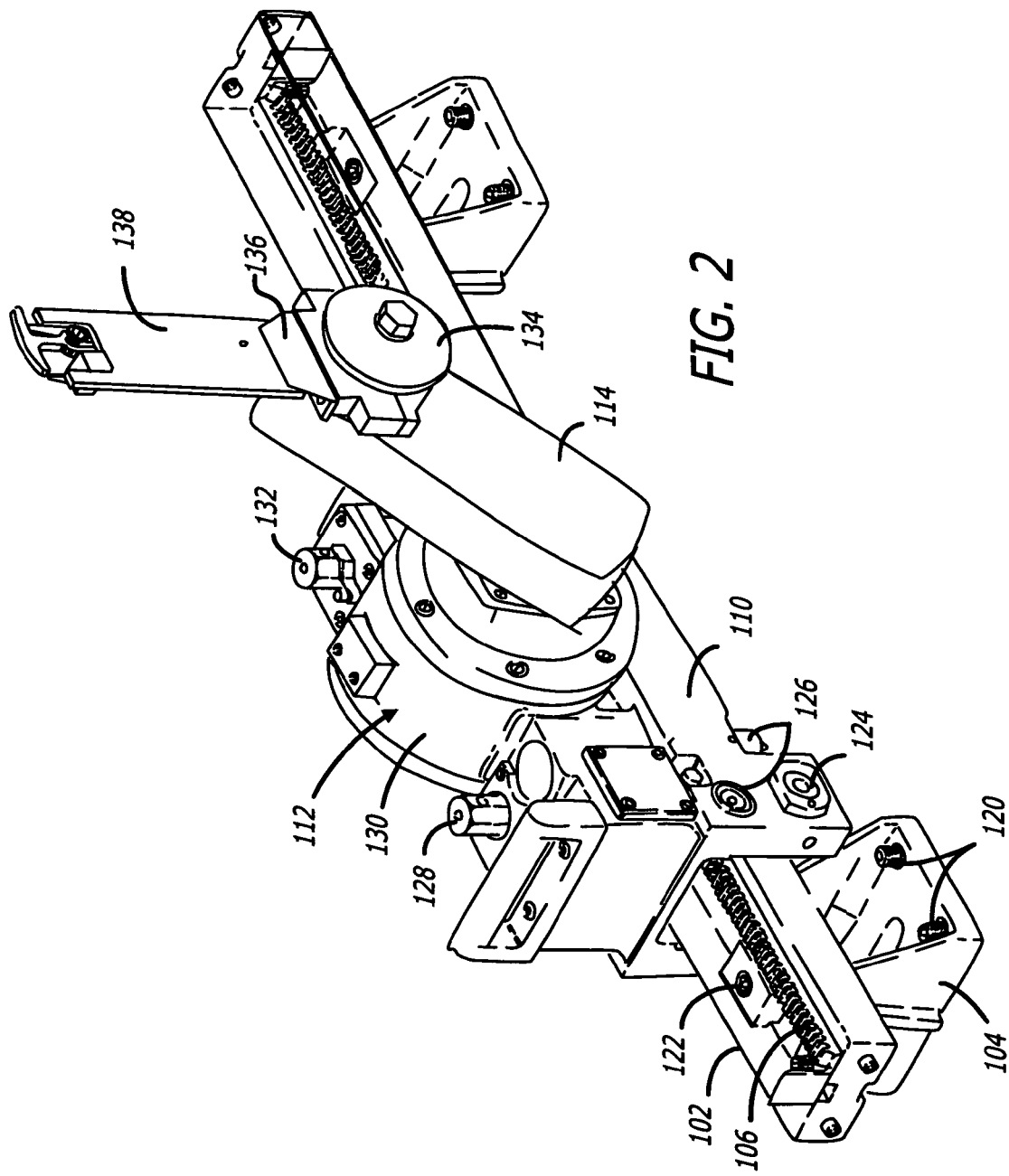
FIG. 2 is a front left side isometric view of a conventional wall saw on a track.
Figure 3:
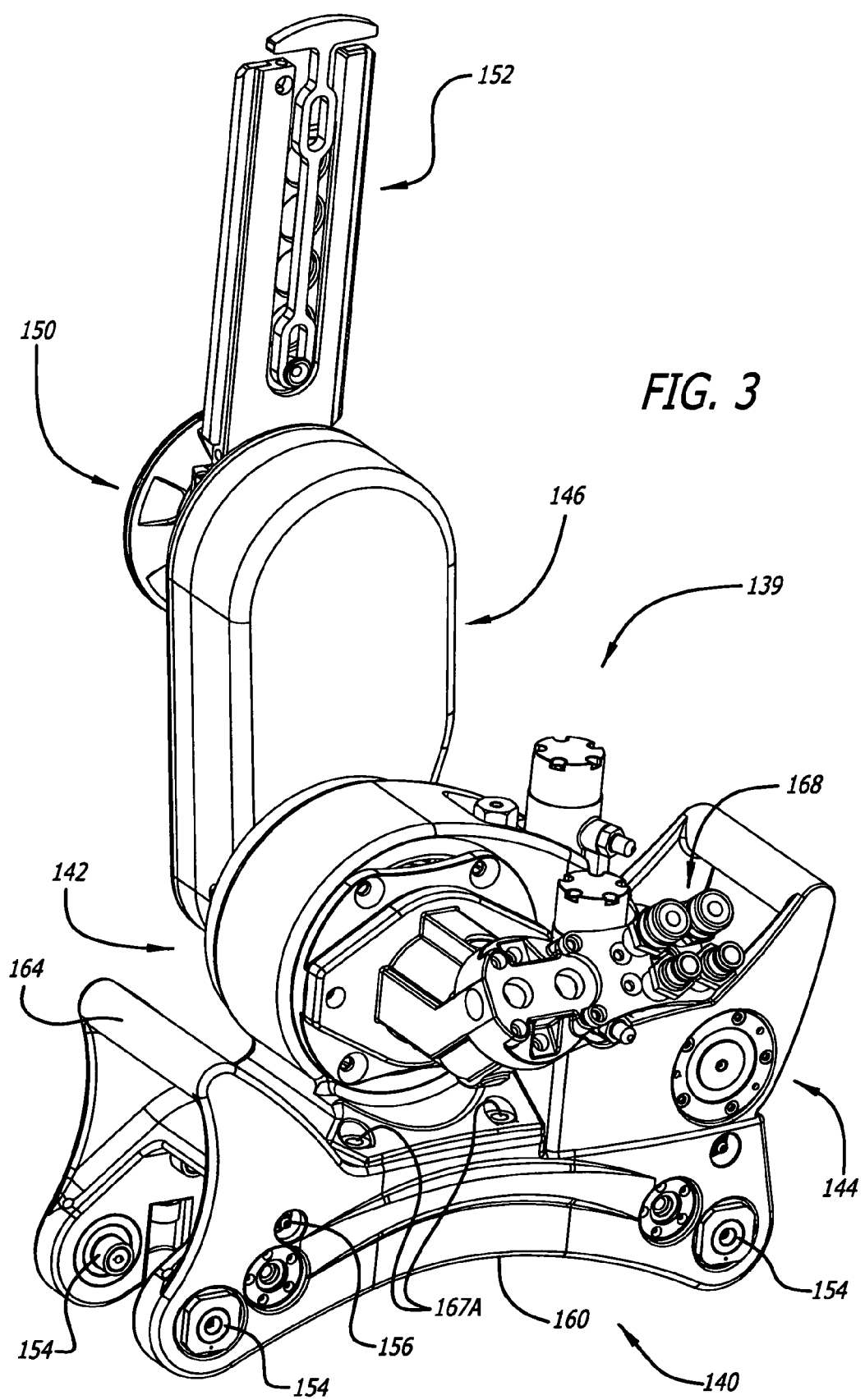
FIG. 3 is a right side and rear isometric view of one example of a wall saw incorporating several aspects of the present inventions.
Figure 4:
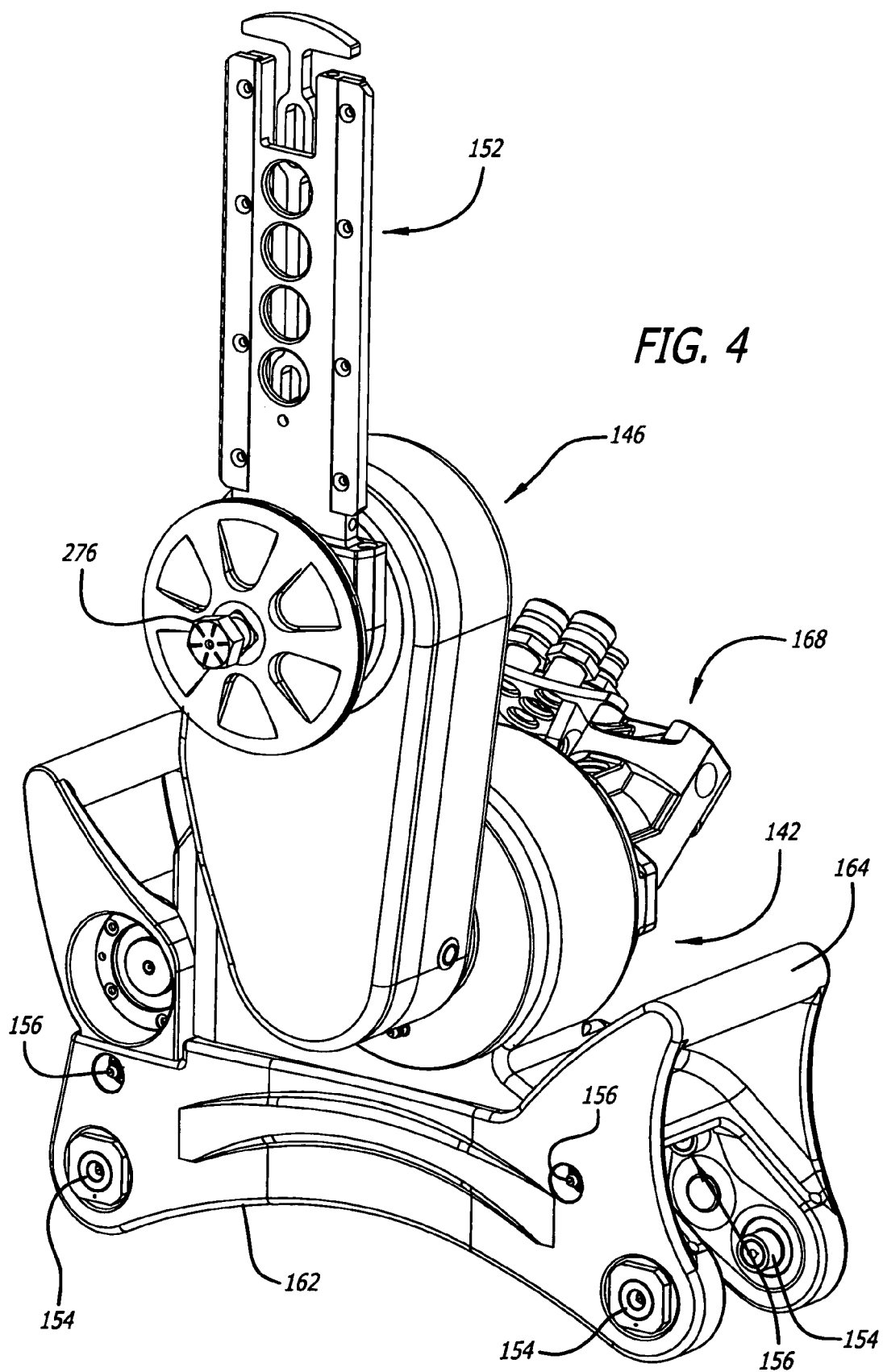
FIG. 4 is a left side and rear isometric view of the saw of FIG. 3.

A wall saw such as may be used with the track 102 of FIGS. 1 and 2 may include a carriage 140 (FIGS. 3–4), a bearing assembly 142, a travel assembly 144, a gearbox assembly 146 and blade flanges 150 for supporting a saw blade (not shown) and a blade guard support 152 for supporting a blade guard (not shown) (see generally FIGS. 3–7). The blade guard support 152 may be a conventional structure, as may be the blade flanges 150. The carriage includes lower roller assemblies 154, which may be conventional roller assemblies or Nylatron roller assemblies, or combinations of the two. Preferably, at least one set of roller assemblies are eccentric rollers for permitting adjustment of the carriage position on the track. The carriage 140 also preferably includes a set of corresponding upper roller assemblies 156 (FIGS. 3, 4, 5, 6, 10), which are preferably conventional roller assemblies. One or more side roller assemblies 158 (FIGS. 5 and 6) may also be included. Each of the rollers is supported in the carriage 140 by respective inserts, described more fully below. The carriage also includes a right side wall 160 (FIG. 3) and a left side wall 162 (FIG. 4) (when viewed from the front, while it should be understood that directional adjectives are used herein principally as relative descriptors, and not as limiting descriptors), a handle 164 and a platform 166 extending generally horizontally between the right side wall and left side wall (FIG. 23) for supporting the bearing assembly 142 and the travel assembly 144, also as described more fully herein.

Figure 5:
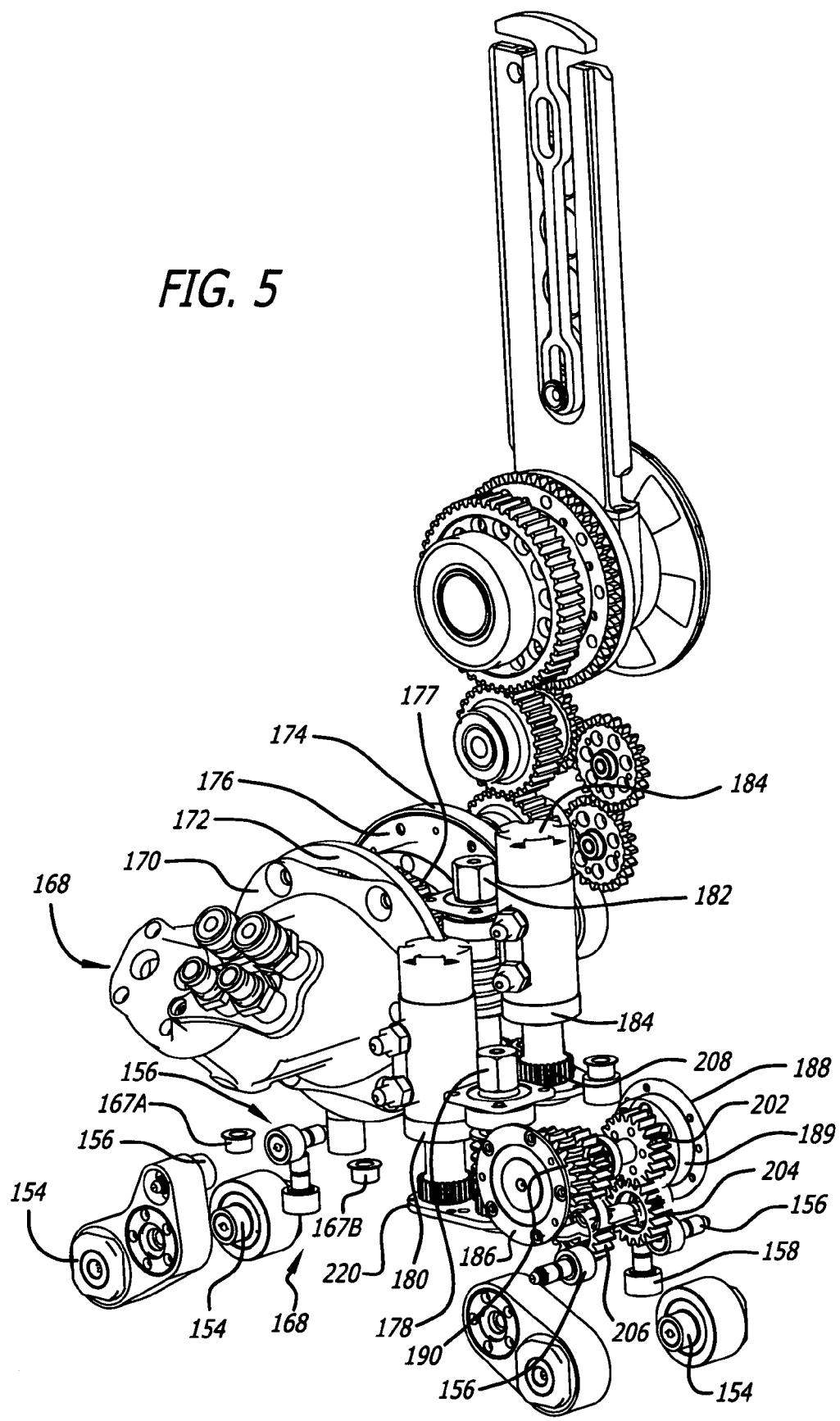
FIG. 5 is a right side and rear isometric view of the saw of FIG. 3 showing the working components of the saw and the housing components in phantom.
Figure 10:
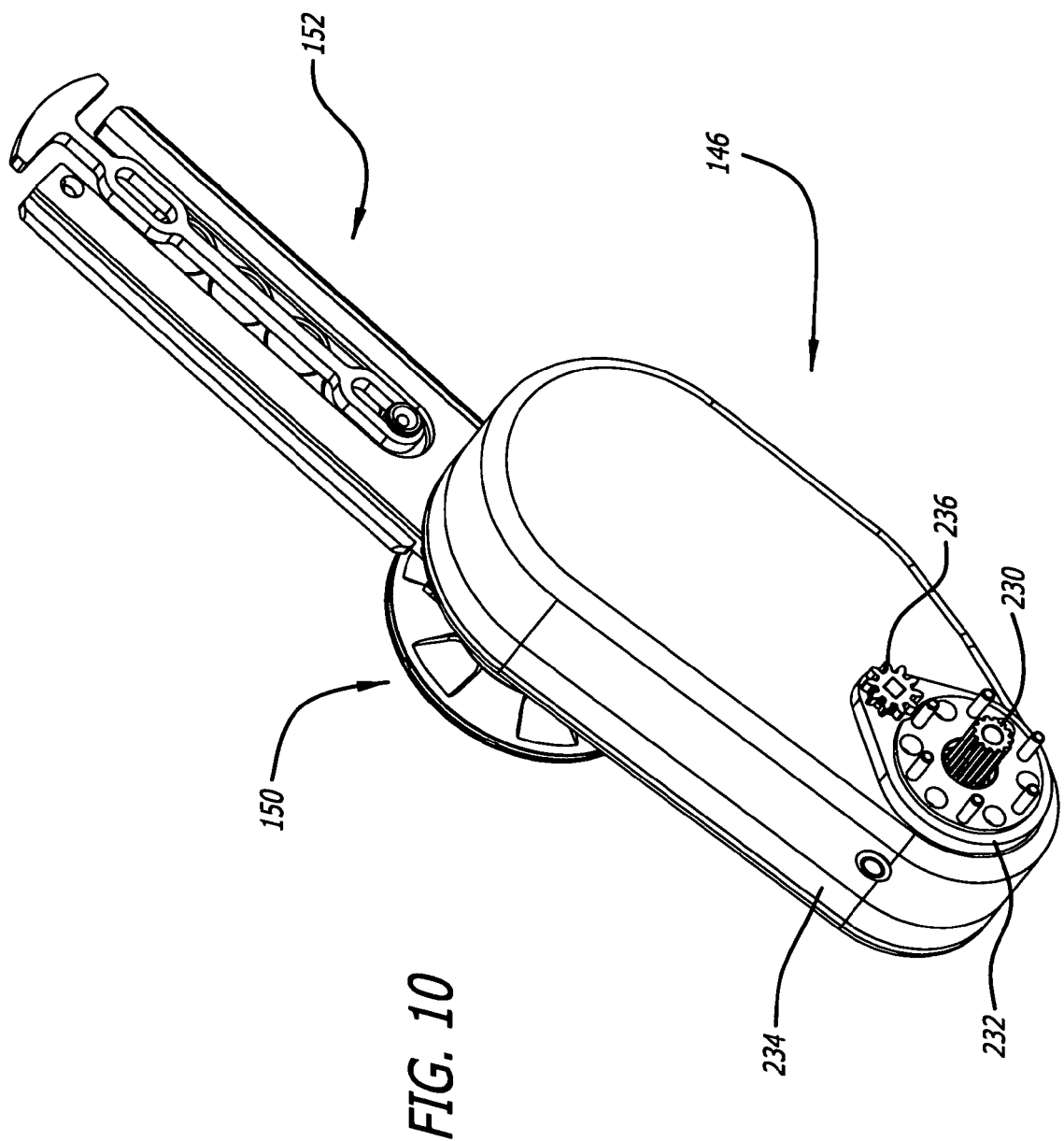
FIG. 10 is a right side isometric view of the gearbox and blade guard support of the saw of FIG. 3.
Figure 11:
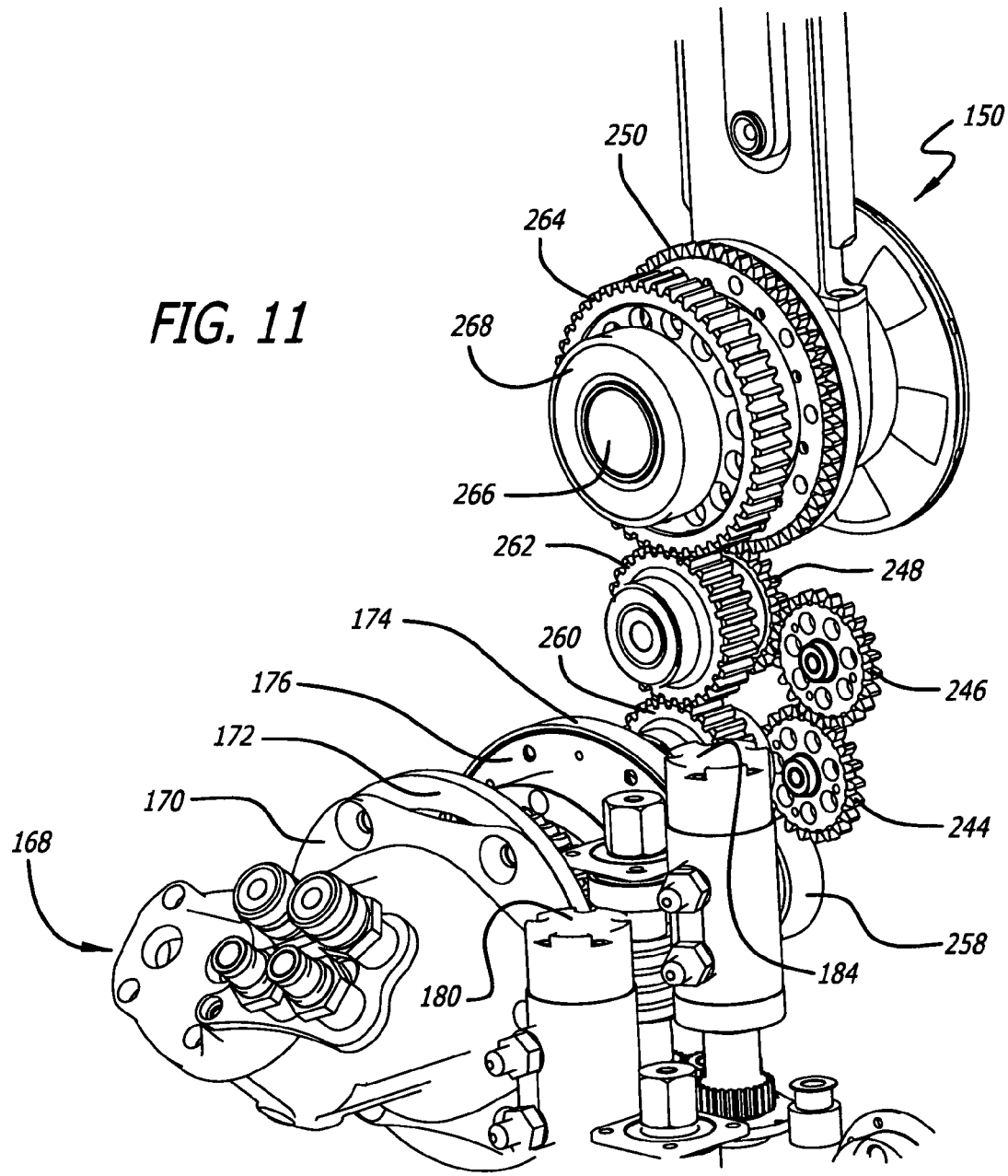
FIG. 11 is a right front isometric view of some of the working components of the gearbox for the saw of FIG. 3.
Figure 12:
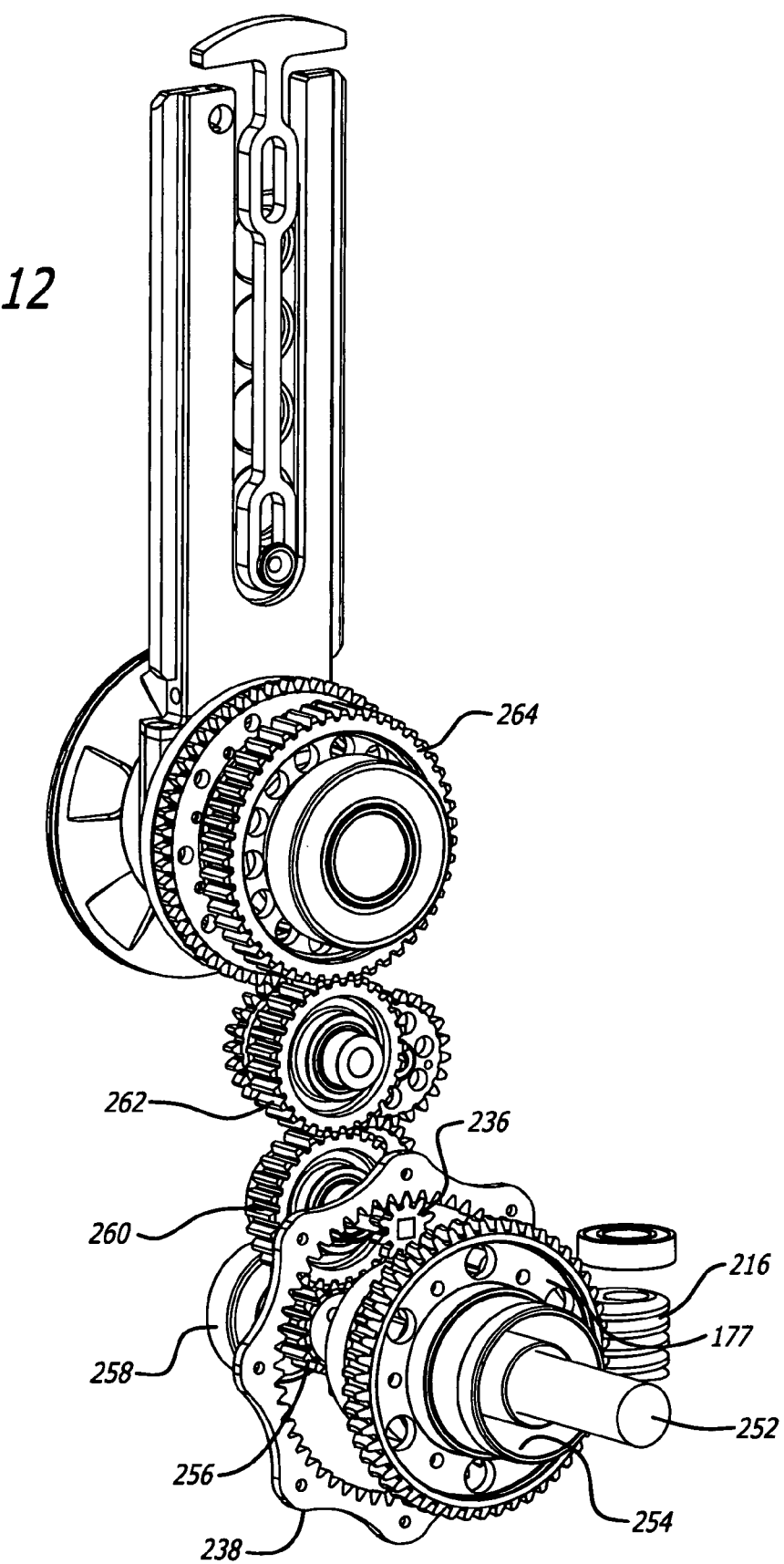
FIG. 12 is a right rear isometric view of the drive shafts and gear trains for driving the saw blade and positioning the blade height for the saw of FIG. 3.

The bearing assembly 142 is mounted and fixed to the carriage 140 through appropriate fasteners 167A (shown generically in FIG. 3) engaging respective inserts 167B (FIGS. 5,) in the top of the carriage. The bearing assembly 142 has a conventional hydraulic motor assembly 168 mounted to a bearing housing mounting plate 170 (FIGS. 5 and 10). The hydraulic motor drives the saw blade through the saw blade drive train described more fully below. The mounting plate 170 is fastened to and supported by a hydraulic motor mount insert 172 supported and bonded or adhered to the inside of the right skin of the bearing housing. The insert can be titanium AL46V, as titanium is intended to support a heavier load than the hard anodized aluminum 2024 T351. The bearing housing also includes suitable bearings and seals about the main shaft through the bearing housing for supporting the main shaft in the housing. A second insert 174 in the bearing housing opposite the insert 172 is bonded or otherwise adhered to the inside of the left bearing housing skin for supporting a gearbox mount 176, which is supported on the main shaft by appropriate bearings and sealed by appropriate seals. The bearing housing also supports on the main shaft a gearbox rotation worm mating gear 177 (FIGS. 6–9). The worm mating gear 177 is driven by the gearbox rotation drive assembly for changing blade position or blade depth.

The travel assembly 144 includes a manual travel control 178 and a hydraulic travel control motor 180 (FIG. 5 and) to drive the travel gear train. A manual blade level control 182 and a hydraulic gearbox rotation motor 184 (FIG. 5 and) control the level of the blade guard through rotation of the gearbox assembly. Both of the travel controls and blade level controls are mounted in and supported by the travel assembly 144, which in turn is supported by the carriage 140. The travel assembly 144 is mounted to the carriage 140 through appropriate fasteners engaging inserts in the carriage.

The travel assembly 144 includes access covers 186 and 188 (FIG. 5) supporting respective bearings 189 (FIGS. 5, 6, 8, 9), which in turn support a driven worm gear 190 (FIGS. 5, 6, 8, 9) controlled by worm gear 192. As shown in FIGS. 5–9, the worm gear is controlled by the manual travel control 178 and by the hydraulic travel control motor 180. The travel control motor 180 includes a drive gear 194 engaging an idler gear 196, which in turn engages gear 198 on the shaft of worm gear 192. Rotation of the worm gear shaft moves the driven worm gear 190, which in turn rotates both of the worm driven gears 200 and 202. The worm driven gears 200 and 202 engage the drive pinion gears 204 and 206, respectively. The shafts supporting the worm driven gears 200 and 202 and the drive pinion gears 204 and 206 are also preferably formed from titanium. The drive pinion gears 204 and 206 are supported by respective bearings.

The gearbox rotation motor includes a gear 208 (FIG. 9), which drives idler gear 210, which in turn engages gear 212 on the shaft 214 of the gearbox rotation manual control 182. Rotation of shaft 214 turns worm gear 216, which in turn drives the worm mating gear 177 for moving the gearbox to position the blade relative to the worksurface.

Aluminum inserts are placed in the travel housing for receiving and supporting the hydraulic motors, the manual drive shafts and/or the gear assemblies, if desired. A first insert 218, shown in FIG. 6, supports the gearbox rotation motor 184 and a second insert 220 (FIGS. 5, 6) supports the travel gear assembly. These aluminum inserts are preferably bonded or adhered within the travel housing in the same manner as the other inserts, as described more fully below.

Figure 13:
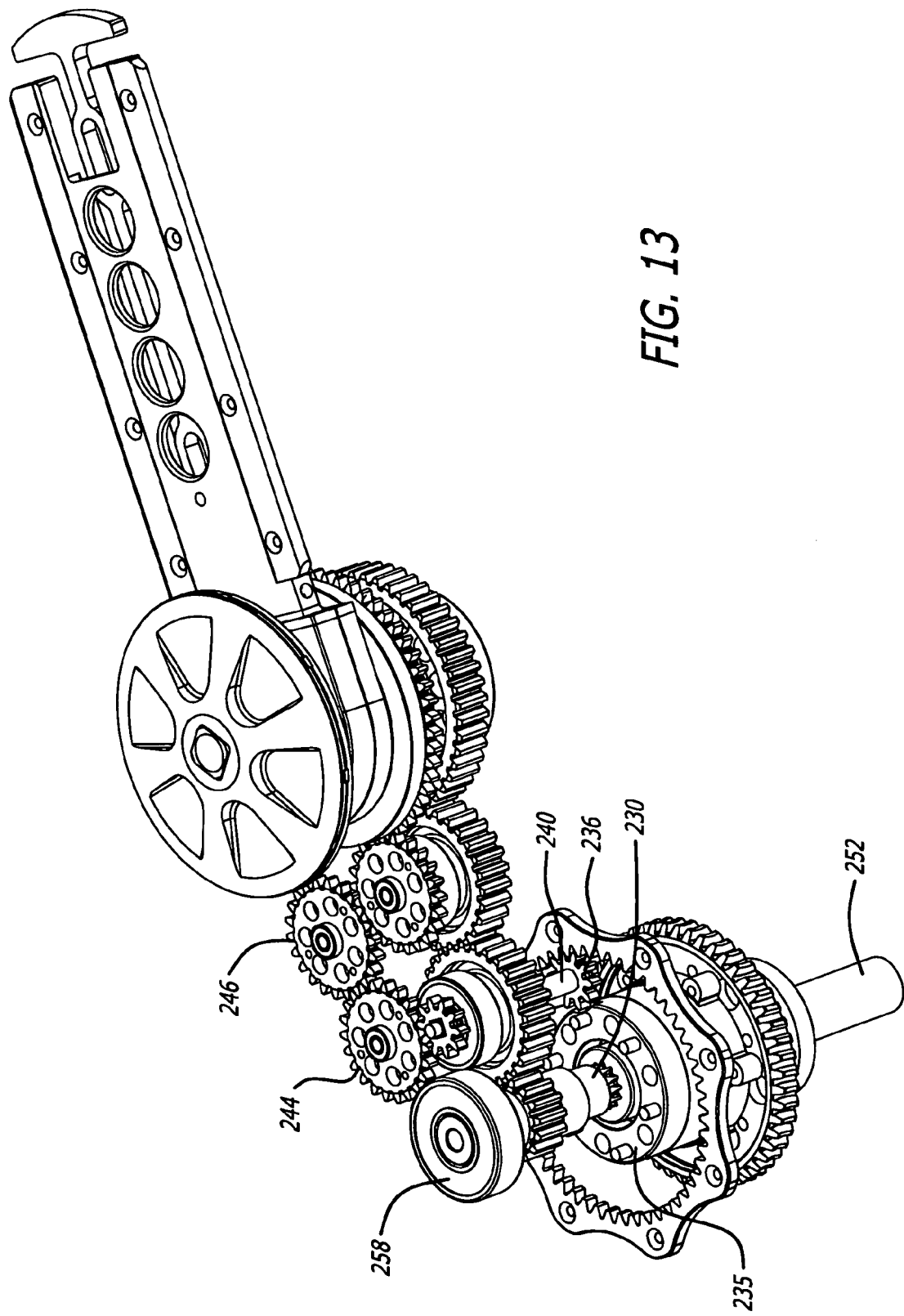
FIG. 13 is a lower left side isometric view of the drive shafts and gear trains of FIG. 12.
Figure 43:
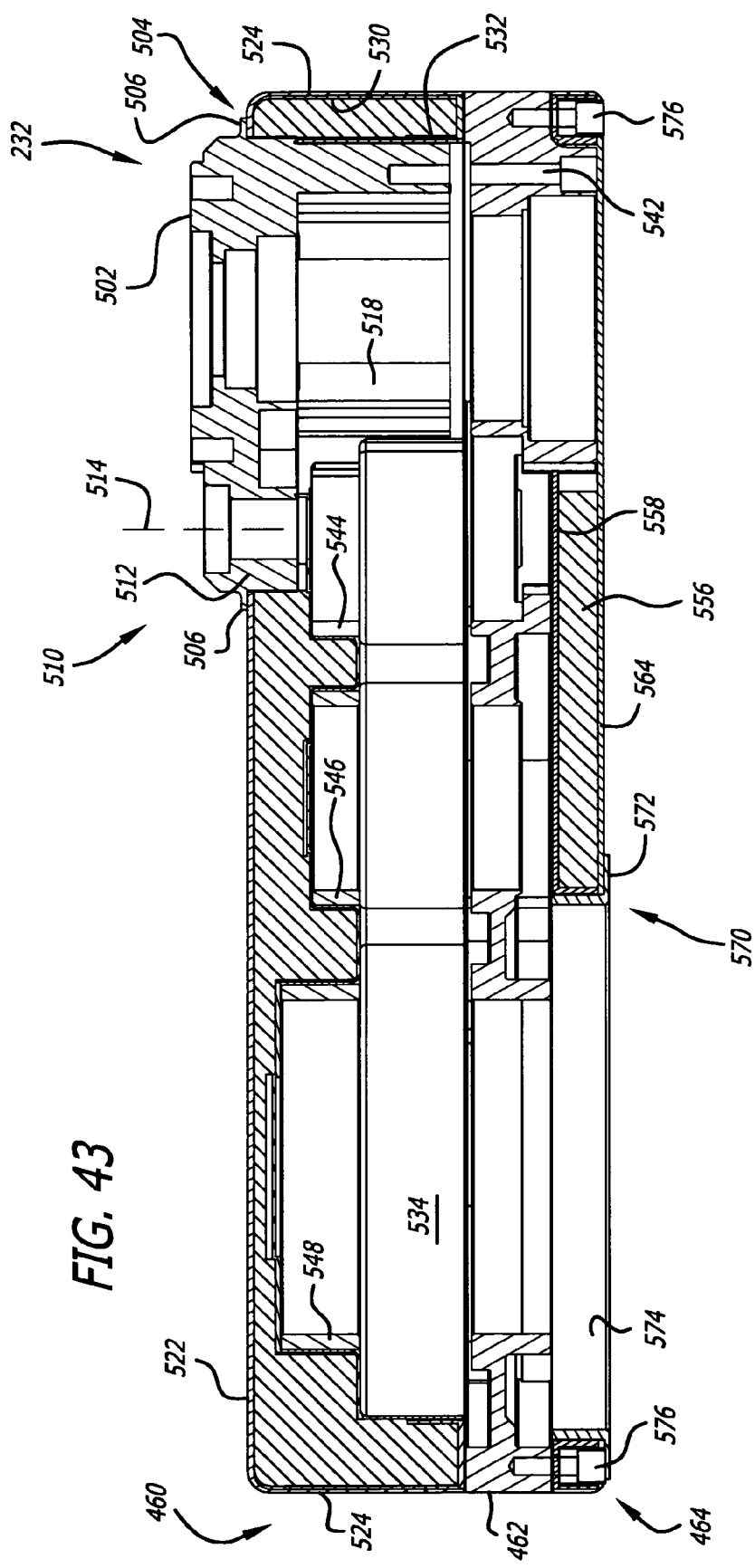
FIG. 43 is a longitudinal section through the gear box of FIG. 40.
Figure 44:
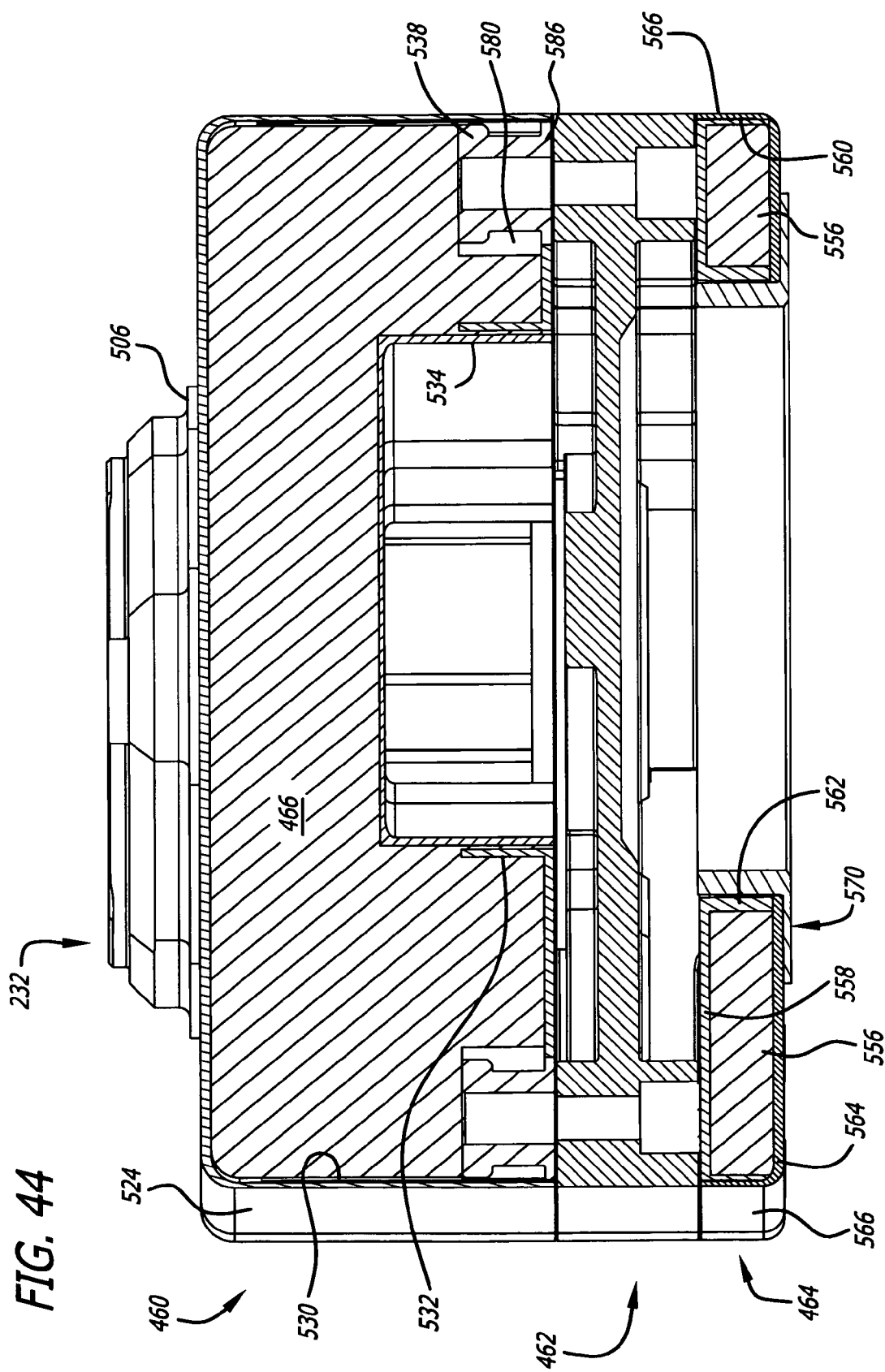
FIG. 44 is a transverse section through the saw blade drive shaft output portion of the gear box of FIG. 40.

The gearbox includes a splined input shaft 230 (FIG. 10) engaging a complementary surface on the main drive shaft in the bearing housing 142 from the hydraulic drive motor for driving the saw blade. The shaft 230 extends into the gearbox as described more fully below. The gearbox housing includes a metal insert or hub insert 232 (FIGS. 10 and 43) bonded into the gearbox housing 234 for mounting the gearbox to a corresponding mounting surface 235 (FIGS. 13 and 14) in the bearing housing so that when the worm mating gear 177 turns, the gearbox turns at the same time to position the blade as desired.

Figure 8:
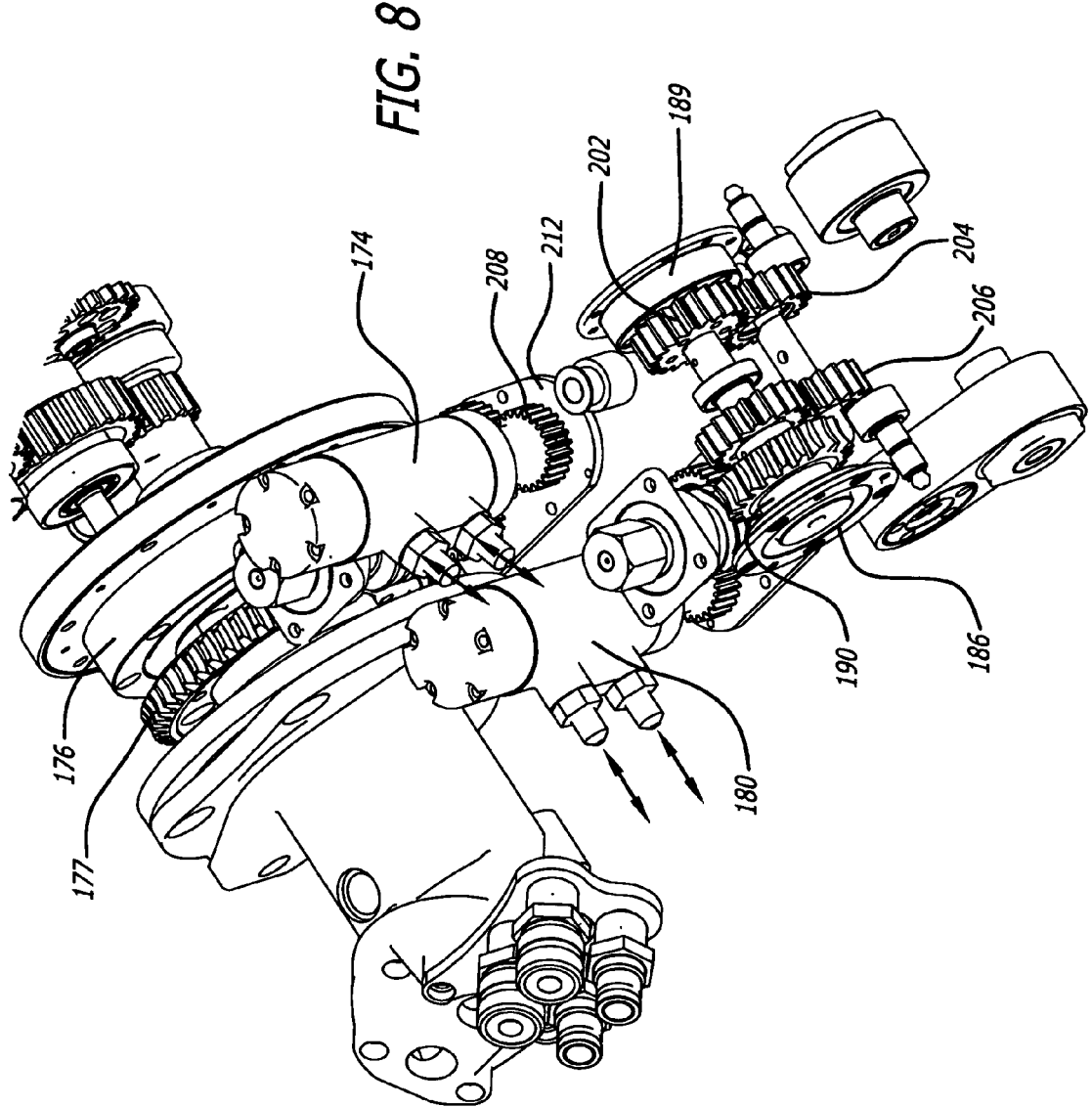
FIG. 8 is an upper right rear isometric view of FIG. 7.
Figure 9:
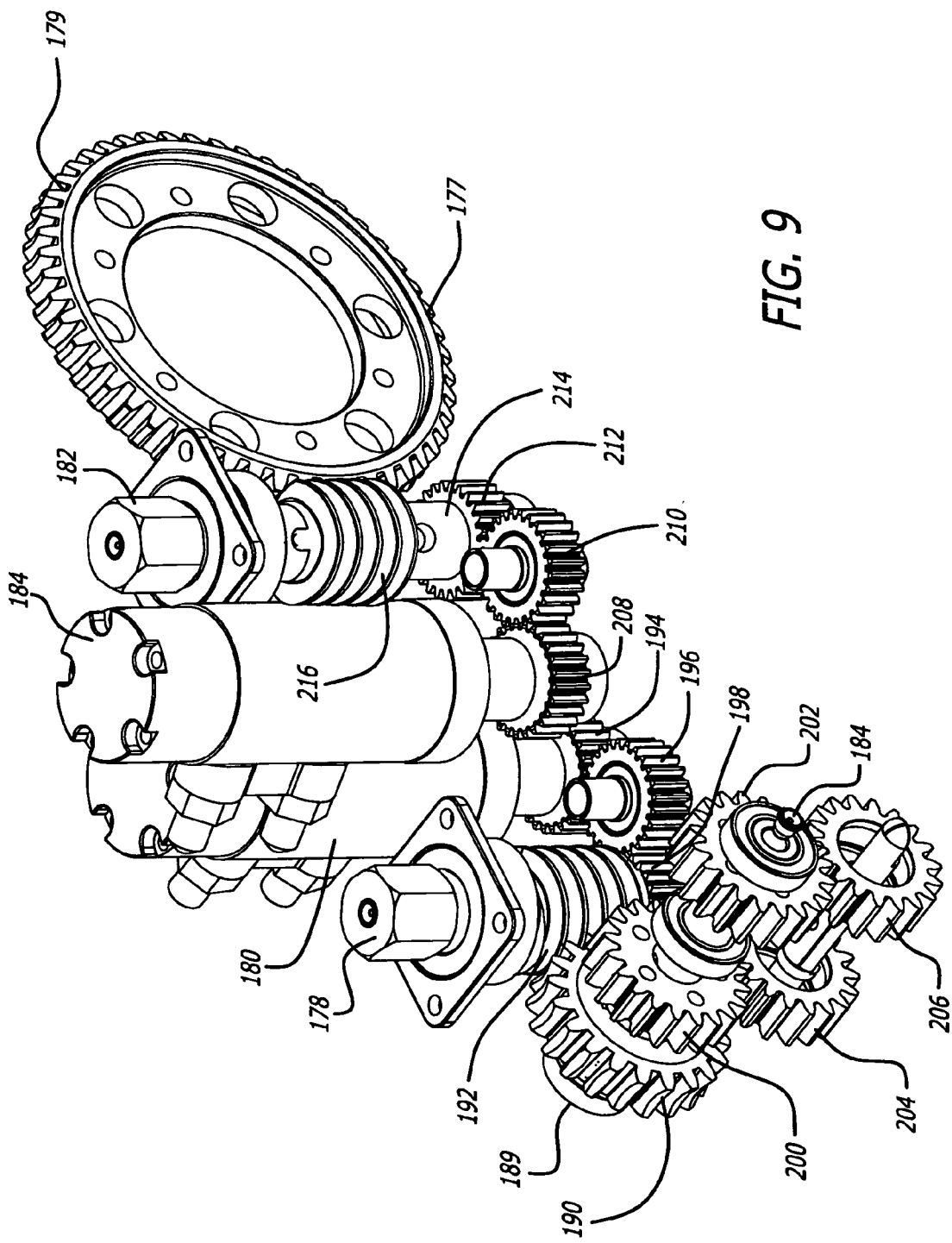
FIG. 9 is an upper left rear isometric view of the travel drive assembly and the blade height drive assembly of the saw of FIG. 3.

The blade guard level control includes a follower one inch pitch diameter pinion gear 236 (FIGS. 10, 12, 15 and 17–18) running on a stationary 5.2 inch pitch diameter ring gear 238 fixed within the bearing housing to the support 176 (FIGS. 5, 10, and 8). The follower gear 236 is mounted on a shaft 240 (FIG. 13) supported on bearings, which in turn are supported by the gearbox. The shaft 240 drives a blade guard level control gear train 241 (FIG. 10), and includes on the opposite end of the shaft 240 a one inch pitch diameter gear 242 (FIG. 14) that drives a first 2.2 inch pitch diameter gear 244, which in turn drives an identical second 2.2 inch pitch diameter gear 246. The second gear 246 drives a third 2.2 inch pitch diameter gear 248, which in turn drives a 5.2 inch pitch diameter ring gear 250, resulting in a gear ratio from the bearing housing to the blade guard support of 1:−1. Therefore, as the gearbox rotates through action of the worm follower gear 177 to raise or lower the saw blade, the blade guard stays level with the work surface. Each gear is supported on a respective shaft supported by a pair of bearings.

The main drive shaft 252 from the hydraulic motor passes through a bearing which supports an external shaft 254 (FIG. 12), which in turn supports the worm follower gear 177 so that the main drive shaft 252 can rotate independently of the worm follower gear 177. The main drive shaft 252 drives a saw blade drive train 255 (FIG. 10) and engages the splined shaft 230 (FIGS. 13–18), which includes a 1.5 inch pitch diameter gear 256 and a bearing 258 (FIGS. 14, 15) for supporting the splined shaft. The gear 256 drives a 2.7 inch pitch diameter idler gear 260, which in turn drives a second 2.7 inch pitch diameter idler gear 262, which then drives the 4.7 inch pitch diameter output gear 264. The resulting gear ratio is 3.512:1, which produces a relatively high torque given the geometry constraints of the gearbox, the gear sizes and weights, and the like. The gear 264 is fixed to and drives the blade output shaft 266 (FIGS. 17 and 19) supported by first and second bearings 268 and 270. Each gear is supported on a respective shaft supported by a pair of bearings.

Figure 19:
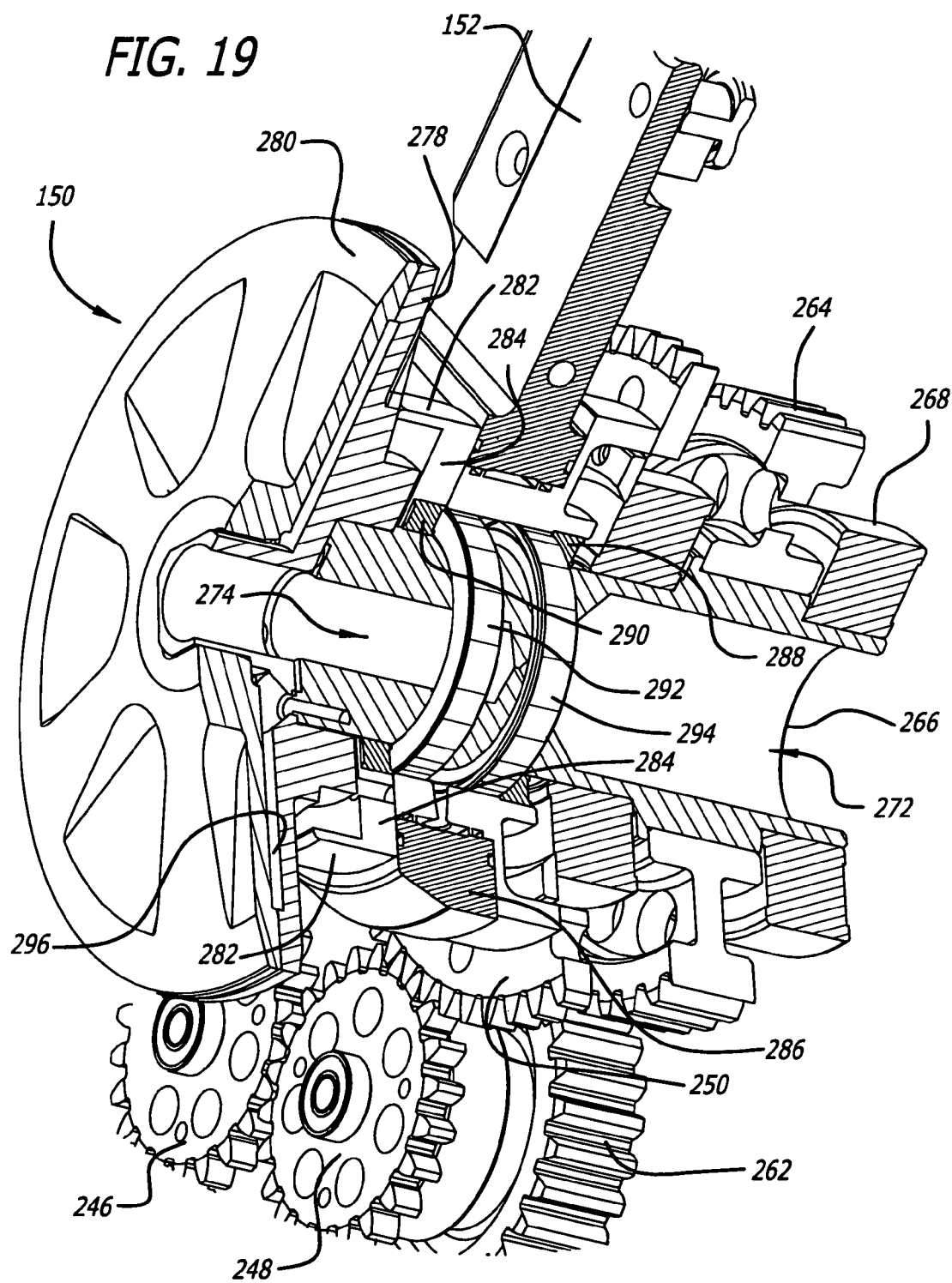
FIG. 19 is an enlarged view and partial section of the saw drive shaft and blade flanges.

The blade output shaft 266 is preferably substantially hollow over a significant length of the shaft (FIG. 19). The shaft includes a first bore 272 having a relatively large diameter greater than approximately half the overall diameter of the shaft, about which the gear 264 is mounted. The bore 272 extends approximately half the length of the shaft. The other half is substantially solid except for bore 274 for receiving the blade mounting bolt 276 (FIG. 4) for mounting the inner blade flange 278 and the outer blade flange 280 to the output shaft 266. A blade flange seal 282 extends outwardly to the inner blade flange 278 for sealing with the blade flange. The blade flange seal 282 is supported by a blade guard mounting bracket 284, which also supports a blade guard coupler 286. A first bearing 288 and a second bearing 290 extend between the blade output shaft and the bracket 284. The ring gear 250 is mounted to the bracket 284 so that ring gear 250 and gear 264 are supported on a common shaft. The first and second bearings 288 and 290 each extend on the outer side of respective fluid seals 292 and 294. Fluid passes between the seals and around the output shaft and through a number of openings axially along the output shaft to the space 296 between the inner and outer blade flanges. The blade shaft may be formed from 416 stainless steel or from titanium, as with the other titanium parts described herein.

A movable machine, for example the wall saw described herein, can be configured so that one or more components can support a number of gears having different functions where two of the gears are supported on a common axis, for example on a common shaft. The common shaft can support a first gear having a first function and also support a second year having a second function. For example, the first gear can drive a machining tool, for example a saw blade, and the second gear can move a second element, for example adjust the position of a blade guard. The first gear can be mounted to a first gear support and a second gear support can be provided coaxial with the first gear support for supporting the second gear. Multiple pairs of gears can be mounted on respective coaxial supports, conserving space and possibly reducing overall weight.

Gears 236, 242 and 260 (FIG. 21) are supported on a common shaft and gears 248 and 262 (FIGS. 17 and 19) are also supported on a common shaft. These gears and shafts include four bearings, such as shown in FIGS. 17–20 and also 21. As shown in FIG. 21, gear 236 is supported on shaft 240, which also supports gear 242. The shaft is supported in the gearbox by respective bearings 300 and 302, and the shaft 240 also supports bearing 304, which in turn supports a coaxial shaft 306. The coaxial shaft 306 is supported in the gearbox by first and second gears 308 and 310, respectively, and the coaxial shaft supports gear 260. A similar arrangement is used for gears 248 and 262.

The wall saw and other movable machines can be formed from a composite fiber material (described more fully below) along with inserts that are non-reactive or only slightly reactive with the composite fiber material. Where the composite fiber material comes into contact with other components, such as inserts, the components can be formed from titanium or aluminum to reduce the possibility of galvanic action. Where such components bear significant loads, the components can be formed from high strength titanium or aluminum, for example titanium 6AL-4V or 2024 T351 hard anodized aluminum. Other materials can also be used. The metal parts coming into contact with the composite fiber material is preferably formed from one of these materials.

The gears are preferably formed from 86L20 alloy or the equivalent and heat treated. The alloy is preferably heat treated to a case depth of 0.020 to 0.035, surface hardness of approximately 58R/C and core hardness of between 35 and 45R/C. The part is sub-zero cooled to within a range of minus 100 degrees Farenheit to minus 150 degrees Farenheit for a period of two hours starting within 20 minutes of the quench from the high temperature. The other metal parts may be formed from aluminum, 2024 T351 hard anodized, but they may also be made from other materials, including titanium 6AL-4V. The inserts and other metal components supporting the greatest loads are preferably formed from titanium, while the other inserts are preferably formed from the hardened aluminum.

Movable machines can be improved by forming one or more components with a fiber reinforced material, for example carbon fiber or other fiber reinforcement. The specific examples provided herein are directed to carbon fibers, and the discussion herein will be directed to carbon fibers. However, it should be understood that other fiber reinforcement can be used either in place of or in addition to carbon fiber reinforcement. In the example of a wall saw, that undergoes significant loading in a number of directions, the carbon fiber may be most efficiently laid out in an 8 harness configuration. Other movable machines can use the same configuration or simpler configurations specifically tailored to the component.

In the example of a wall saw, the skin is 0.060 inches thick where the skin bears a load, and possibly thinner if there is reduced load or little or no load bearing function in the skin. Two or more skins can be overlapped and bonded together to provide additional strength in those directions in which the skins extend. The greater the overlap, the greater the strength, and the greater surface area provided for bonding, if desired, which also adds strength. Overlapping skins can occur at natural surface transitions, such as beginning or ending at corners, or they can occur at other locations as determined during design. In one configuration, overlap and bonding of overlapped skins is provided to the maximum extent possible for a given direction, and possibly as much as 100 percent. In the example of a wall saw, a carriage for the wall saw may have two side walls joined by an intermediate platform, and outer skins for each of the side walls may extend and overlap across part or all of the platform, preferably 100 percent. The bonded overlap provides enhanced strength in the carriage. Other areas of overlap can benefit from increased overlapping distance, and other components can also benefit from overlap of composite skins, extended or otherwise.

Movable machines can also benefit from use of fiber reinforcement in one or more components, for example forming housings or support structures. The housing can have straight and flat or planar walls, without any surface undulations, or they can have undulations in the walls to accommodate loads having components in more than one direction. For example, a portion of a surface can extend in one direction while a portion of an adjacent surface extends in another direction. For example, in a wall saw such as that describe herein, the carriage includes a side wall extending from one end first outwardly then inwardly while an adjacent surface portion extends outwardly from the inwardly extending portion. In one configuration, the outwardly extending portion is complementary to or symmetrical with the inwardly extending portion. Other configurations of surface undulations can be used.

Where a fiber-reinforced material is used as part of a movable machine, a UV absorbing material is preferably included in the fiber reinforced material to reduce any deteriorating effect of UV radiation on the fiber reinforced material. The UV absorbing material may be incorporated into the plastic before hardening, or applied as a coating before the component is finished.

For the wall saw described herein, at least one of the housings (FIGS. 22A–22D), and preferably several, and more preferably each of the housings are formed from fiber reinforced plastic. Examples of housings and other components formed from fiber reinforced plastics are discussed in more detail below, and in the context of the wall saw described herein, components of the wall saw are preferably formed from composite materials in the form of fiber reinforced plastics and also a body layer of foam. In one example, the foam is a closed cell foam, and may be as much as 96 to 98 percent closed cell, but could be as low as 60 percent. The combination of a fiber reinforced skin and an underlying body layer provides strength to the combination and impact resistance for the skin. The skin and the adjacent surface of the body layer are preferably configured so as to allow a 0.005 inch gap or other suitable gap between the adjacent surfaces for application of a bonding or adhesive agent. Where the skin is provided with curves or undulations or "bump outs" or "bump ins", the underlying foam body is preferably machined or otherwise configured to conform to the curvature of the adjacent skin surface, maintaining the desired gap for the bonding agent. Additionally, the same housings are preferably formed with a plurality of inserts that can be used to support, mount or otherwise serve as an interface for metal or other components of the machine. The carriage housing 350, bearing housing 352 and transfer housing 354 are preferably formed with composite skins of carbon fiber and thermoplastic resins such as epoxy resin. The housing skins may then be coated with a UV absorbing paint.

Figure 26:
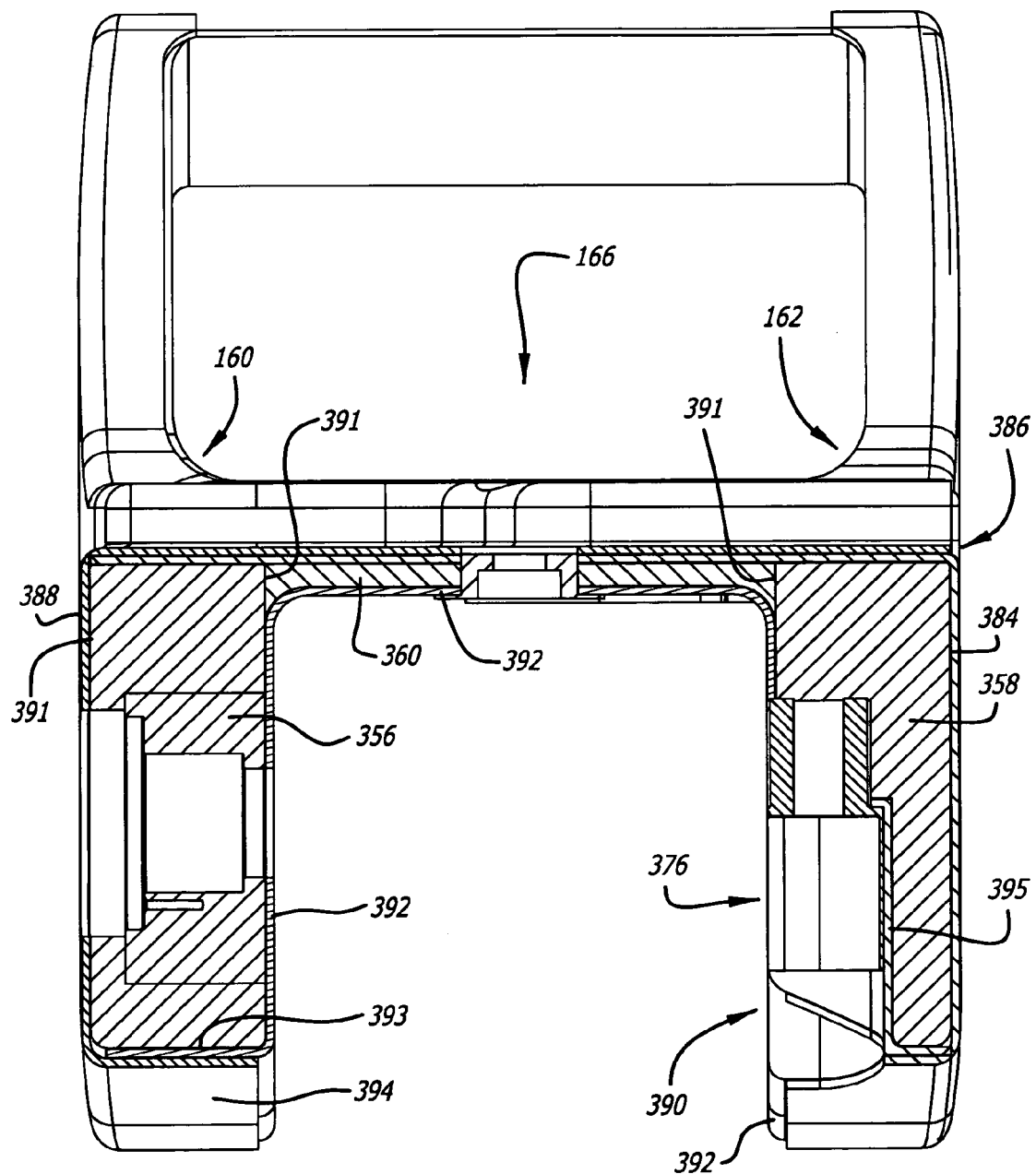
FIG. 26 is a vertical transverse cross-section of the carriage of FIG. 24 taken along line 26—26.

Considering one example of the carriage housing 350 in more detail, the carriage housing is preferably formed from three milled closed cell foam sections, including a right side section 356, a left side section 358 and a center section 360. Each of the foam sections is milled precisely to fit within the skins of the housing, for example leaving an approximately 0.005 inch space for adhesive on all surfaces between the foam and the skin. The left and right side foam sections extend to the bottom surface of the top carriage skin, and the center section preferably meets the sides of the right and left side sections, as shown in FIG. 26. It should be understood that any given foam section can be configured to be assembled from two or more individual sections. However, it is preferred that the number of individual sections forming the core is minimized. Any joining foam surfaces between one foam section and another is preferably sealed with a suitable adhesive, preferably about 0.005 inch thick and possibly up to about 0.010 inch thick. For example, adhesive 362 is applied between the joining surfaces between the left side section 358 and the center section 360 and between the center section 360 and the right side section 356 (FIG. 26). Additionally, if a given foam section is formed as multiple sections, they are preferably joined together with a suitable layer of adhesive.

Where the carriage is formed at least partly from a fiber reinforced material or a composite material, inserts may be used to accept fasteners or other components to more reliably secure the fastener or the component relative to the material. In one example, floating head inserts are used in conjunction with the material to allow fasteners to be reliably secured in the material. Other inserts can be used having a number of configurations, surface features, compositions and the like. The inserts, and especially floating head inserts, may have an upper rim approximately the same thickness as that of the fiber reinforced material and may extend into the underlying foam body layer. A portion of the foam adjacent the insert may be removed, including a portion of the foam extending under the adjacent fiber reinforced material, and a hardening plastic injected in the void to secure the insert in place. The hardening plastic may be the same material has the bonding material used between the fiber skin and the foam body.

Figure 28:
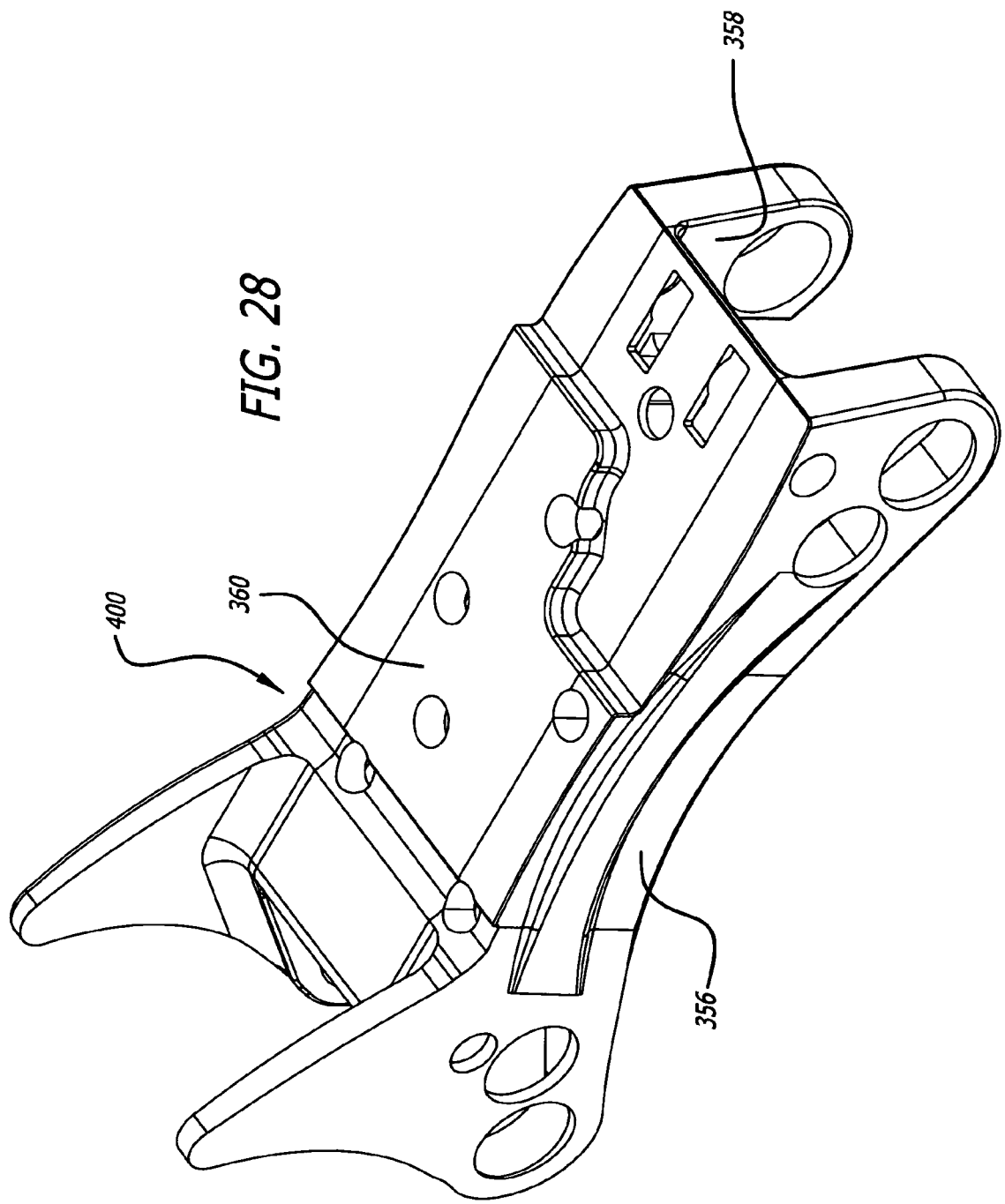
FIG. 28 is an upper right isometric view of a foam assembly for use with the carriage of FIG. 23.
Figure 29:
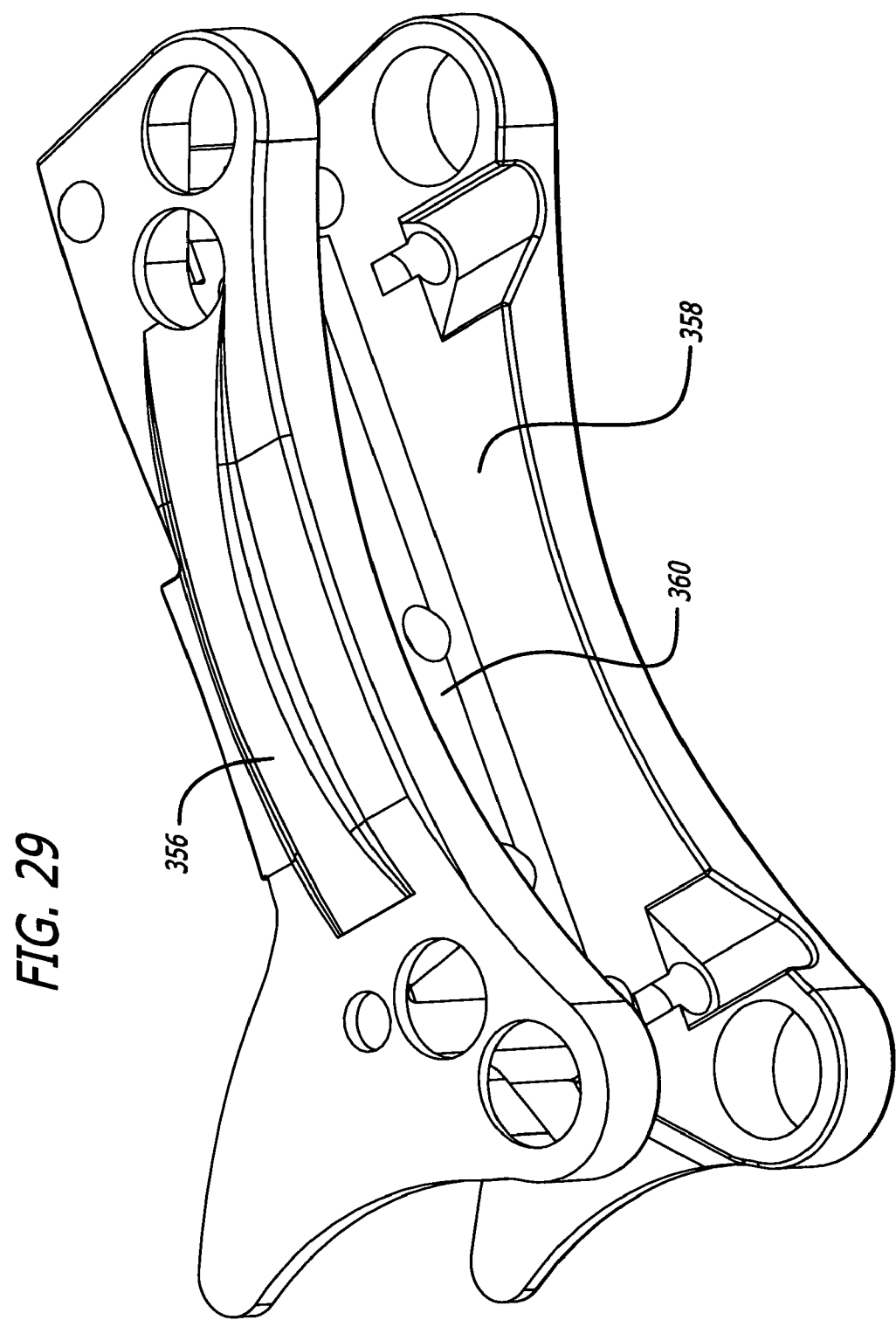
FIG. 29 is a lower right front isometric view of the foam assembly of FIG. 28.
Figure 30:
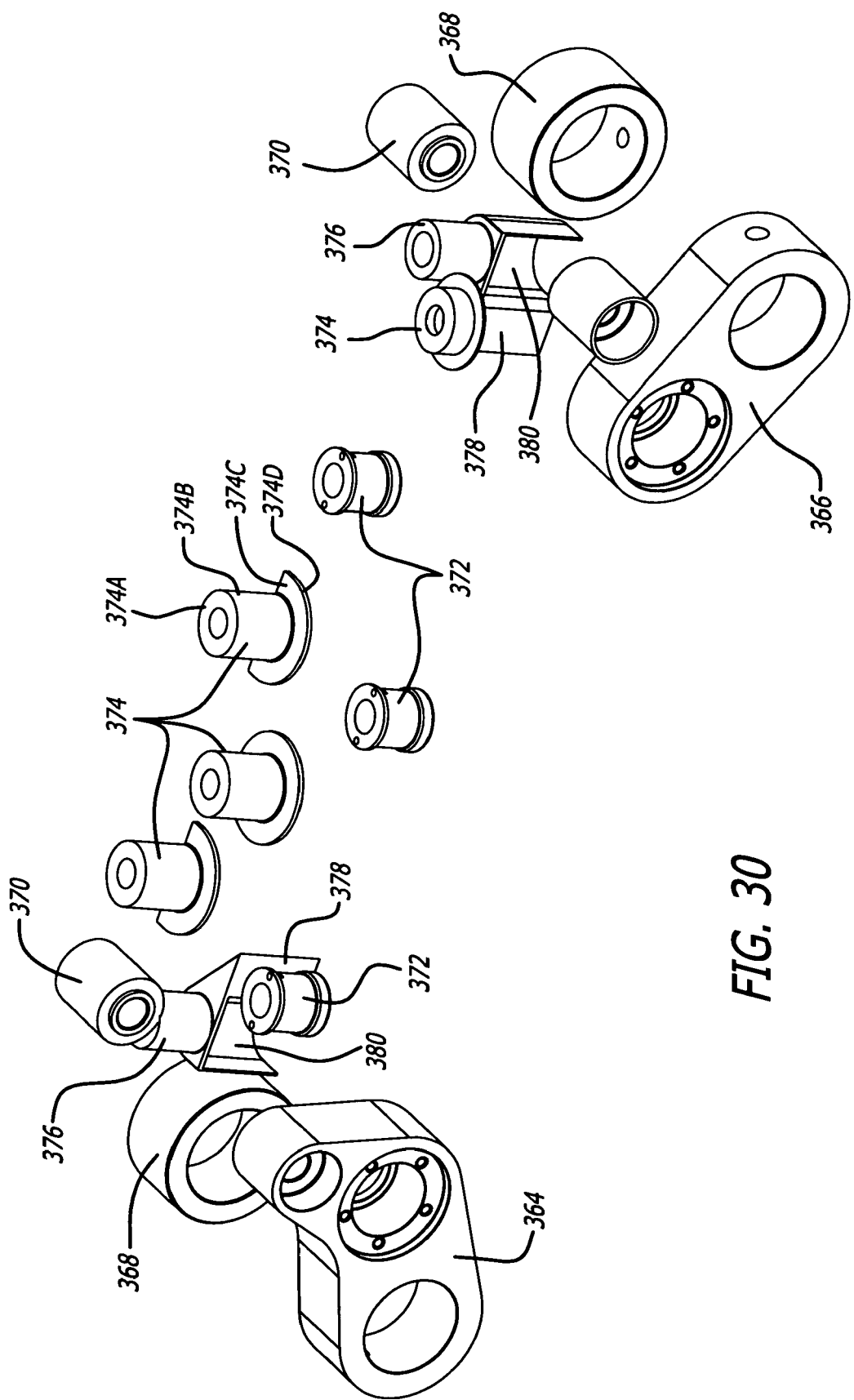
FIG. 30 is an upper right rear isometric view of inserts for the carriage of FIG. 23.
Figure 31:
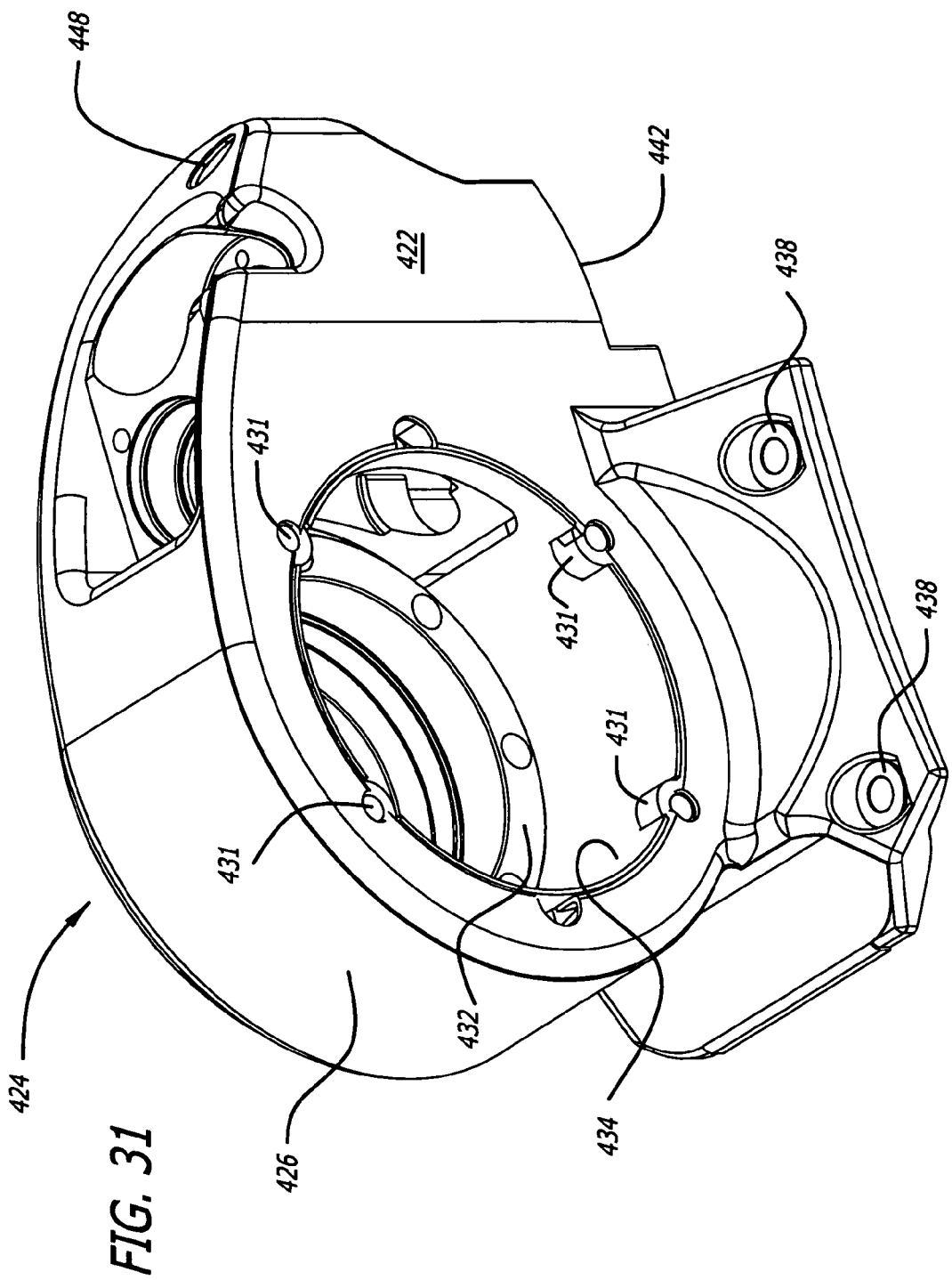
FIG. 31 is an upper right front isometric view of a bearing housing for the saw of FIG. 3.
Figure 32:
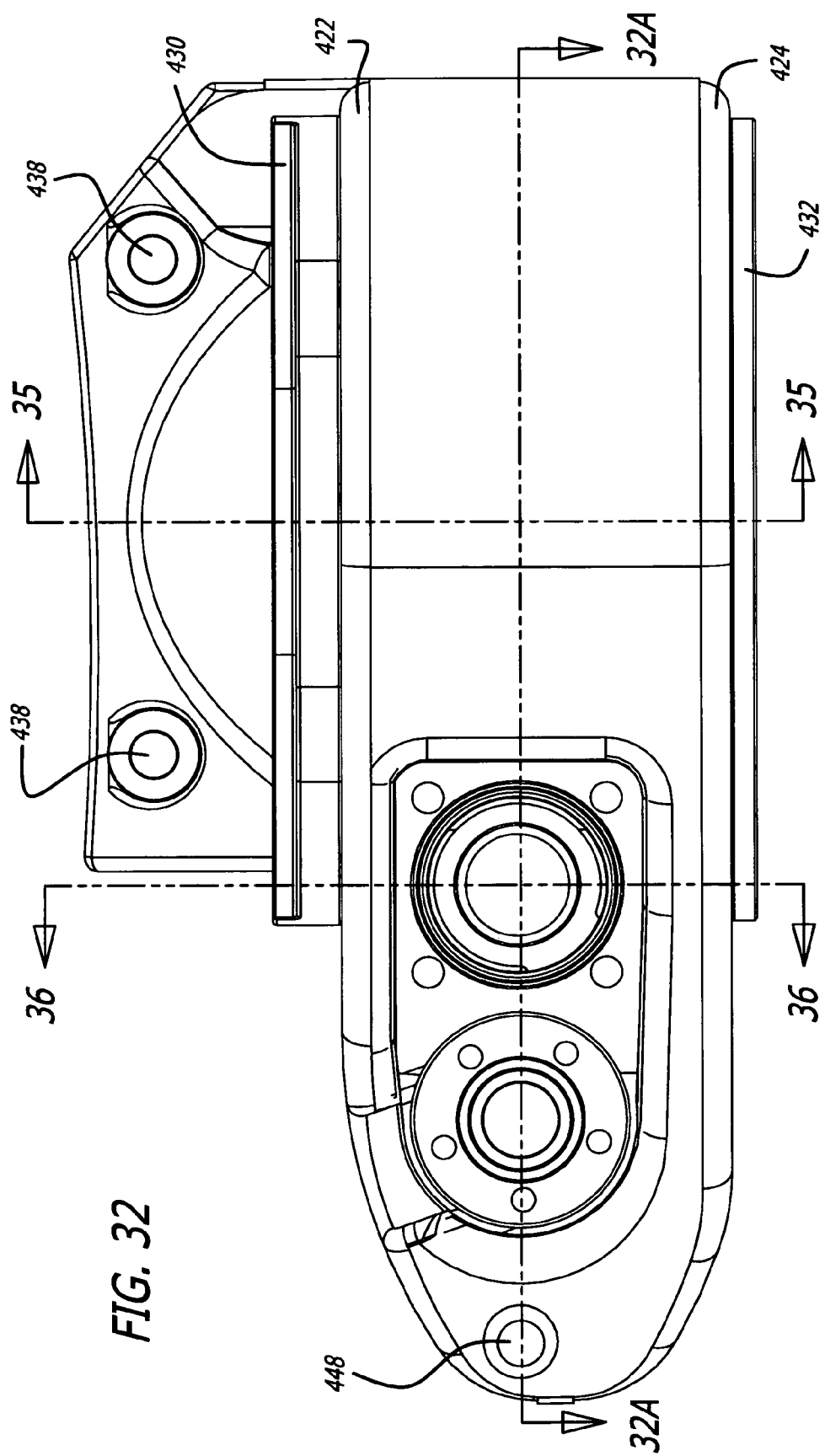
FIG. 32 is a top plan view of the housing of FIG. 31.
Figure 32A:
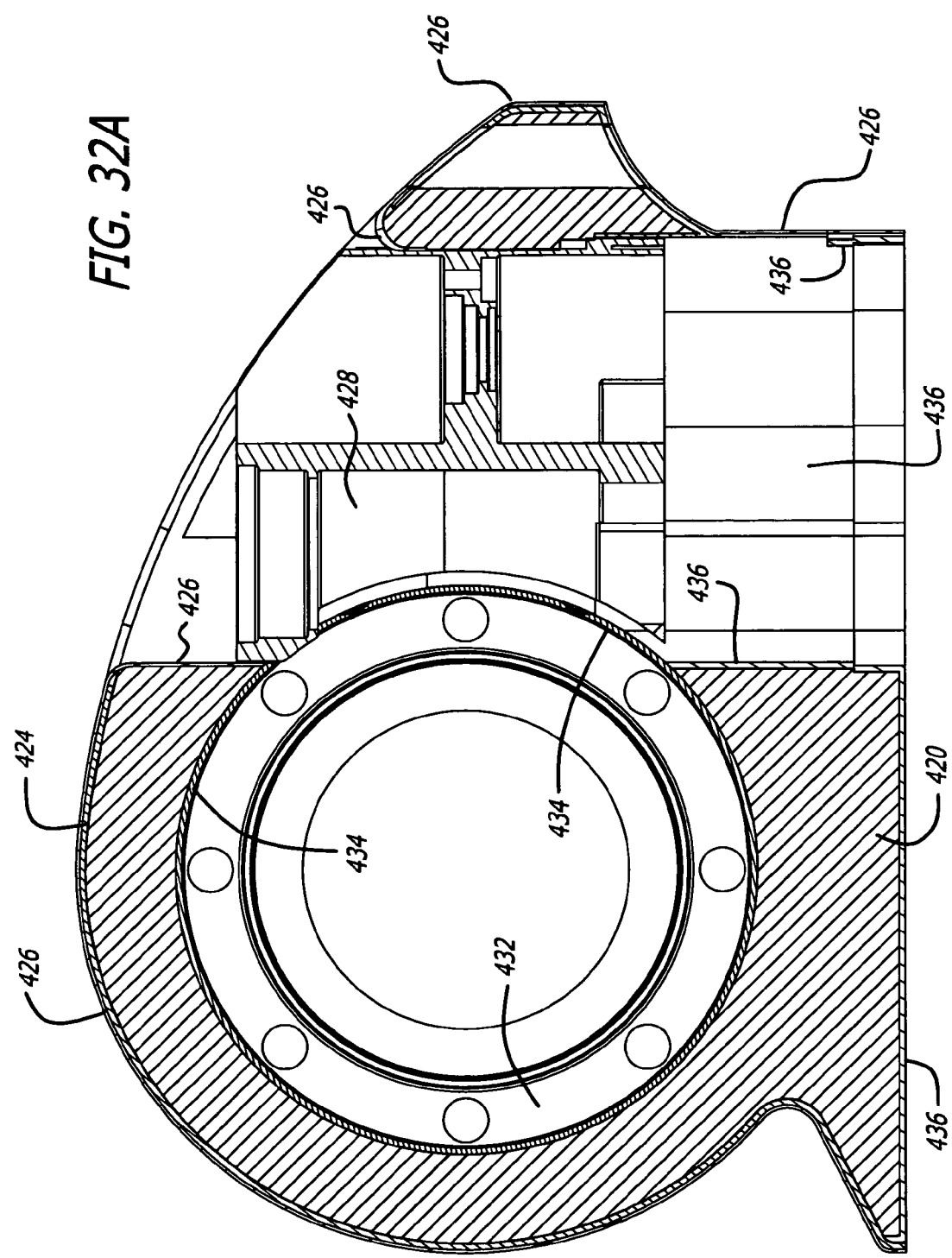
FIG. 32A is a section of the housing of FIG. 31 taken along line 32A—32A in FIG. 32.
Figure 33:
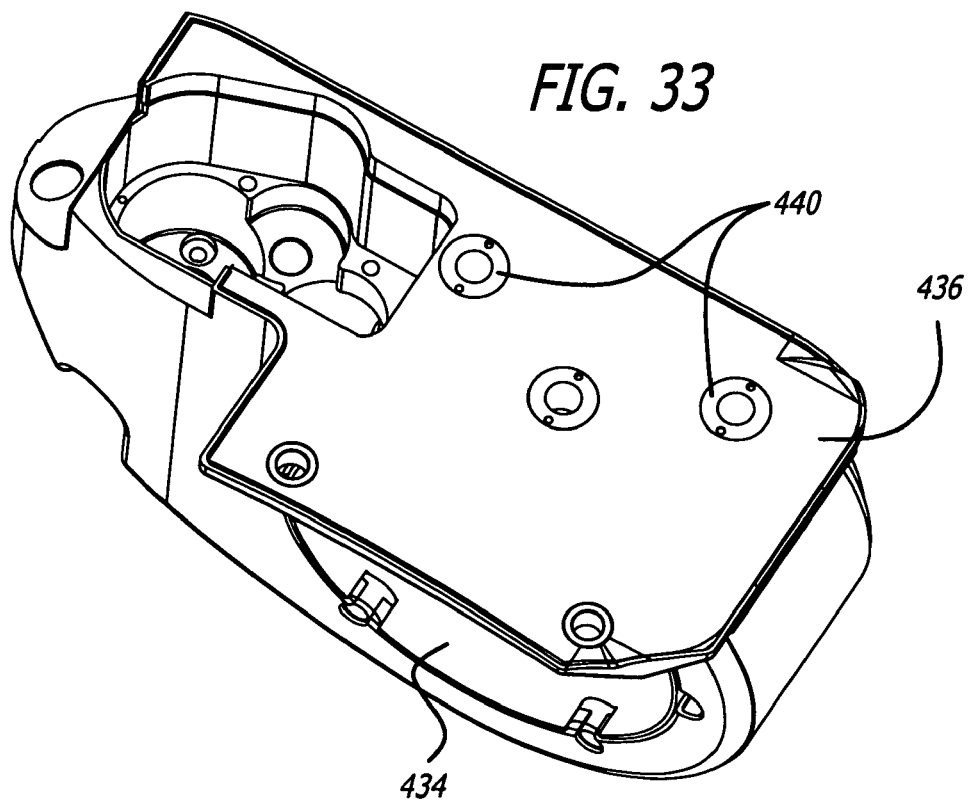
FIG. 33 is a bottom and right side isometric view of the housing of FIG. 31.
Figure 34:
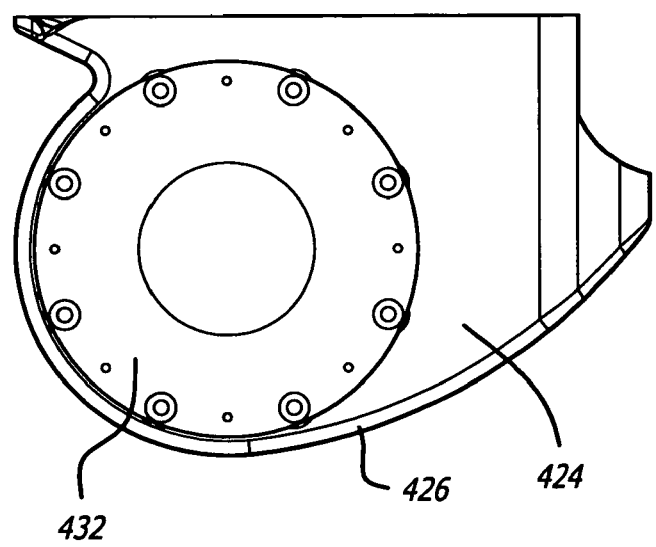
FIG. 34 is a left side elevation view of the housing of FIG. 32.
Figure 35:
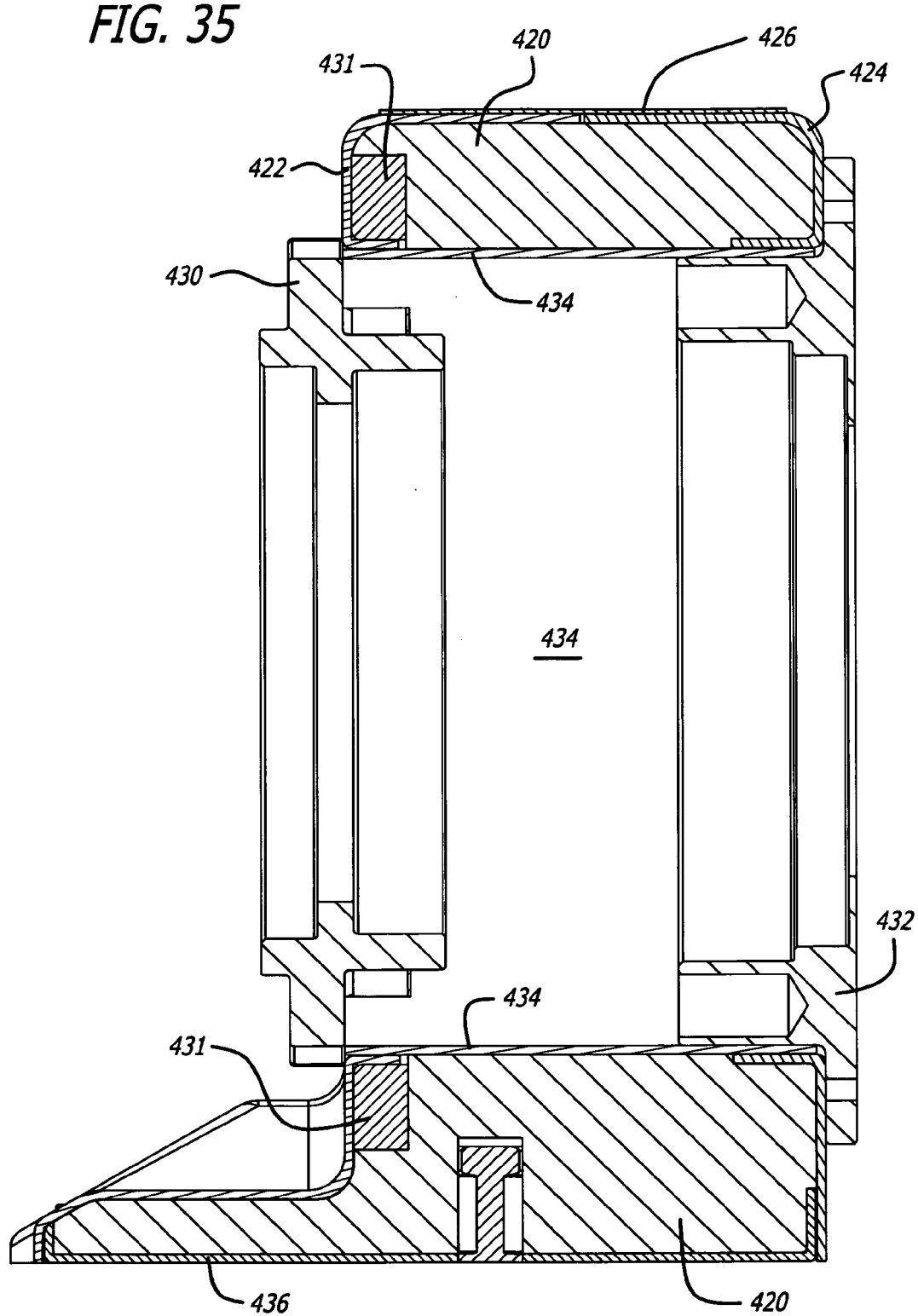
FIG. 35 is a vertical transverse section of the housing of FIG. 32 taken along line 35—35.

The carriage preferably includes a plurality of metal inserts for receiving moving components and/or fasteners or other components that do not bond or adhere well to the foam or the skin, but are more secure in the carriage using metal inserts. The inserts are preferably titanium 6AL-4V or hard anodized 2024 T351 aluminum bonded in place with a suitable adhesive. As shown in FIGS. 30—30, the carriage inserts include roller inserts 364 and 366, roller inserts 368 and roller inserts 370 for accepting roller and bearing assemblies for supporting the carriage on the track during operation. The carriage inserts may include heli-coil or re-thread inserts but preferably use floating head inserts 372 for receiving aluminum or other fasteners. The floating head inserts 372 are preferably substantially identical in geometry and are used wherever practical for receiving and securing fasteners or other components. Examples of the installation of floating head inserts are provided below in conjunction with the gear box. The carriage also includes cap screw inserts 374, preferably having identical geometries, and having flanges for providing greater strength and support (see FIGS. 22D and 30). The carriage may also include roller supports 376 having a flange 378 and a hemi-cylindrical wall 380 for providing added support and strength. Wherever any surfaces of the inserts are adjacent a foam surface or a skin surface, a suitable layer of adhesive is preferably applied in between to bond the inserts to any adjacent surface. As shown in FIGS. 28 and 29, the openings for receiving the cap screw inserts and the floating head inserts have foam surfaces to which adhesive is applied for bonding to a conforming skin portion, and adhesive is applied to the insert when the insert is secured in the appropriate cavity in the carriage. For example, adhesive is applied to the base surface 374A, the cylindrical surface 374B, to the lower rim surface 374C, and to the perimeter rim surface 374D. Similar comments apply to other inserts for the various housings. While it is preferred to have a skin layer between any foam and an adjacent insert, especially where significant loading occurs, sometimes an insert can be bonded to a foam surface. In any case, insert surfaces adjacent either a foam surface or a skin surface have an adhesive layer applied to bond between the insert surface and the adjacent surface. Therefore, for example, the wall 380 (FIG. 30) of the insert 376 is adhered to the adjacent skin surface, which in turn is adhered to the adjacent foam surface, for support and strength. Likewise for the other surfaces of the inserts adjacent foam, and for the insert surfaces adjacent skin. The inserts can take a number of forms, preferably increasing the surface area of contact and also increasing the shear strength. For the fastener inserts, for example, the inserts may be formed with flanges extending over the skin surface opposite the direction from which the fastener is received. Alternatively, the ends of the insert may be flush with the foam surfaces and the adjacent skin extend over the ends of the insert to the opening of the insert, or the flanges may be flush with the skin surface. In this configuration, the sides of the insert are bonded to the foam and the ends of the insert are bonded to the overlying skin surfaces.

The carriage housing 350 is particularly suited to include fiber reinforced walls on the sides of the carriage which extend outward, then inward for a substantial length of the carriage, followed by an outward extension and a shorter inward extension at the other end. The curvature in the sides of the carriage provide strength in the sides to counteract possible flexing in the side walls. Additionally, a "bump out" extending outward from a mid-portion of the side provides strength to counter forces tending to push the inward extension of the wall further inward. The bump out provides suitable reinforcement when it is complementary to or symmetrical with that adjacent portion of the side wall extending inwardly.

Figure 6:
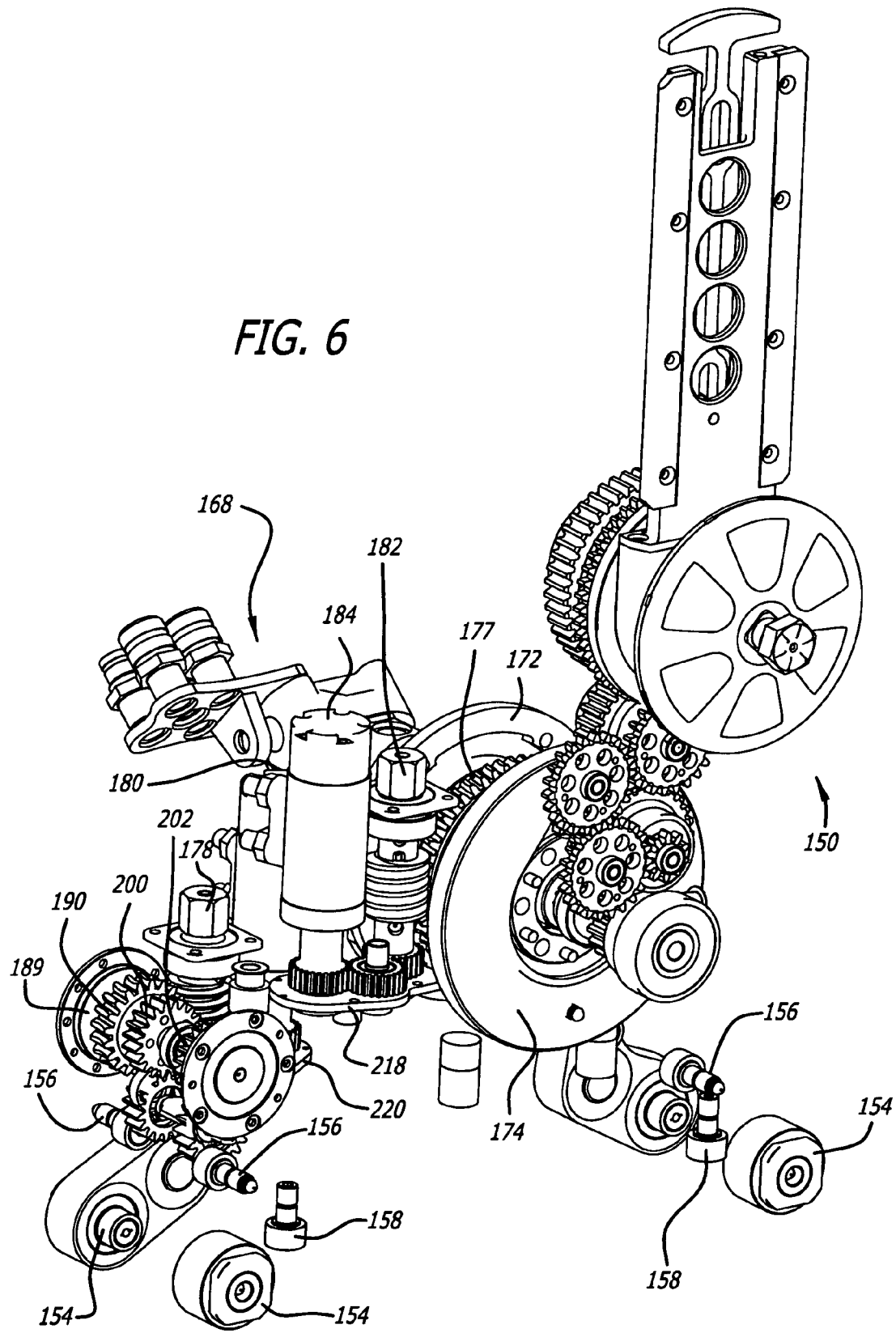
FIG. 6 is a left side and front isometric view of the saw of FIG. 3 showing the working components of the saw and housing components in phantom.
Figure 7:
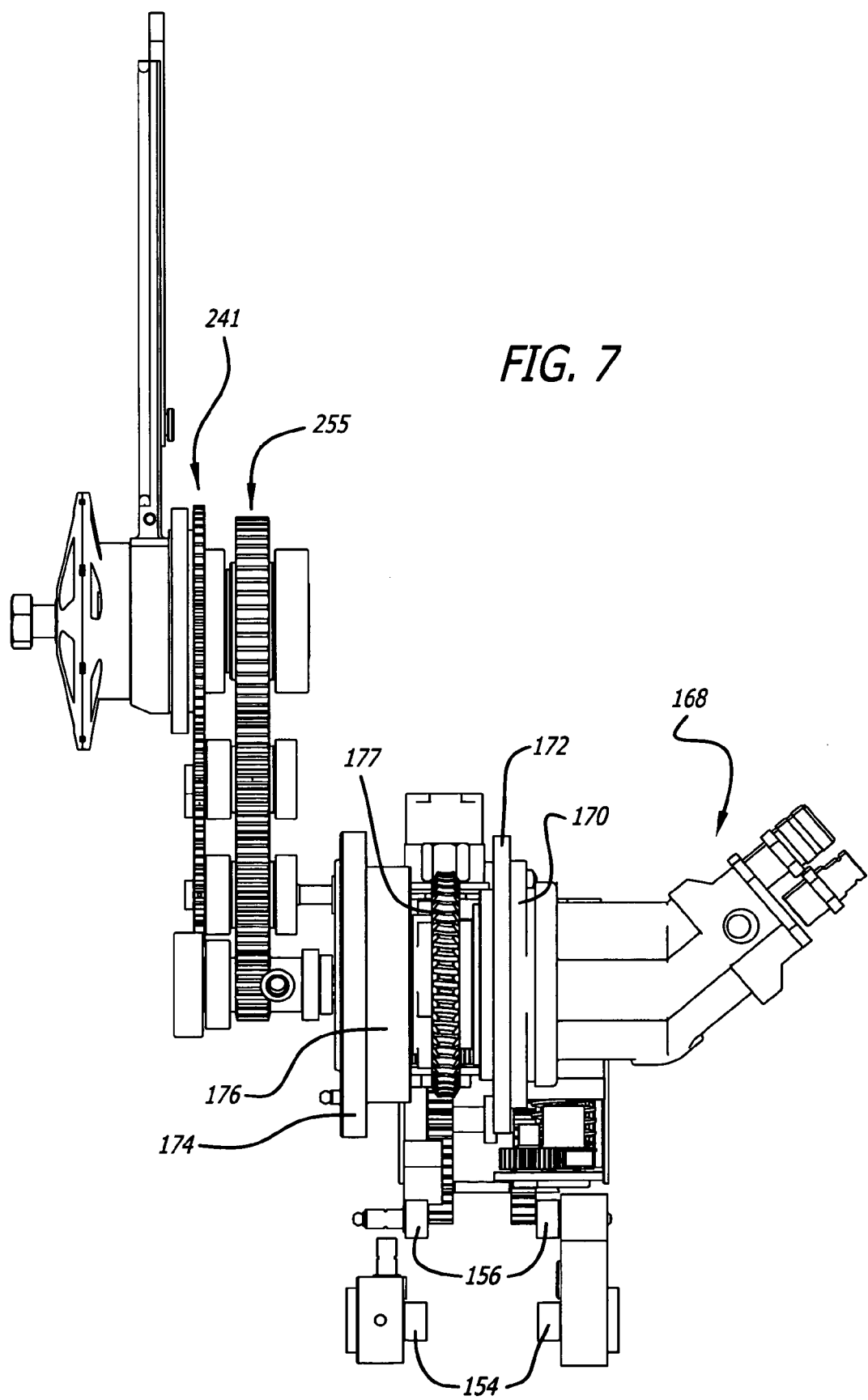
FIG. 7 is a rear elevation view of some of the working components of the saw of FIG. 3.

The carriage housing 350 includes the right side portion 160, as viewed from the front, having a right rear segment 160A and a right front segment 160B. The right rear and front segments of the housing include respective openings for receiving the inserts for the rollers and bearings (154 and 156 in FIGS. 3–6) for maintaining the carriage on the track. The left side portion 162 includes a left rear segment 162A and a left front segment 162B. The front and rear segments 162B and 162A also include openings for respective rollers and bearings for supporting the carriage on the track. The openings 162C and 162D receive the inserts 376 (FIG. 30) for the vertical rollers 158 (FIGS. 5 and 6).

The right and the left side portions of the carriage housing support the platform 166 (FIG. 30), which in turn supports the bearing assembly 142, the travel assembly 144 and the gear box, blade and blade guard. The platform 166 includes an upper platform 166A and a lower platform 166B. The upper platform 166A generally supports the bearing assembly, while the lower platform 166B generally supports the transfer housing. The lower platform 166B a right drive gear opening 166C and a left drive gear opening 166D extending through the rear of the platform to allow the drive gears to extend through the platform. The pair of drive gears allow the saw to be used on a single rack track and repositioned to travel in either direction.

The upper platform 166A includes floating head inserts 372 and cap screw inserts 374 for securing the bearing housing in the transfer housing on the carriage. The floating head inserts 372 receive and secure fasteners from the bearing housing and the transfer housing, while the cap screw inserts 374 receive cap screw fasteners from underneath the platform extending into corresponding floating head inserts in the bearing housing.

Figure 24:
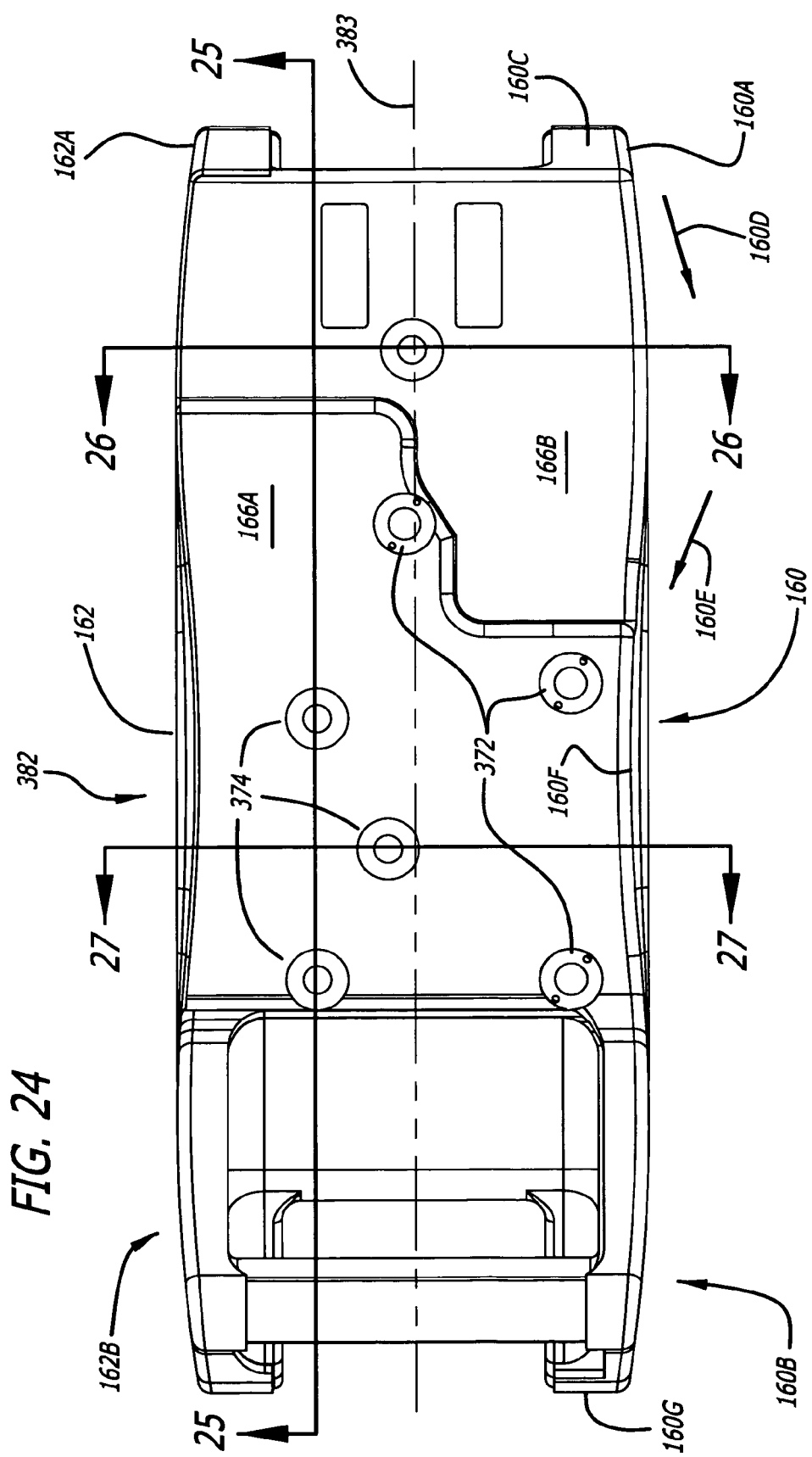
FIG. 24 is a top plan view of the carriage of FIG. 23.

As shown in FIGS. 24 and 27–29, the sides of the carriage are preferably curved inward in a vertical plane centered along a vertical axis at approximately the center 382 of the length of the carriage. The sides of the carriage are also preferably curved in a horizontal plane centered along a longitudinal or horizontal transverse axis 383, as can be seen in FIG. 24. The curvature, including the combined curvature, provides increased strength and structural support for the carriage.

In the wall saw carriage having depending side walls, one or more areas of curvature or non-planar surface are designed into the side walls so that the side walls are no longer perfectly planar. The direction of curvature is selected as a function of the anticipated loading in the side wall. In the carriage side walls, the rearward and forward side wall portions 160A and 160B and 162A and 162B deflect outwardly under loading while the saw blade is cutting. Because the saw blade is positioned to the side of the wall saw, and because the cutting is rotational, significant twisting loads are developed in the carriage that tend to deflect the carriage side walls as the rollers on the inside surfaces of the side walls engage the track. Therefore, portions of each carriage side wall are curved in areas to withstand the anticipated loading during operation.

Figure 23:
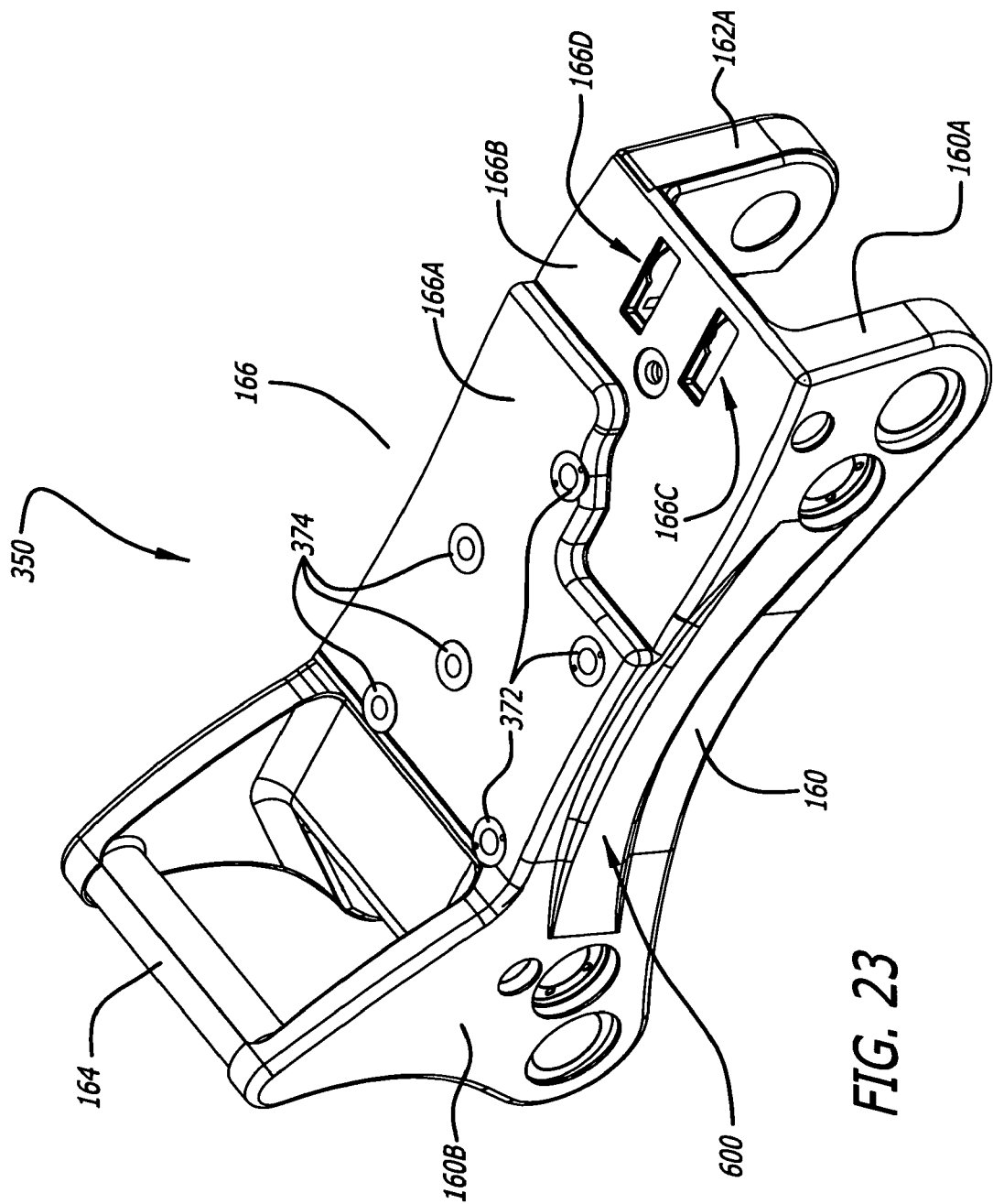
FIG. 23 is a right rear isometric view of a carriage for use with the saw of FIG. 3.

The strength in carbon fiber skins occurs in the direction in which the carbon fibers extend. In other words, structural support in carbon fiber skins is parallel to the skin surface. Therefore, the skins are preferably configured so that the carbon fibers extend in the direction in which the loading is expected. In each side wall of the carriage, the side wall skin can extend in a flat plane, and greater strength in the side wall can be achieved by increasing thickness or the number of carbon fiber layers in the skin. Additionally or alternatively, the side wall skins can be configured to include curves in the direction of the anticipated loading. As best seen in FIG. 23 the rear side wall section 160A extends outward from the end surface 160C in the direction of arrow 160D (shown exaggerated in FIG. 23) to resist outward deflection of the rear side wall section. The rear side wall section 160A then extends inward in the direction of arrow 160E toward the central portion of the side wall 160 to a point 160F approximately aligned with the end surfaces 160C and 160G. The side wall 160 then curves outwardly and inwardly to the forward end surface 160G in the same manner. The outward curvature at the rear and forward side wall sections 160A and 160B help to resist deflection of the side walls. The opposite side wall 162 follows the same contour.

The carriage sides include a reinforcement portion 600 (FIG. 23). The reinforcement portion 600 reinforces the center portion 160F on the right side, and a complementary reinforcement portion reinforces the center portion of the left wall 162. The following description will be directed to the reinforcement portion 600 on the right side wall 160. Where loading may occur in planar walls that have curves incorporated within them, such as the curves in the right side wall 160, reinforcement portions such as reinforcement 600 are included. The reinforcement portions 600 in the configuration shown in FIG. 23 extend away from the side wall 160 in a direction at least partly opposite a direction in which the side wall is curving inward (for example at least partly opposite direction indicated by arrow 160E). The reinforcement portions 600 extend outward from the longitudinal axis 383 approximately the same distance that the rearward and forward side wall portions 160A and 160B are spaced from the axis 383. The reinforcement portions may also be formed to extend outward a sufficient distance to be symmetric with the inward extension, or to extend inward a sufficient distance to be symmetric with an outward extension. The reinforcement portions 600 help to reduce inward deflection of the side walls around the center points, such as center 160F. The reinforcement portions provide additional structural strength to the side walls and therefore the main rollers on the inside surfaces of the side walls. More generally, the reinforcement portion provides additional strength to those wall portions where the wall geometry changes, such as a curve inward, a curve outward, a change in direction, or the like.

Reinforcement is provided to the side walls, as well as other structures in the wall saw, by changing the direction of fiber orientation in the fiber skin. For a given surface configuration, such as a planar surface, it may be desirable to change the directions of the fiber orientation to enhance the load bearing characteristics of the fiber skin, such as through a bump out or a bump in. In the example shown in FIG. 23, the reinforcement portion extends outwardly from the face of the side wall, and also follows an arc generally following the arcing lower edge of the side wall. If the side wall is divided into thirds longitudinally, the arcing reinforcement portion extends from the rearward third to the forward third and across the entire length of the center third portion of the side wall.

In keeping with the preference for the load bearing fiber skins to be 0.060 inch thick and the underlying adhesive to be 0.005 inch thick, the fiber skins and any base layers such as foam segments and inserts to which the fiber skins may be bonded are preferably designed to close tolerances. Other design features for the skins and foam segments are described more fully below.

The skins of the carriage, as well as the skins of the other housing components, are preferably formed from a carbon fiber composite with the epoxy resin, the skins having the characteristics set forth in the table below. The skins are preferably formed to maximize strength, durability and structural integrity. In one example, the left skin 384 is preferably formed to have a J-shaped cross-section at many of the vertical or transverse locations along the skin (see FIG. 26) so as to allow overlapping or lap joints 386 with adjacent skins, such as the J-shaped right skin 388. The long legs of each J overlap and are bonded together, and the bottom portions of each J form the side walls. The short legs of each J overlap with an under skin, described more fully below. A 0.005 inch gap designed into the skins is filled with a suitable adhesive to bond the lap joints or other joints. In the example shown in FIGS. 26–27, the lap joints are substantially continuous about each laterally-extending wall of the skins forming the lap joint, except for those locations where openings are formed for receiving inserts or other components, such as opening 390. Overlap is preferably maximized to the extent possible under the circumstances, for example the lap joint 386 having about 100% overlap. To the extent that a given surface on the carriage or other housing is not straight, the overlapping surfaces of the skins follow the contour, thereby enhancing the integrity of the structure.

Generally, the carriage housing as well as the other housings described herein, as assembled, form composite structures wherein the joined materials and surfaces will often include a first skin adjacent and preferably overlapping a second skin and between which an adhesive layer is applied. The second skin is adjacent a portion of foam core material and an adhesive layer is placed between the two. Additionally, an adhesive layer 391 (FIGS. 25–27) is placed between the outer skin wall and the adjacent foam wall, and an adhesive layer 391 is placed between the opposite skin wall and the adjacent foam surface. An adhesive layer 391 is also placed between adjacent foam portions. The top surface of each foam section also includes an adhesive layer between it and the adjacent surface of the fiber skin 388, and an adhesive layer is placed in the lap joint 386 between the center skin and the top horizontal surface of the left skin. Consequently, an adhesive layer surrounds the foam core portion and also extends between the lap joints to provide strength and structural integrity. Similar structures exist with other combinations of foam, skin and lap joints to form a housing for supporting machine components. The adhesive layers are preferably 0.005 inch thick.

Figure 20:
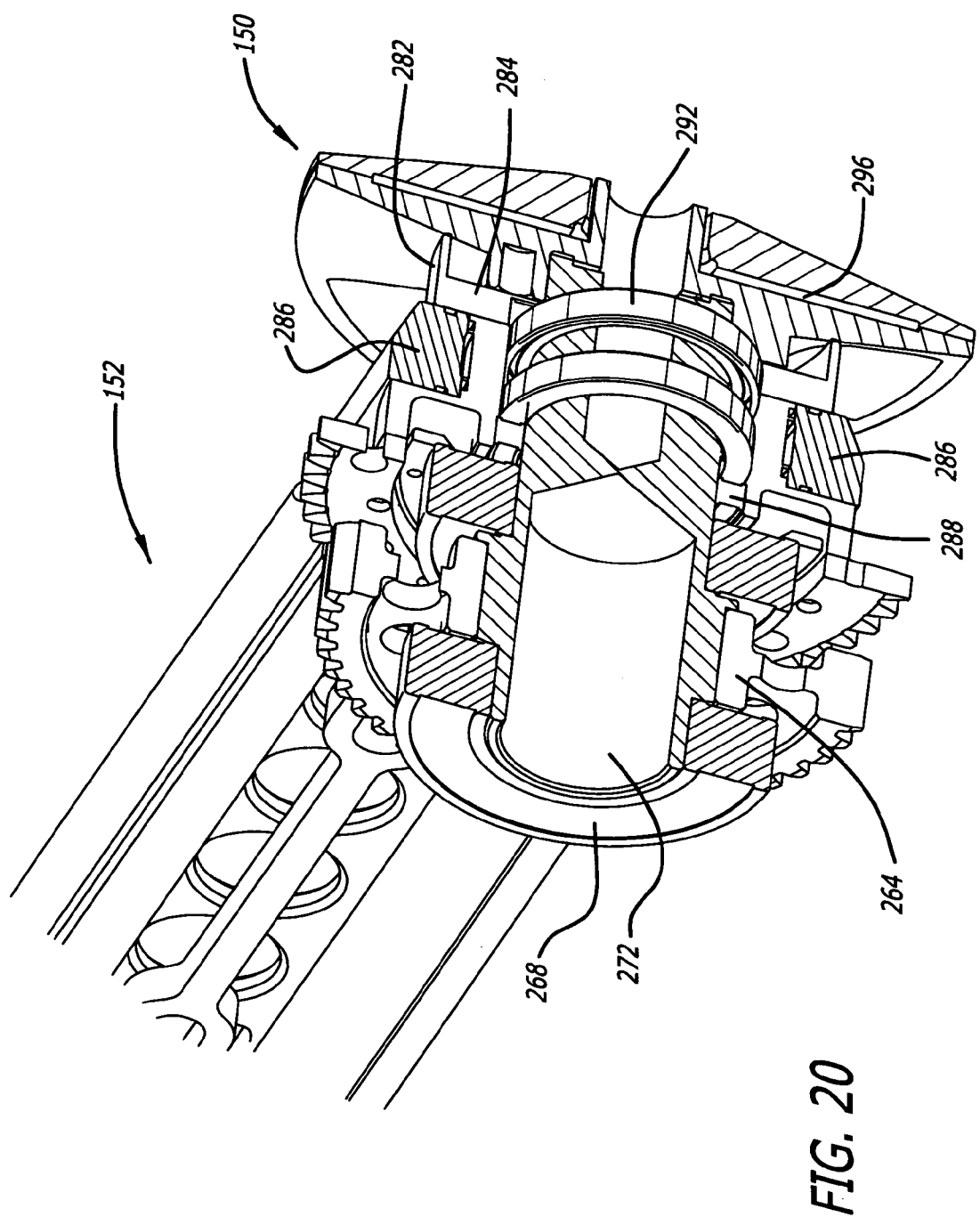
FIG. 20 is a transverse cross-section and isometric view of the saw blade drive shaft.
Figure 21:
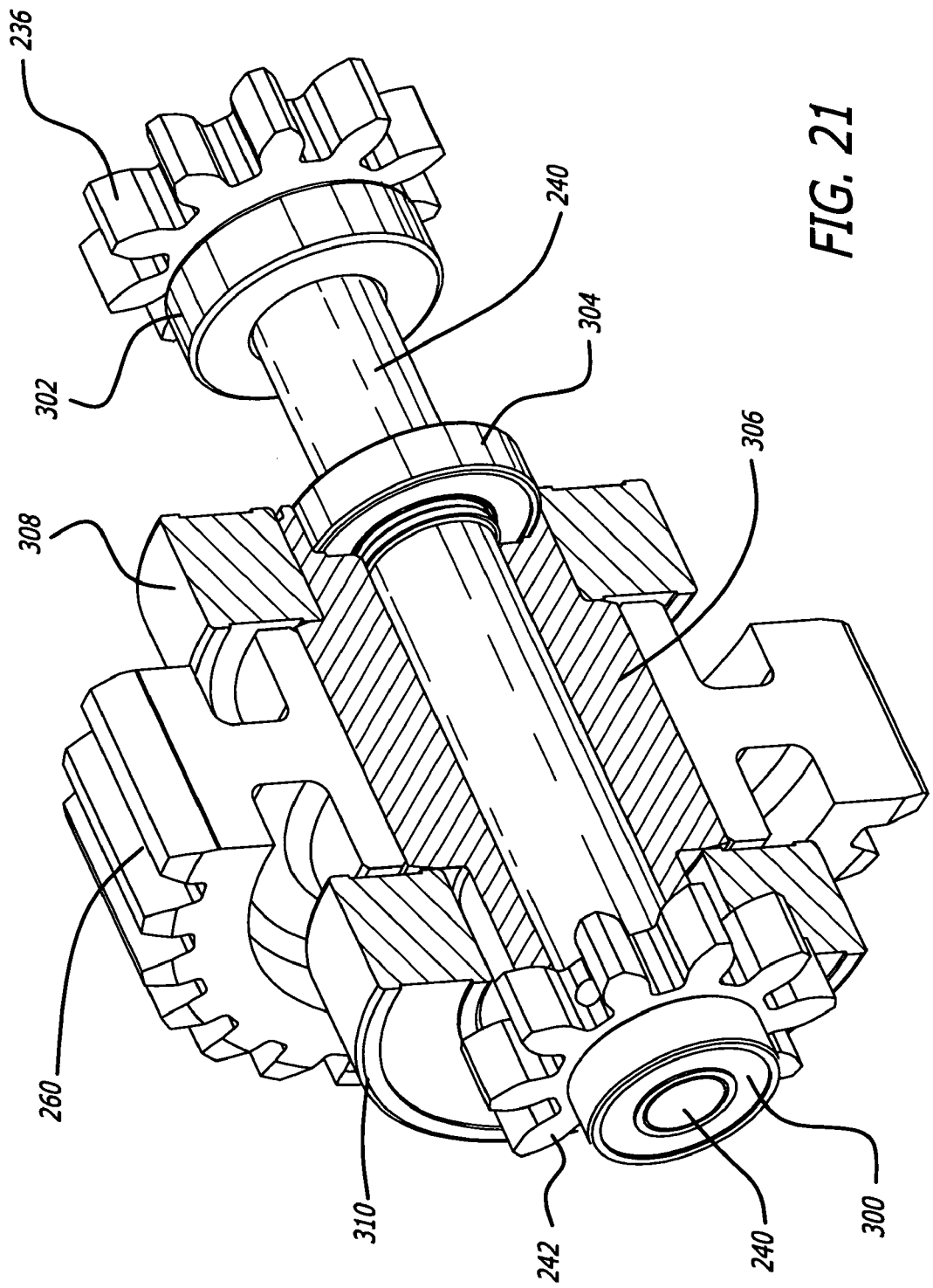
FIG. 21 is an isometric and partial sectional view of one of the saw blade drive gears and the blade height position gears supported on a common shaft.

As can be seen in FIGS. 19 and 20, the right side wall 160 of the carriage is formed from the right skin 388 adhesively bonded to the right foam section 356 as well as being formed from part of the overlap 386 between the right side skin 388 and left side skin 384 (not including those portions forming the handle and handle mounting bracket). The right side wall is enclosed on the inside by an inner skin 392 bonding to the adjacent surface of the right foam section 356. The inner skin 392 conforms to the surface of the underside of the carriage. The inner skin 392 includes a first under lap skin portion 393 bonded to the bottom surface of the right foam section 356 and extending from the inside surface of the right foam section 356 to the outside surface. The short leg 394 of the right side skin 388 overlap the skin portion 393 and is bonded thereto through adhesive. The short leg 394 preferably overlap's the skin portion 393 approximately the entire width of the right side wall 160, and preferably between 50 percent and 100 percent of the width. At the overlap of skins 393 and 394, there are a number of structural layers, starting with skin 394, followed by the adhesive layer and skin 393, which is then followed by another adhesive layer and then a bottom of the right side foam section. The overlapping skin construction preferably extends about the entire perimeter of the right side wall 160, as well as the entire perimeter of the left side wall 162. For the platform 166, the overlap occurs through the long legs of the side skins, whereas the lower, front and rear perimeter portions provide an overlap between the side skins and the inner skin 392. The skin overlap for the platform preferably extends substantially the entire length of the platform, as shown in FIG. 25, the overlap occurring primarily in the area supporting other components.

Figure 25:
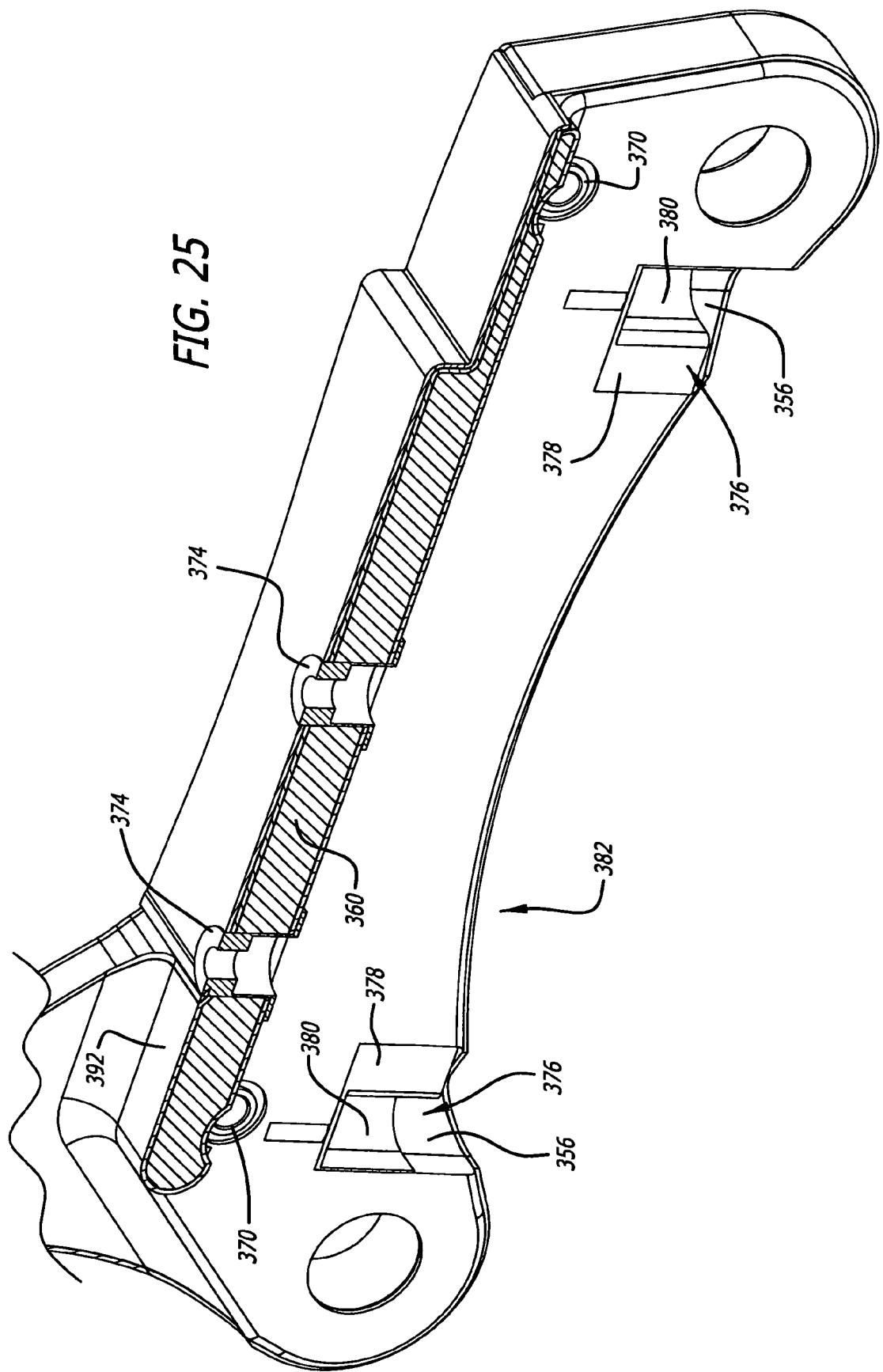
FIG. 25 is a vertical longitudinal cross section of the carriage of FIG. 23.
Figure 27:
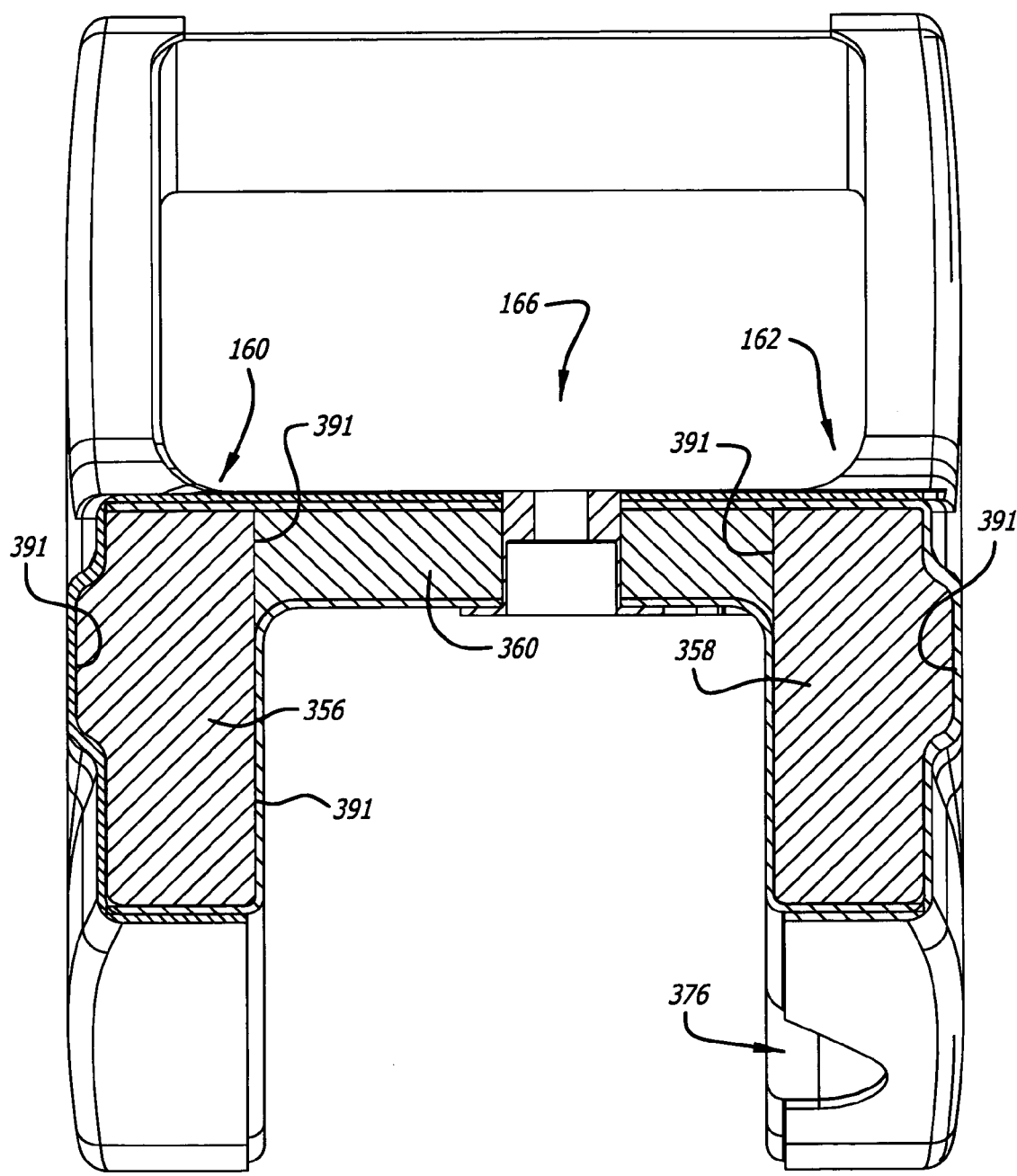
FIG. 27 is a vertical transverse cross-section of the carriage of FIG. 24 taken along line 27—27.

In areas of discontinuities, such as the opening 390, the inner skin 392 preferably includes cavity skin portions 395 extending inwardly to define the cavity for receiving the appropriate insert, for example insert 376 shown in FIGS. 25–27. As shown in FIG. 25, the skin portion 395 includes a vertical wall and an under lap portion to be adhered to adjacent surfaces of the left foam section. The under lap portion bonds to the adjacent surface of the short leg of the left side skin 384 in that area of the short leg that remains adjacent the opening in the short leg formed in the skin to accommodate the insert. To the extent possible, all inserts are bonded to adjacent surfaces, which are preferably fiber reinforced skin surfaces. The skins are preferably of uniform thickness over the entire area of the skin, including at transitions, curves, corners and the like.

The body layer in the wall saw carriage is formed from the right, left and middle foam sections, 356, 358 and 360, respectively (FIGS. 28–29). Each section is machined to close tolerances to provide the 0.005 inch spacing for adhesive when the foam sections and skins are assembled with the adhesive between. Therefore, each foam section is machined to dimensions that are 0.005 inch inside the adjacent skin surface. Various openings are provided for the inserts and other components, and the surface transitions are also provided for the side wall curves and reinforcing sections. Edges are sufficiently rounded to accommodate transitions in the skin surfaces, for example corners, curves and the like. A channel 400 (FIG. 28) is provided to accommodate inter-leaving and overlapping of the long legs of the side skins as they joined and are bonded to the inner skin extending rearward from the front of the carriage and the skins extending downward from the handle. Part of the overlap can be seen in FIG. 25. Saws and other movable machinery can be made lighter and stronger using such fiber composites and foam layers or bodies for supporting the fiber composites, particularly where the assembly includes bonded layers.

Figure 14:
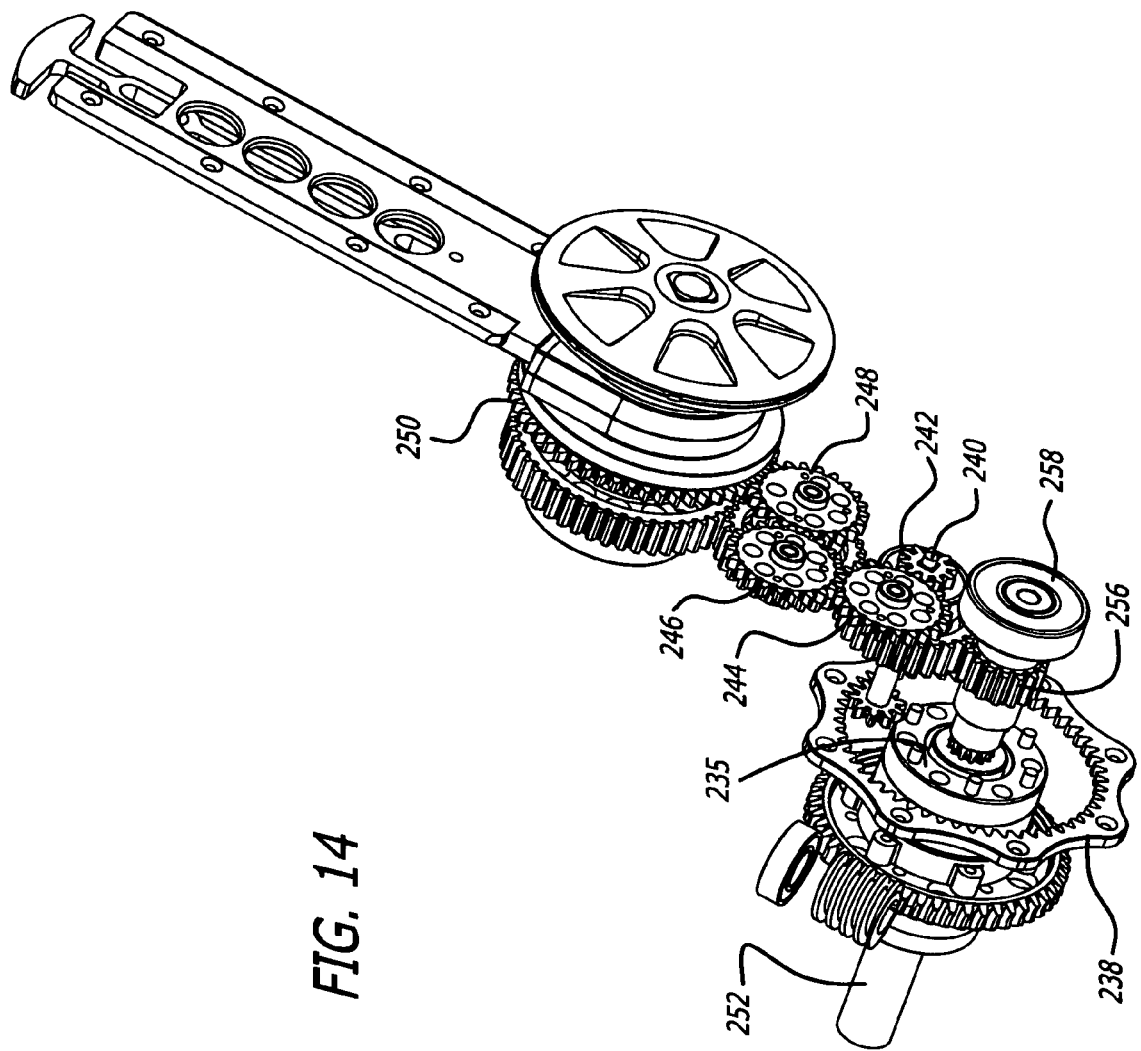
FIG. 14 is a left rear side isometric view of the drive shafts and gear trains of FIG. 12.

The bearing housing 352 (FIGS. 31–38) preferably includes one or more machined closed cell foam body layers or cores 420, a right skin 422, a left skin 424 and a top or seam skin 426, bonded and joined in ways similar to those described with respect to the carriage housing. The bearing housing also includes a main insert 428 for receiving and supporting a hydraulic motor and housing the worm gear 216. The housing also includes a hydraulic motor mount insert 430 with four heli-coil 431 or possibly floating head inserts for supporting the main hydraulic motor 168. The motor mount may also be mounted and secured in the bearing housing through an adhesive such as that used between adjacent skins, foam and the inserts and other surfaces. A blade guard level ring gear insert 432 is mounted in the housing for supporting the ring gear 238 (FIG. 14). A composite cylindrical tube 434, about 0.030 inch in wall thickness, extends from the left skin 424 to the outside surface of the right skin 422, to help support insert 432 and the hydraulic motor mount insert 430, as well as to help support the hydraulic motor. The tube 434 may be curved, notched or cut to accommodate various surfaces to which it is adjacent, for example to allow clearance for the hydraulic motor 168. The tube is also bonded with a suitable layer of adhesive to adjacent surfaces. The bearing housing also includes a bottom skin 436. The bottom skin 436 extends across substantially the entire bottom surface of the bearing housing except for the openings provided for the inserts and other components. The skins, foam (or foam segments) and inserts are preferably formed, configured and assembled in a manner similar to that described above with respect to the carriage housing, including leaving about 0.005 inch for an adhesive layer.

The main insert 428 is an aluminum insert configured to accept the transfer gear 212 (FIG. 9) in the bottom and the worm gear 216 in the middle. A bearing will be supported below the top of the insert with a seal at the top for retaining the bearing and worm gear within the main insert 428. A bottom plate 441 will support a bearing, which in turn will support the worm gear 216 from below.

Additionally inserts may include cap screw inserts 438 for mounting the bearing housing to the carriage. Heli-coil inserts or floating head inserts 440 may also be set in the bottom foam 420 through the bottom skin 436, also for mounting the bearing housing to the carriage.

Figure 36A:
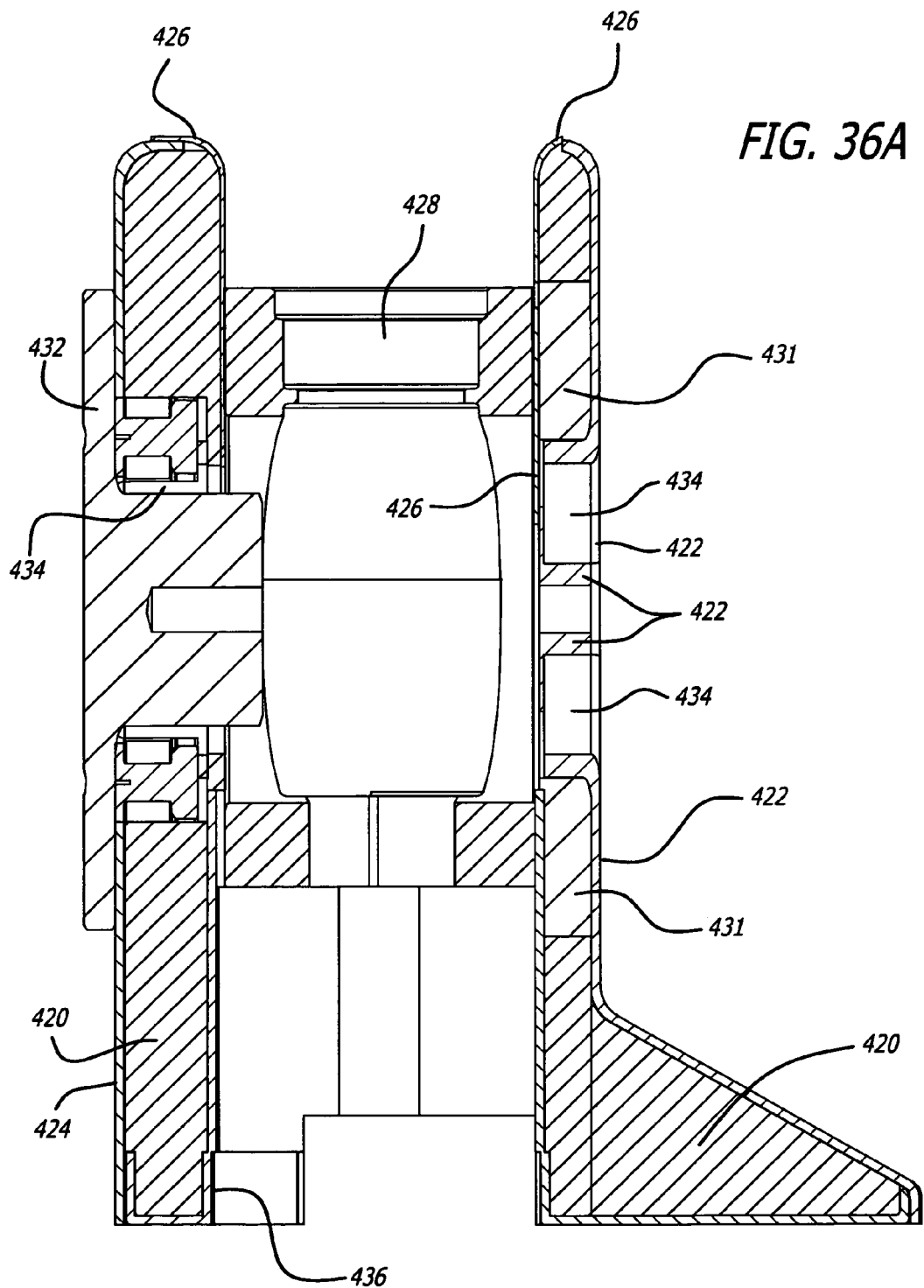
FIG. 36A is a vertical transverse section of an alternative form of the housing of FIG. 32.
Figure 37:
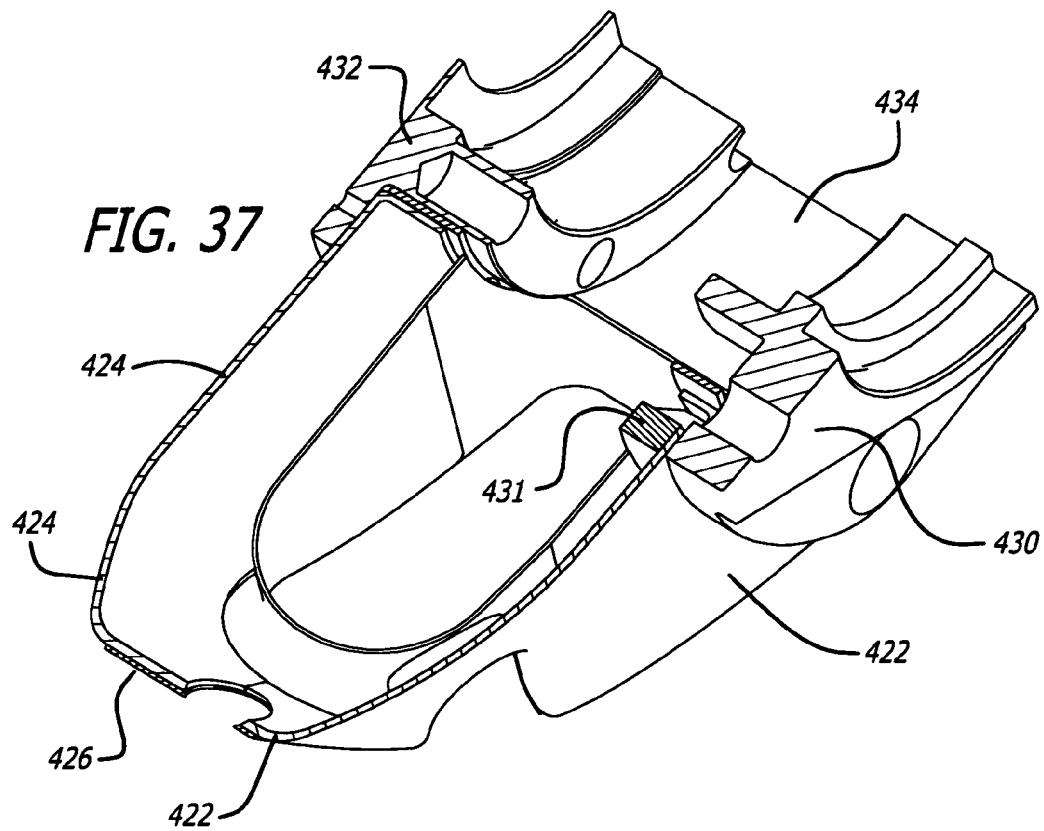
FIG. 37 is a bottom right isometric view of a horizontal longitudinal section of the bearing housing of FIG. 31.
Figure 38:
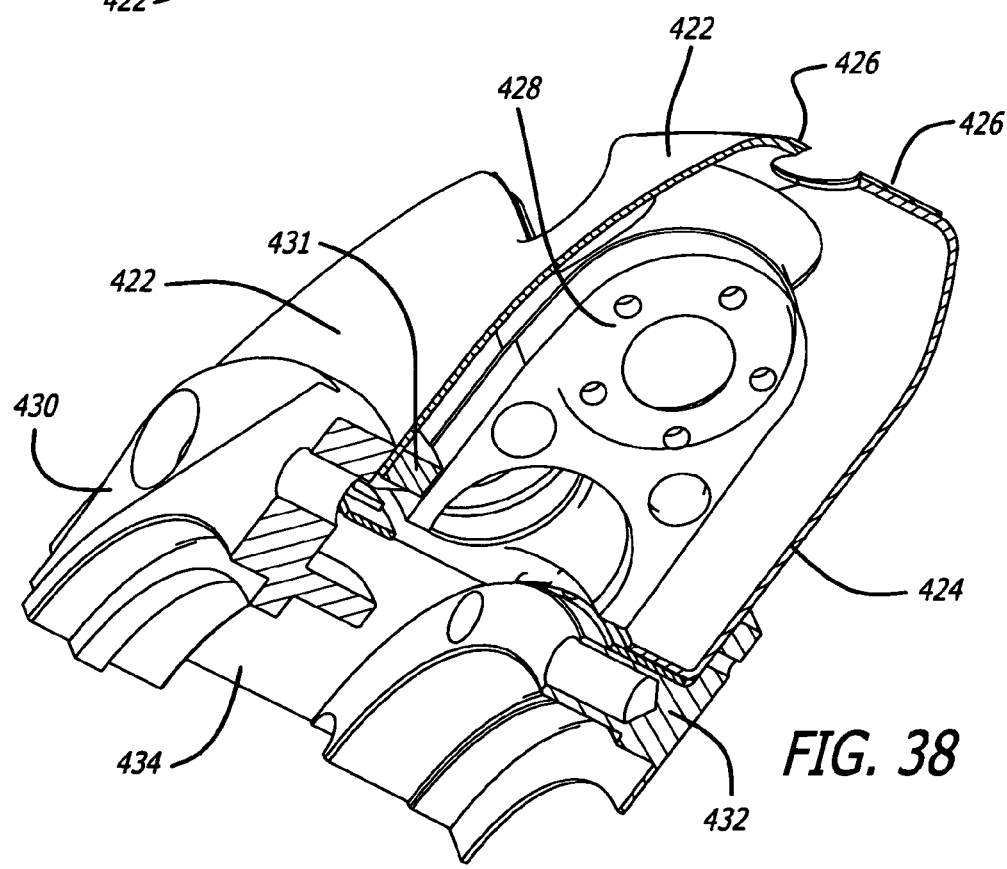
FIG. 38 is a bottom right isometric view of a horizontal longitudinal section of the bearing housing of FIG. 31.

FIG. 36A shows a construction of the bearing housing with a portion of the blade guard level ring gear insert 432 extending within the opening into the housing and two floating head inserts for securing the ring gear to the housing. The inserts can be omitted in favor of using adhesive to secure the ring gear in place. The insert 428 is shown in FIG. 36A without the support 441 of FIG. 36, but a support is intended to be used, or other means for supporting the insert may be used. FIG. 36A also shows the foam in sections, one section being under skin 424, another section being under skin 422, and the two sections are bonded at approximately the center line of the housing. A third section extends to the right as seen in FIG. 36A.

The travel housing 354 preferably includes a travel gear insert 442 (FIGS. 39D and 39G) and transfer housing foam 444 around the insert 442. The foam includes a fastener insert 446 for receiving a fastener through the cap screw insert 448 (FIG. 42B) in the bearing housing. A travel motor mount 450 is also set into foam and secured with adhesive. Right skin 452 and left skin 454 are bonded to the foam and inserts in a manner similar to that described above with respect to the carriage housing.

A wall saw such as that described herein may also benefit from a ladder or layer assembly approach of various adjacent components, for example the gear box. Such an arrangement may allow assembly of the components without requiring they be held together by a fastener extending through all the components at once. In the wall saw, this can be accomplished in a number of ways. In one configuration, first and second adjacent components can be bonded together, while a second and a third adjacent component can be held together with fasteners. Additionally, the use of bonding agents in combination with extended load bearing surfaces such as may be provided by fiber reinforced skins and/or adjacent foam layers allows distribution of loads over extended areas not always available when using only fasteners. However, benefits can be obtained by using fasteners in conjunction with inserts bonded into fiber reinforced skin and/or adjacent foam layers.

The gear box 146 includes the housing assembly 234 having in the present example an inner section 460, an intermediate or medial section 462 and an outer section 464. The housing supports the saw blade drive gears and bearings and seals as well as the blade guard level gear train, bearings and seals. In one example, the sections 460, 462 and 464 are formed from composite skin covered foam sections such as inner foam section, intermediate foam section, and outer foam section for supporting metal inserts for fasteners and metal inserts for bearing assemblies, seals and the like. The fasteners and engage respective inserts to assemble and hold the three sections together. The inserts and the foam are bonded together with a suitable adhesive layer in a manner similar to that described above with respect to the carriage housing.

Each section may be formed as a composite assembly in ways similar to those described above with respect to the other housing assemblies. The inner section 460 is formed from foam core and covered with a composite skin. In one example, the skin on the inner section 460 is a double composite skin, and in another example, the skin on the inner section 460 is approximately twice the thickness of the 0.060 inch skins. As with the previous housings, the foam core is milled or cut to the desired shape for receiving the metal inserts, such as mounting bracket 232, and the bearing supports for receiving corresponding bearing assemblies. The inserts are bonded into the inner section 460 with a suitable adhesive layer.

The intermediate section 462 may also be formed from a composite skin over a milled foam core for receiving respective metal inserts. The inserts receive respective bearing assemblies, seals or other structures. The composite skin and the foam are adhesively bonded, and the inserts are adhesively bonded to the intermediate section. The outer section 464 is formed in a similar manner by taking a milled foam core and bonding the inserts into respective openings and covering the assembly with a composite skin.

In an alternative construction, the intermediate section can be formed by milling a lightweight metal such as the aluminum referred to herein to have the desired surface shape and configuration for receiving the corresponding bearing assemblies, seals and other components. The inner, intermediate and outer sections can then be assembled with the corresponding gear trains, bearings, seals and other components for the final gear box assembly.

Figure 41:
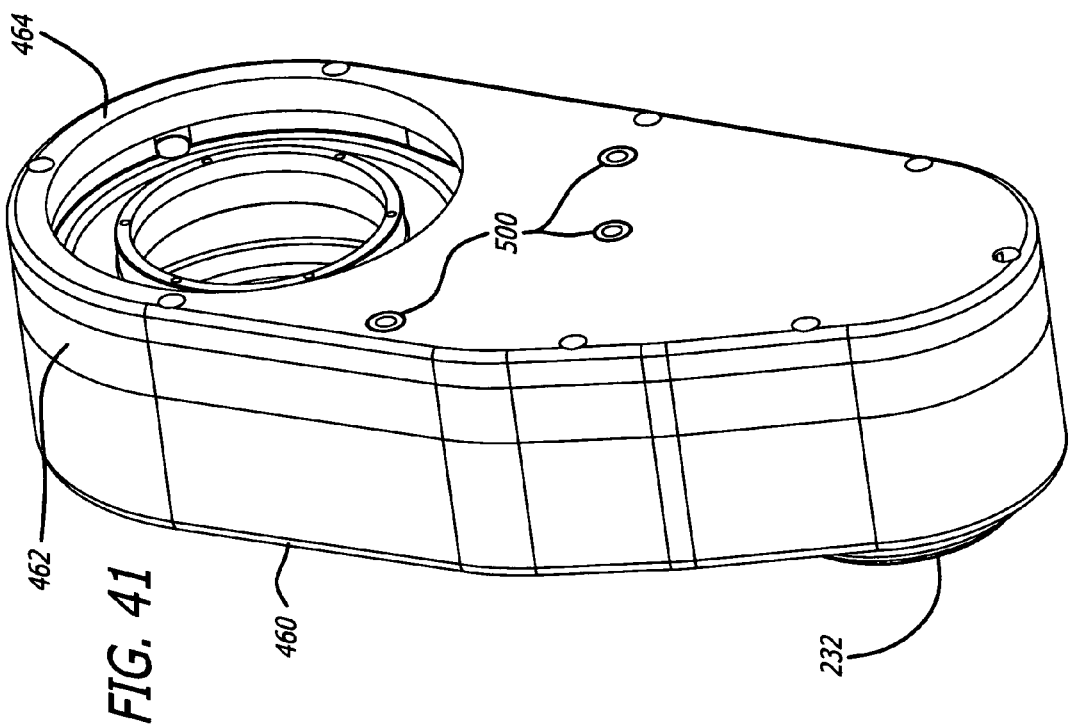
FIG. 41 is a left front isometric view of the gearbox of FIG. 40.
Figure 40:
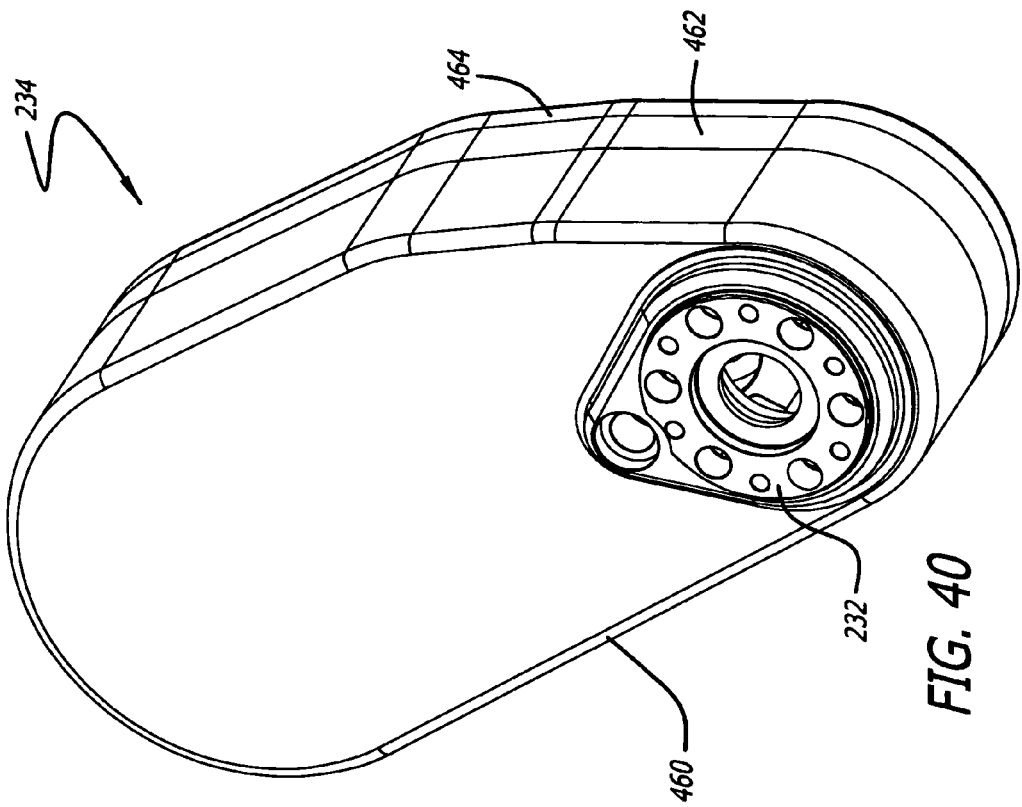
FIG. 40 is a bottom right isometric view of the gearbox for the saw of FIG. 3.

In another example of a multi-layered housing, the housing in the form of the gear box 234 (FIGS. 40 and 41) can be assembled from three segments or sections, one of which sections is mounted to the hub insert 232 supported by the bearing housing. The hub insert 232 supports the interior section 460, which supports the medial section 462, which in turn supports the exterior section 464. The gear box 234 supports and serves to drive the saw blade and also supports and controls the blade guard. In the example of the gear box described below, there is no fastener mounting the exterior section and the medial section to the hub insert 232. Instead, the components are secured to one another through a ladder arrangement.

One or more of the sections include composite fiber reinforced skins, which could be damaged or weakened during removal for maintenance. One or more separation bolts 500 can be included to make easier the removal of the exterior section 464. The bolts 500 can be seated against the medial section 462 so that threading of the bolts 500 into the medial section lifts the exterior section 464 away from the medial section. One or more separation bolts can also be accommodated between the medial section and the interior section to make easier the separation of those two sections.

The hub insert 232 includes an first surface 502 for inter-fitting with the mating component in the bearing housing. The first surface 502 extends radially outwardly and down to a flange 504 extending about the perimeter of the hub insert and having an outer surface 506 (FIG. 43) and a radial bonding surface 508 (FIG. 46). The radial bonding surface bonds through adhesive to an adjacent surface on the interior section 460, as described more fully below. The hub insert includes a boss 510, also for engaging a portion of the interior section 460. The boss 510 and the portion of the hub insert external to the boss is eccentric or at least non-circular to minimize the possibility of rotation of the hub insert relative to the gear box. The boss includes a perimeter surface 512, extending completely around the hub insert, for bonding with an adjacent portion of the interior section 460. The shaft 240 (FIG. 18) is co-axial with the axis 514 and extends through an opening in the eccentric portion of the hub insert.

A support wall 516 extends away from the boss 510 a significant distance into the gear box. The support wall 516 is semi circular, and the perimeter of the support wall 516 can be bonded to an adjacent wall in the gear box. The interior of the support wall 516 includes a plurality of shaft 518 fixed to the support wall 516 for allowing fasteners to pass through from the medial section to the threaded portions of the mounting surface 235 (FIGS. 13–14) in the bearing housing.

Figure 45:
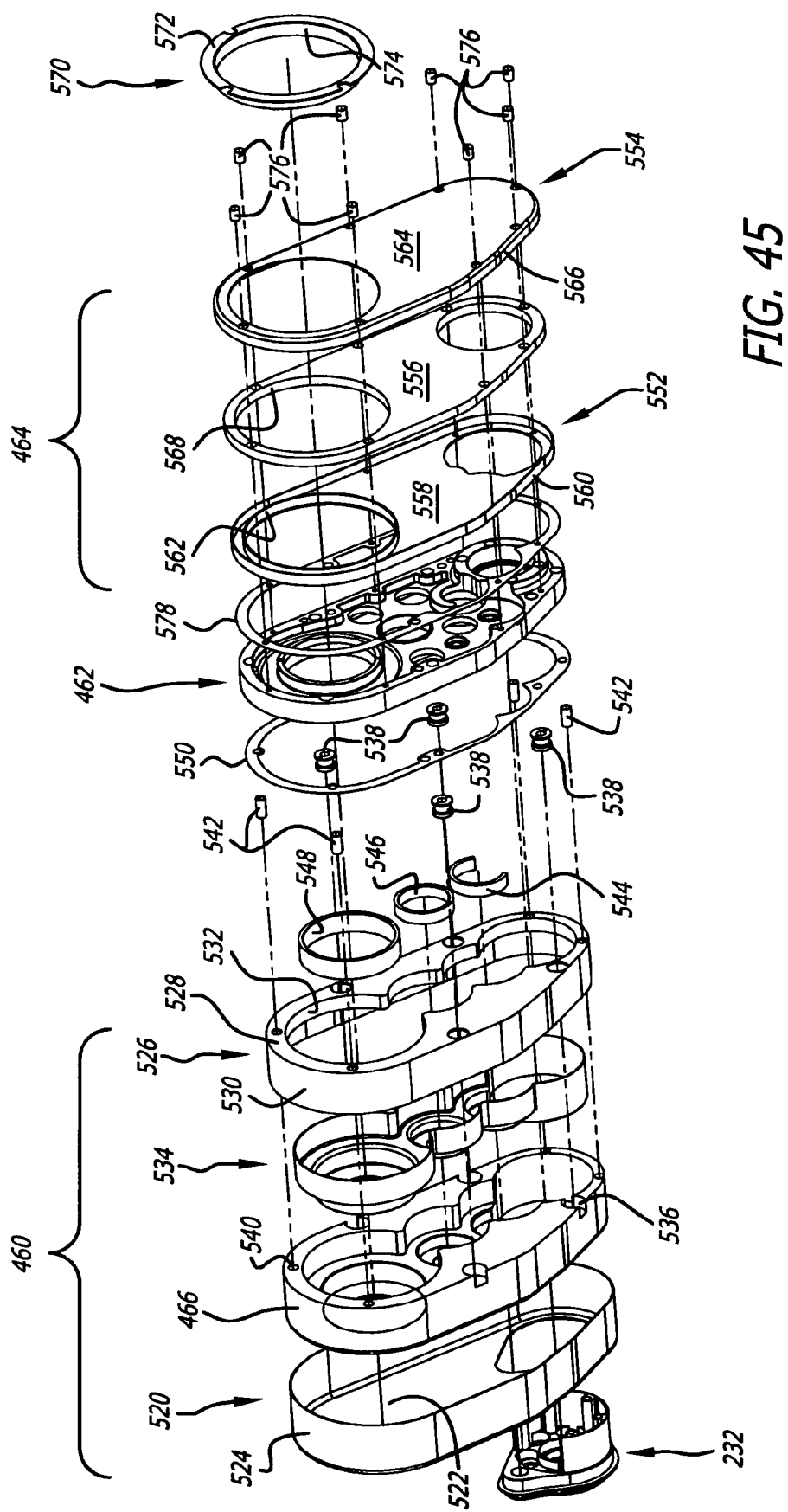
FIG. 45 is an exploded view of housing components for the gearbox of FIG. 40.

The interior section 460 (FIGS. 45 and 46) is sandwiched between the hub insert and the medial section 462, and includes a number of carbon fiber skins and a closed cell foam body. The interior section has an inner skin 520 having a planar surface 522 and a perimeter surface 524, wherein the planar surface 522 and the perimeter surface 524 extend around adjacent surfaces of the foam body 466. The interior section also has an outer skin 526 having a planar surface 528, a perimeter surface 530 and an interior rim surface 532, wherein the planar surface, perimeter surface and interior rim surface extend adjacent corresponding surfaces of the foam body. A profile or internal skin 534 rests in an internal cavity in the foam body 466 having a profile complementary to the internal skin 534. As with the carriage, the foam body 466 is configured and dimensioned to allow a 0.005 inch space between the foam body and the adjacent skin for a bonding agent. The width of the foam body from the bearing housing side to the saw blade side is preferably sufficiently large to minimize deflection of the carbon fiber skins, and preferably adds significant surface area to help in distributing loads over carbon fiber skins. Considerations for increasing the width include increasing the moment arm created by the saw blade on the bearing housing, and the generation of associated loads, and also the overall size of the machine. Material cost may also come into play.

The foam body 466 also includes cavities 536 for receiving floating head inserts 538, as described more fully below. The foam body also includes cavities 540 for receiving locating pins 542 for properly registering the interior, medial and exterior sections. Openings are formed in the outer skin 526 to accommodate the floating head inserts 538 and the locating pins 542.

Two or more of the skins are configured to provide significant overlap. For example, the inner skin perimeter wall 524 overlaps the outer skin perimeter wall 530 as much as possible, and preferably between 50 percent and 100 percent of the width of the foam insert 466. Additionally, overlap between the interior rim surface 532 on the outer skin 526 and the adjacent internal skin 534 is preferably greater than 10 percent of the length of the adjacent wall of the foam insert 466, and may be approximately 50 percent of the length. In another area, the overlap of the perimeter wall 516 of the hub insert with the adjacent wall of the interior skin is preferably between 50 percent and 100 percent of the length of the perimeter wall 516. Additionally, mutually adjacent component areas available for bonding are preferably maximized to increase strength and to distribute loading as much as possible across surfaces.

Figure 15:
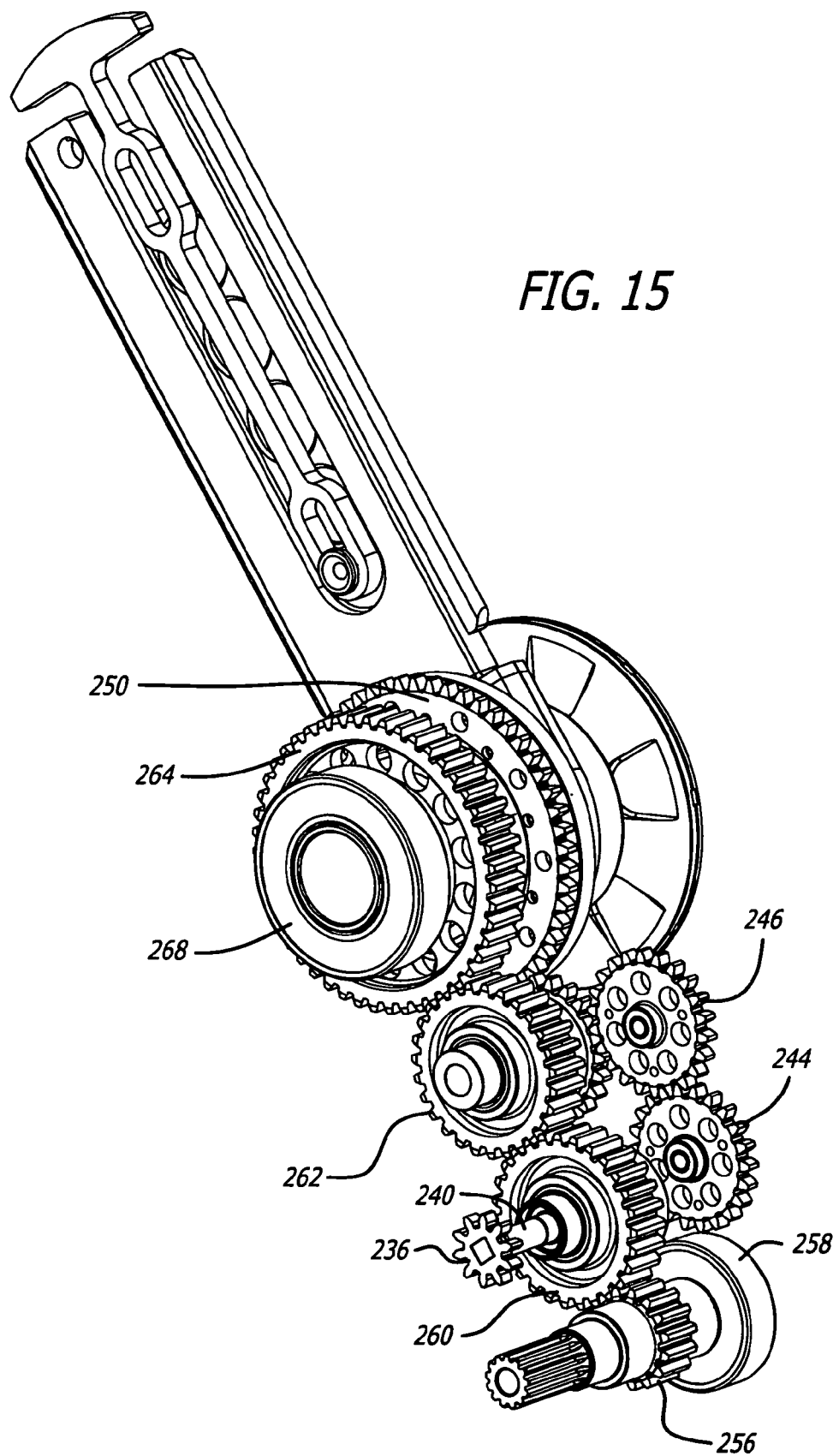
FIG. 15 is a right rear isometric view of the shafts and gear trains of the gearbox of the saw of FIG. 3.
Figure 16:
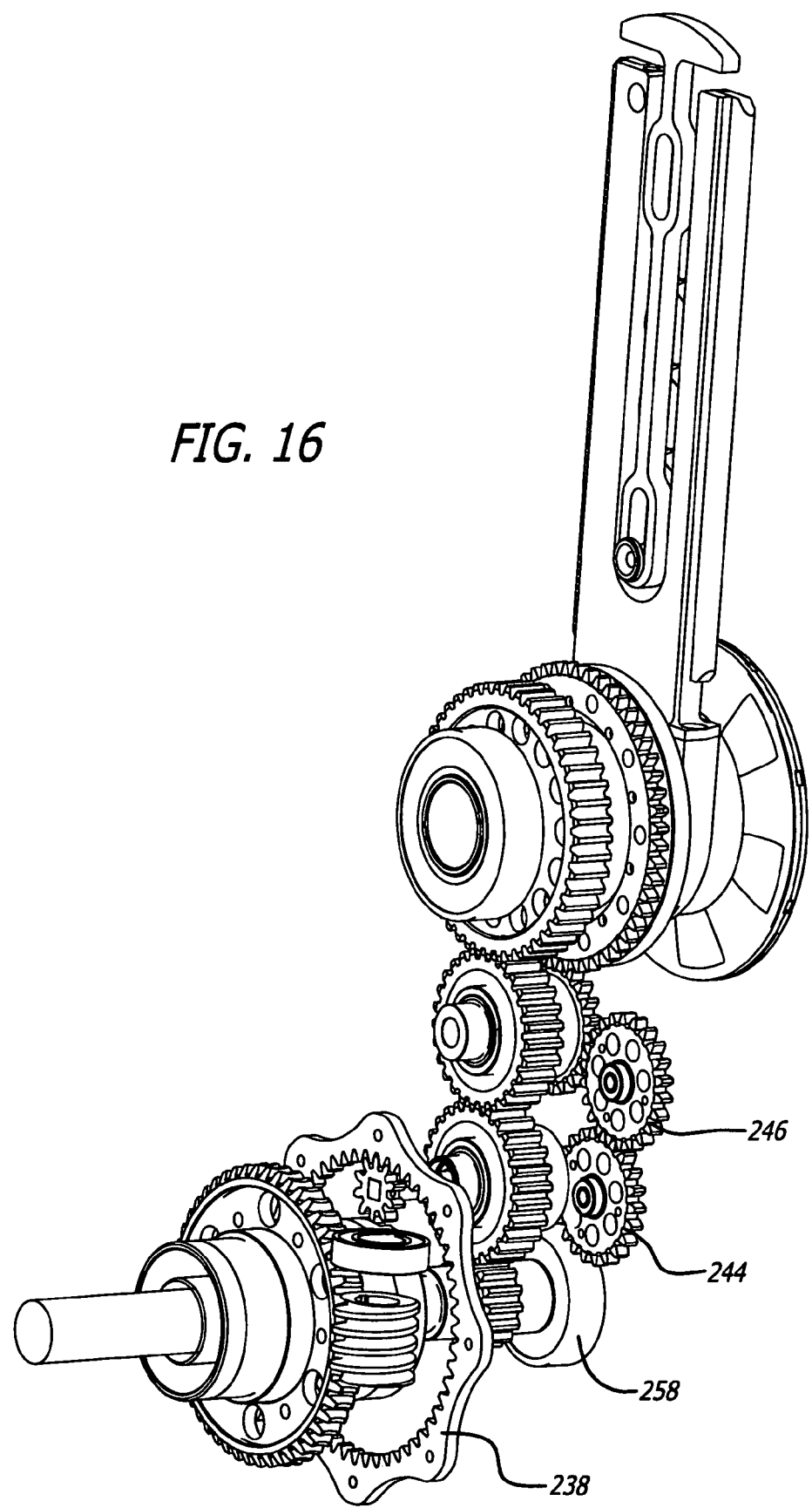
FIG. 16 is a lower right rear isometric view of the drive shafts and gear trains for driving the saw blade and positioning the blade height for the saw of FIG. 3.
Figure 17:
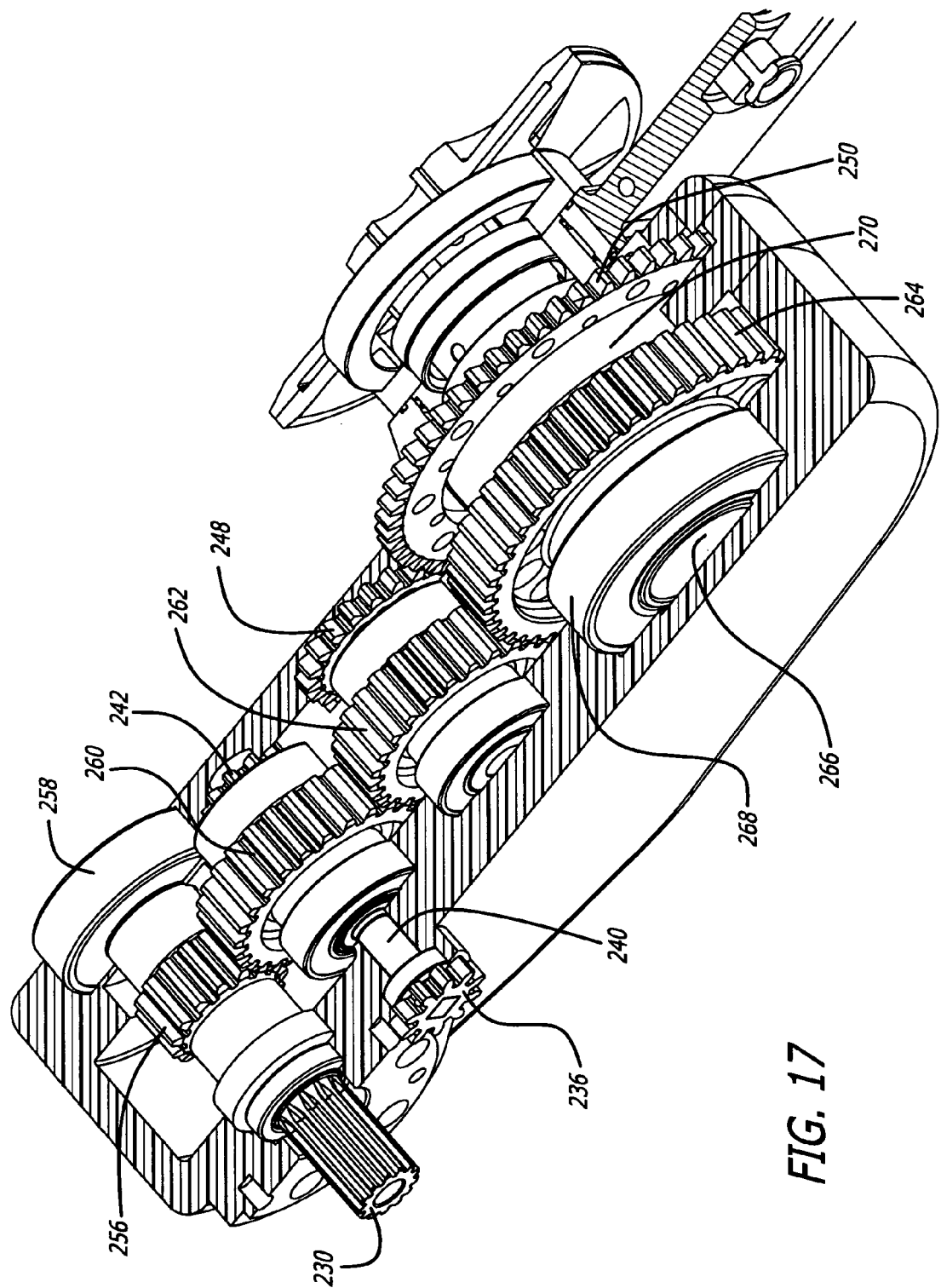
FIG. 17 is a lower isometric view of the saw blade and blade guard gear trains and blade drive shaft positioned in a schematic of the gearbox housing.
Figure 18:
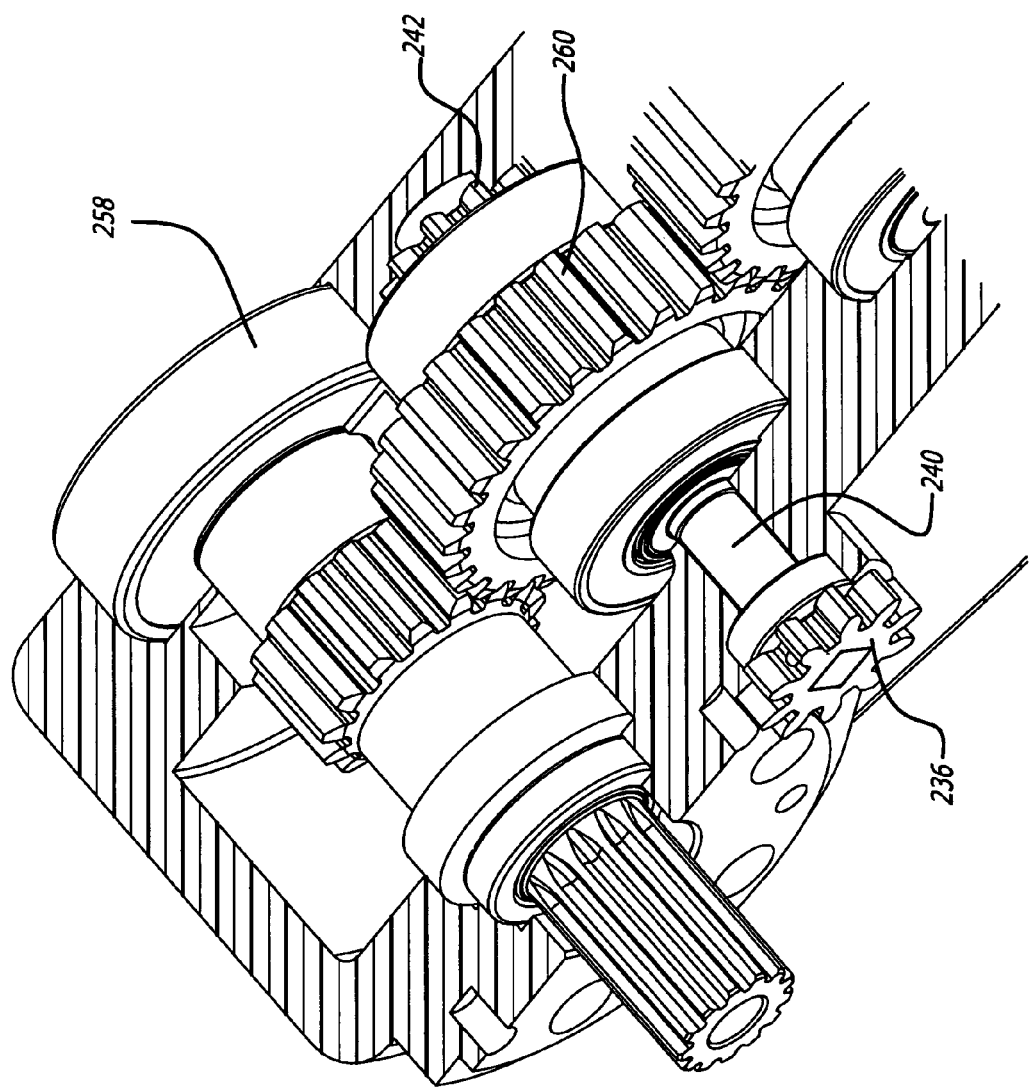
FIG. 18 is an enlarged view of the lower portion of the assembly shown in FIG. 17.

Bearing inserts formed from titanium, aluminum or other minimally reactive material are inserted in the internal skin 534 to support respective bearings, in conjunction with complementary bearing surfaces formed in the medial section 462. A first bearing insert 544 supports one bearing for the shaft 240 (FIG. 17), and a second bearing insert 546 supports one of the bearings for gear 262 (FIG. 15). A third bearing insert 548 supports the bearing 268 (FIG. 19) for the saw blade shaft. Each bearing insert includes an outer perimeter surface and a rim surface for bonding to corresponding adjacent surfaces in the internal skin 534.

The interior section 460 is assembled with adhesive on appropriate surfaces by placing the outer skin 526 over the corresponding surfaces of the foam body 466. The assembly is then placed within the interior skin 520 and the internal skin 534 placed within the foam body and inside the interior rim surface 532. The bearing inserts are then inserted in the internal skin 534, the inserts 538 and 542 installed and bonded in place, and the hub insert 232 bonded in place with the adjacent surfaces of the internal skin 534. The perimeter wall 516 of the hub insert is preferably spaced from the outer surface 528 of the outer skin 526 about 1/16 of inch from the adjacent surface of the medial section, once assembled, so as to permit some loading or pre-compression of the interior section 460 between the hub insert and the medial section 462. Pre-loading promotes a secure mounting of the gear box even if the adhesive bonding between the perimeter surface of the hub insert and the internal skin is not as strong as desired. A gasket 550 can be placed on the outer skin 526, with appropriate adhesive on each side for bonding to the outer skin 526 and to the medial section 462. The medial section can then be mounted on the interior section with the help of locating pins in the inserts 542.

It is apparent that no fasteners extend completely through the entire gear box to secure the sections of the gear box together or to mount the gear box to the bearing housing. Additionally, a significant portion of the medial section 462 is secured only to the interior section 460, and the portion of the medial section 462 adjacent the hub insert 232 is secured only to the bearing housing. The hub insert is bonded to the interior section 460. This ladder mounting structure distributes concentrated loading over extended surfaces of the gear box and of the bearing housing. The assembly becomes rigid and secure. The ladder mounting arrangement is also assisted by the substantial bonding between the hub insert and the internal skin 534 as well as the other bonding locations between the skins and between the skins and the foam insert and between the foam insert and the internal skin. Additionally, the significant width of the foam insert permits substantial overlap of the carbon skins, thereby promoting the integrity of the structure. The use of inserts for receiving and securing fasteners also contributes to the utility of the ladder mounting structure.

The saw blade drive train, including the gears, bearings, shafts and related components are assembled and supported between the internal skin 534 and the medial section 462. The blade guard gear train is assembled between the medial section 462 and the exterior section 464. Lubricating oil circulate across the medial section 462 for lubricating the gears.

The exterior section 464 includes an internal fiber skin 552 and an external fiber skin 554 sandwiching between them a foam layer 556. The internal skin 552 includes a planar surface 558, a perimeter surface 560 and an internal rim surface 562. The external skin 554 includes a planar surface 564 and a perimeter surface 566. The perimeter wall 566 of the external skin extends over and bonds to the perimeter wall 560 of the internal skin 552, and the outer surface of the rim 562 adheres to the interior surface 568 of the foam layer 556. A seal ring 570 includes a rim 572 and a cylindrical surface 574 for extending within and bonding to the inside surface of the wall 562. Cap screw inserts 576 are inserted within respective openings machined into the foam layer 556 for receiving cap screws (8 in the example) to mount the exterior section onto the medial section through a gasket 578 after the hub insert, interior section and medial section are mounted on the bearing housing. The gaskets are preferably formed from the plastic material known as Garlock.

The exterior section 464 also benefits from a ladder construction. Mounting of the exterior section to the adjacent medial section avoids having to mount the exterior section to the hub insert or otherwise to the bearing housing.

Figure 42:
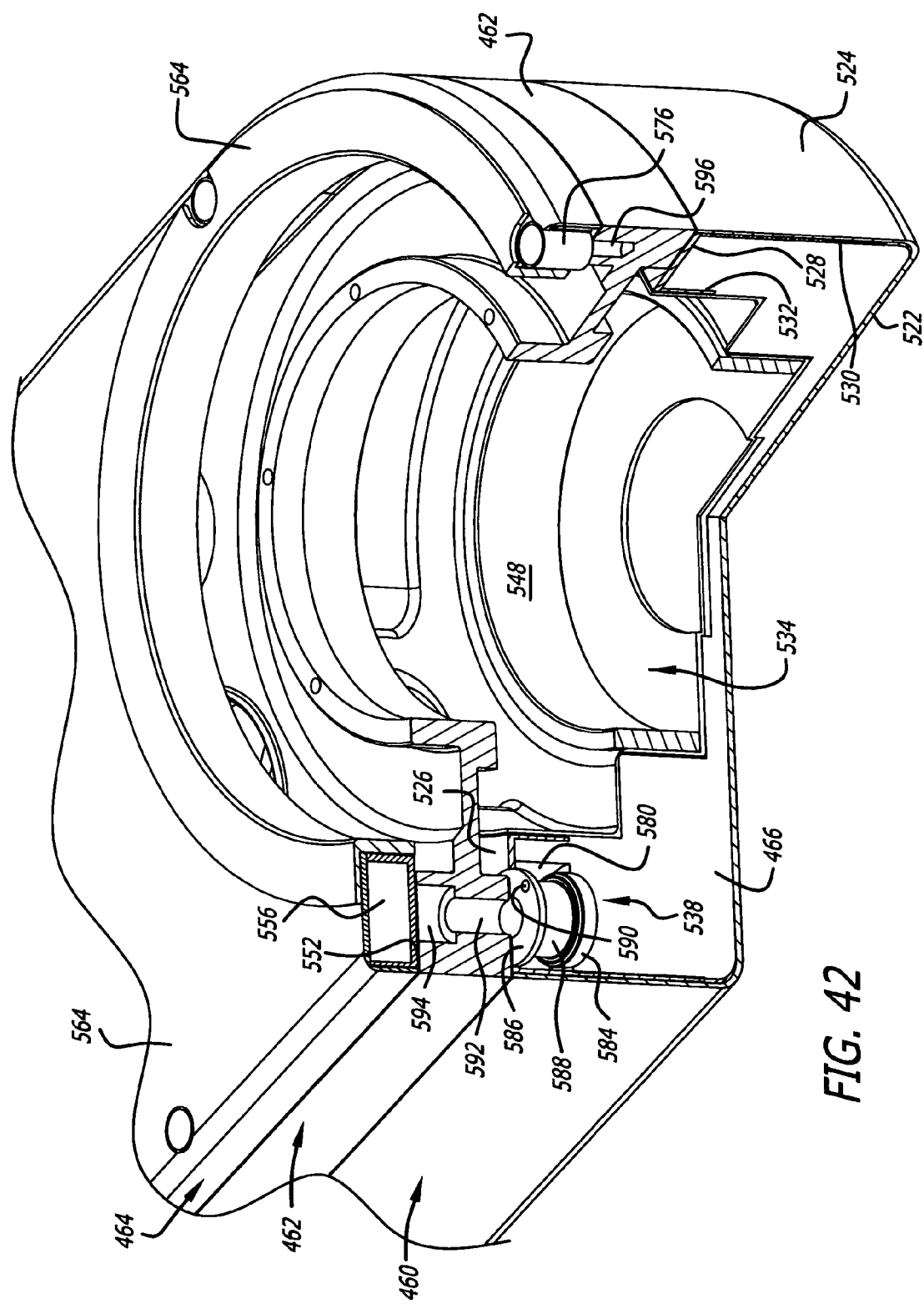
FIG. 42 is a partial transverse section through the saw blade drive shaft output portion of the gear box of FIG. 40.

Inserts for the fasteners can be secured in the various components in a number of ways. In one example, as depicted in FIG. 42, a floating head insert 538 is positioned in a cavity 580 formed in the foam insert 466. The cavity 580 is created by removing foam material to the diameter of the opening 582 in the skin 526, in removing additional material to a larger diameter underneath the surface of the skin 526. The floating head insert includes a lower rim 584 adjacent the bottom of the cavity 580 and an upper rim 586 wider than the diameter of the body 588 of the insert and positioned flush with the skin 526. The upper rim 586 is preferably the same thickness as that of the skin 526. The cavity is then filled with an adhesive to harden in the cavity so that the hardened adhesive mechanically engages the insert and the skin to fix the insert in place. The cavity is filled through one or more openings 590. A suitable fastener is threaded into the insert through the bore 592 and counter bore 594 formed in the medial section 462. The adhesive is preferably the same as the adhesive used to bond the skins and the foam inserts. Other floating head inserts in the saw can be secured in a similar way.

Cap screw inserts 576 may be bonded in place through adhesive in a cavity formed in the foam layer 556 and between the skins 552 and 564. A cap screw can extend through the insert and the threaded into the opening 596 formed in the medial section 462.

Considering further various features and combinations of features of the methods and apparatus corresponding to movable machines, for example saws and wall saws, the machine could have one or more components formed from a composite of reinforcing fibers and plastics. The fibers can be carbon fibers or other fibers identified herein. The components can also be formed with the composite as a skin over a body layer. The body layer can be a composite or a plastic, for example a foam, closed cell foam, honey comb plastic, plastic sheet or other materials. The skin can be bonded to the body layer, for example using adhesives identified herein. The body layer can be formed in sections, and the sections can be bonded together, for example using adhesive. The body layer is preferably formed, shaped or otherwise configured so that the shape conforms to the shape of the skin or other composite layer. The body layer may be configured to provide a uniform gap for receiving a bonding agent between the body layer and the skin. For carbon fiber skins and high-density closed cell foam body layer, the gap may be 0.005 inch.

In addition to any or all of the foregoing, in individual or multiple combinations thereof, a movable machine having a component formed from a composite fiber reinforced plastic can be formed from several pieces or skins of the plastic. Edge portions of the skins are overlapped and bonded together for added strength and structural integrity. Along some surfaces of the component, the overlap is at least 50 percent in one dimension of the surface and at least 50 percent over both dimensions of the surface. Along some surfaces, the overlap is greater than 50 percent and between 75 percent and 100 percent. Where a body layer supports a skin, bonding of a skin to the body layer and bonding of a portion of a second skin to the first skin provides additional support in the component. A foam body layer with a layer of adhesive followed by a skin layer and another adhesive and skin layer adds strength to the component. Further adhesive and skin layers add strength. Increasing a thickness of the skin layer also adds strength. Using an 8-harness layup for the fiber-reinforced skin provides significant strength and support in a component, but a less complicated harness can also be used.

In addition to any or all of the foregoing, in individual or multiple combinations thereof, a movable machine having a component formed from a composite fiber reinforced plastic skin can be strengthened by having the skin surface curve inward and/or outward relative to a flat plane. Geometry changes provide strength to a surface where loading may occur in directions other than along the plane. In a carriage for a wall saw, a side wall of the carriage may curve outward from one end, then inward, to provide additional support to the components which are also supported by the wall. The wall could support rollers, bearings or other components facilitating support and movement of the carriage along a track or other surface. The side wall of the carriage may also curve outward again after curving inward, and then curve inward to a second end opposite the first end. In addition to or instead of multiple curves in a surface of the carriage wall, a reinforcing portion having one or more changes in geometry can be incorporated in a planar surface of the wall. For example, the reinforcing portion could be an outward bump or an inwardly extending recess in the surface, and the reinforcing portion could have multiple curves. The multiple curves may arise from a first curve extending in one direction and a second curve extending in a different direction. Additionally, a given curve can extend in a straight line or may itself curve as it progresses along the surface of the carriage wall. In one example, the reinforcing portion extends outwardly from the surface of the wall a vertical distance less than the vertical height of the wall and a horizontal distance less than the horizontal length of the wall, and the reinforcing portion follows an arc along the wall.

In addition to any or all of the foregoing, in individual or multiple combinations of any of the foregoing, a movable machine, for example a wall saw, includes at least one component formed from a fiber reinforced plastic with one or more inserts supported by the reinforced plastic. The inserts may be bonded to the plastic, for example using the adhesive discussed herein, and as a 0.005 inch layer. The inserts may be metal, including aluminum, titanium or other suitable structure, and may be hard anodized or processed in a manner the same as those materials disclosed herein. An insert can be secured in place by injecting a hardening plastic around the insert and under the reinforced plastic. Inserts can be used to secure fasteners, and may be floating head inserts, heli-coil inserts, cap screw inserts, lift off or separation inserts, or other inserts. Inserts can be secured through adhesive in openings formed in a reinforced plastic skin supported on a foam body. An insert, for example a floating head insert, can be inserted into a cavity formed in the foam below the skin, after a portion of the foam underneath the skin is removed. The insert has a top rim flush with the skin surface and a surface configuration under the rim allowing the hardening plastic to securely engage the insert. The hardening plastic can then be injected into the cavity to harden underneath both the rim and the skin. Inserts can also be given surface discontinuities to aid in securing the insert in the skin and/or foam. An insert can be configured to have an increased surface area in the direction in which greater bonding is desired, for example in the direction which experiences greater loading. An insert can also be bonded to a skin and/or foam body so as to receive and support bearings, rollers, and other hardware.

In addition to any or all of the foregoing, in individual or multiple combinations thereof, a movable machine, for example a wall saw, can have any or all of a carriage, motor mount or bearing housing or gear box or housing for other drive mechanisms formed from composite fiber reinforced plastic and/or body layers such as foam. A carriage for supporting the saw on a track can be formed from composite skins and foam, with or without surface curves or reinforcing portions, and can include inserts for fasteners, rollers or other components. A bearing housing can be formed from composite skins and foam, for supporting inserts, which in turn receive fasteners, components such as gears, bearings, shafts, motors including hydraulic motors, as well as other components described herein. A transfer housing can also be formed from composite fiber reinforced plastic and foam sections to support inserts, which in turn receive fasteners, components such as gears, bearings, shafts, motors including hydraulic motors, as well as other components described herein. A gear box can be formed from composite skins and foam as well as inserts for supporting gears, bearings, shafts and other components for operating a machine tool, such as a saw blade.

In addition to any or all of the foregoing, and in individual or multiple combinations thereof, a movable machine for example a wall saw can have a transmission mechanism, for example a gear box, having an input at one portion of the gear box and an output at another portion of the gear box and where the gear box is supported at the input portion. In the example described, the gear box is supported only at the input portion. The gear box can have a first side and a second side, and the input portion can be on the first side and the output portion can be on the second side. These configurations of transmission mechanisms, including the gear box described herein, can be formed in multiple sections. One or more of the sections can be formed from the composite fiber reinforced plastic, and may also include a plastic body portion, including a closed cell foam body, such as discussed herein. First and second sections can be secured together, and a third section secured to one of the other two without having to secure the third section to the first section. The transmission mechanism can be supported through the first section, without having to independently or separately support the second or the third sections. This is termed a ladder arrangement herein. The first section can be formed from a combination of one or more fiber reinforced skins bonded to or sandwiching a foam body layer. The first section can be supported through an input support element, which is the hub insert for mounting the gear box to the bearing housing in the wall saw described herein. A second section can be supported through fasteners by the machine, the bearing housing in the present example. The second section in the gear box supports gears, shafts and bearings. The third section can be formed from the combination of one or more work fiber reinforced skins bonded to or sandwiching a foam body layer. The third section can be supported by the second section.

In addition to all or any of the foregoing, in individual or multiple combinations thereof, a movable machine for example a wall saw can have a transmission mechanism with at least one housing section formed from a composite fiber reinforced plastic and also a transmission support portion also formed from a composite fiber reinforced plastic. The transmission support portion may support inserts which in turn support bearings, gears, shafts and the like. The transmission support portion has significant surface area available for bonding to the inserts. The transmission support portion has significant surface area available for bonding to a housing section, such as the housing section formed from fiber reinforced plastic. In either case, the significant surface area can be provided by extending a given surface a greater distance in a given direction, for example extending a side wall of the transmission support portion to be wider, longer or deeper. In another example, significant surface area can be provided by curving the bonding surface or providing surface projections to increase bonding area. In the wall saw, the transmission support portion is provided by the interior skin 534, which has a significant amount surface area available for bonding to adjacent surfaces. The strength of the components in the transmission mechanism is also enhanced by overlap of fiber reinforced plastic skins and bonding thereof.

In addition to all or any of the foregoing, in individual or multiple combinations thereof, a movable machine for example a wall saw can have one or more components formed from a composite fiber reinforced plastic. UV protection can be included in the fiber reinforced plastic, such as by a coating. Components coming into contact with the fiber reinforced plastic are preferably formed from low reactive materials, that minimize galvanic action. Additionally, for multiple sections combined together where it least one section includes composite fiber reinforced plastic, separating or lifting bolts can be included to make easier separation of the components. Inserts that are used and for which rotation is undesirable may include surface discontinuities, projections or other eccentric surfaces to minimize or prevent rotation of the insert.

In a wall saw, incorporating one, more or all of the foregoing features, a carriage is formed from composite fiber reinforced plastic over a foam body. The plastic and body are configured to as to provide the gap for a bonding agent. Inserts are included in the carriage for receiving fasteners, bearings or other components. Inserts experiencing significant loading have increased surface areas available for bonding. The possible fiber, adhesive and insert material are disclosed. The carriage has walls configured to include at least one of a reinforcing portion and curved surfaces to strengthen the carriage.

In a wall saw, incorporating one, more or all of the foregoing features, a gear box is combined with the saw components so that a blade guard stays level over a given range of blade depths relative to the work surface. The blade guard stays level while the blade is in contact with the work surface. This can be achieved through a gear train having a gear ratio of 1:-1. In a wall saw, first and second gears serving different functions can be supported on the same axis, on nested shafts, or where the first gear is supported by a hollow shaft which receives a shaft for supporting the second gear.

In a wall saw, incorporating one, more or all of the foregoing features, a gear box is supported by and has an input at one portion of the gear box and has an output and supports a saw blade shaft at another portion of the gear box. For example, the first and second portions are at opposite ends of the gear box. They may also be on opposite sides of the gear box. The gear box can be formed from one or more sections having a composite fiber reinforced plastic. The gear box can incorporate a ladder support arrangement. The gear box can incorporate a high surface area skin for supporting gears in the gear box, and the skin can have a wide surface area and/or curved surfaces to increase the surface area for bonding.

Exemplary specifications for the composite materials include:

| Fabric | |
|---|---|
| Description | 3K-135-8HS |
| Fiber areal weight | 366 +/− 14 GRAMS/SQUARE METER |
| Yarns per inch | 24 × 23 |
| yarn size | 3000 FILAMENTS |
| weave style | 8 Harness satin |
| Fiber | |
| Material | carbon |
| Number of filaments | 3000 |
| Tensile Strength (ksi) | 512 |
| Tensile Modulus (ksi) | 33.4 |
| Elongation % | 1.5 |
| Yield g/1000 m | 198 |
| Density g/cubic meter | 1.76 |
| Resin | |
| material | epoxy |
| density (g/cc) | 1.2290 |
| Tg (from G" DMA Curve, F.) | 270.00 |
| Tensile Modulus (ksi) | 440.00 |
| Tensile Strength (ksi) | 10.70 |
| Elongation at Break (%) | 4.00 |
| Tg after 24-Hr water boil F | 169.00 |
| Water Absorption % | 3.90 |
| Adhesive | |
| Material | epoxy |
| lap shear strength R.T. | 4700.00 psi |
| lap shear strength 250 | 3000.00 psi |
| Tensile Properties @ R.T. | 6000.00 psi |
| Tensile Properties @ 225 | 3000.00 psi |
| Tensile Elongation @ R.T. | 3.10% |
| Tensile Elongation @ 225 | 3.70% |
| Compressive Properties @ RT | 10000.00 psi |
| Compressive Properties @ 225 | 3700.00 psi |
| Compressive Modulus @ R.T. | 300000.00 psi |
| Compressive Modulus @ 225 | 200000.00 psi |
| Foam | |
| Material | Closed cell polyurethane foam |
| Temperature range | −320 to +275 |
| CTE | $3.5 \times 10-5$ in/in/F |
| Closed cell content | 96% |
| Thermal Conductivity (BTU/HR-ft2-F/in) | 0.302 |
| Poisson's Ratio | 0.3 |
| Hardness, Shore D 4 lbs/ft3 | 5.4 |
| Hardness, Shore D 40 lbs/ft4 | 73 |
| Tumbling Friability @ 4 lbs/ft3 | 22% |
| Tumbling Friability @ 40 lbs/ft3 | 0.16% |
| Water Absorption | .028 lbs/ft2 |
| Dielectric constant | 1.4 @ 20 lbs/ft3 |
| Compressive Strength parallel | 712 psi |
| Compressive Strength perpendicular | 578 psi |
| Compressive Strength parallel 250 deg F. | 281 psi |
| Compressive Strength perpendicular 250 Deg. F. | 190 psi |
| Compressive Modulus Parallel R.T. | 22203 psi |
| Compressive Modulus Perpendicular R.T. | 14875 psi |
| Compressive Modulus Parallel 250 deg. F. | 11853 Psi |
| Compressive Modulus Perpendicular 250 Deg. F. | 8060 Psi |
| Shear Strength RT | 420 Psi |
| Shear Modulus RT | 6400 Psi |
| Tensile Strength RT | 570 Psi |
| Tensile Modulus RT | 20785 Psi |
| Flexural Strength RT | 864 Psi |
| Flexural Modulus RT | 28220 Psi |
| Density | 0.0056 lb/in$^3$ |

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A movable machine having a motor and a shaft linked to the motor for driving a machining tool, a housing adjacent the motor wherein the housing is formed from a composite of oriented reinforcing fibers and plastic and wherein the housing includes a foam core adjacent the composite.

2. The movable machine of claim 1 wherein the foam is a closed cell foam.

3. The movable machine of claim 2 wherein the foam is at least 90 percent closed cell.

4. The movable machine of claim 1 further comprising an adhesive layer between the foam core and the composite.

5. The movable machine of claim 4 wherein the foam core includes at least two pieces of foam core bonded together with an adhesive layer.

6. A movable machine having a motor and a shaft linked to the motor for driving a machining tool, a housing adjacent the motor wherein the housing is formed from a composite of oriented reinforcing fibers and plastic and further comprising an insert bonded to the housing.

7. The movable machine of claim 6, wherein the insert is a metallic insert configured for receiving a fastener.

8. The movable machine of claim 6 wherein the insert is a metallic insert configured to receive a roller assembly.

9. The movable machine of claim 6 wherein the insert is a metallic insert configured to receive a bearing assembly.

10. A movable machine having a motor, a housing supporting the motor and having a housing wall formed from a composite of oriented fibers and a closed cell foam adjacent the housing wall.

11. The movable machine of claim 10 wherein the closed cell foam is bonded to the housing wall.

12. The movable machine of claim 11 wherein the housing wall is a first housing wall and further comprising a second housing wall and wherein the closed cell foam is sandwiched between the first and second housing walls and further including an adhesive layer between the foam and one of the housing walls.

13. The movable machine of claim 11 wherein the closed cell foam is at least 80 percent closed cell.

14. The movable machine of claim 10 wherein the composite is a composite of carbon fibers and epoxy resin.

15. The movable machine of claim 14 wherein the composite is an eight harness composite.

16. The movable machine of claim 10 wherein the housing is configured to ride on a track.

17. The movable machine of claim 10 further comprising at least one metallic insert bonded to the foam.

18. A movable machine having a motor and a shaft linked to the motor for driving a machining tool and having a housing extending adjacent at least part of the motor, wherein the housing includes a housing wall formed from a composite of oriented fiber reinforced plastic extending over a body layer and further including the machining tool in the form of a saw blade.

19. A movable machine having a motor and a shaft linked to the motor for driving a machining tool and having a housing extending adjacent at least part of the motor, wherein the housing includes a housing wall formed from a composite of oriented fiber reinforced plastic extending over a body layer and wherein the body layer includes a foam and further including an adhesive layer bonding the fiber reinforced plastic and the foam.

20. A movable machine having a motor and a shaft linked to the motor for driving a machining tool and having a housing extending adjacent at least part of the motor, wherein the housing includes a housing wall formed from a composite of oriented fiber reinforced plastic extending over a body layer and wherein the body layer is a foam.

21. The movable machine of claim 20 wherein the fiber reinforced plastic includes a shape and the foam body layer includes a shape and wherein at least part of the foam body layer shape conforms to the fiber reinforced plastic shape.

22. A movable machine having a motor and a shaft linked to the motor for driving a machining tool and having a housing extending adjacent at least part of the motor, wherein the housing includes a housing wall formed from a composite of oriented fiber reinforced plastic extending over a body layer and further including a carriage for the motor and housing configured to operate on a track.

23. A movable machine having a motor and a drive mechanism for transmitting motion from the motor to a machining tool and a housing having a housing portion adjacent the motor, the housing being formed from a composite of oriented reinforcing fiber and plastic, and wherein the housing portion is curved and further including a foam material bonded to the first and second housing portions.

24. The movable machine of claim 23 wherein the foam material is a closed cell foam.

25. A movable machine having a motor and a drive mechanism for transmitting motion from the motor to a machining tool and a housing having a housing portion adjacent the motor, the housing being formed from a composite of oriented reinforcing fiber and plastic, and wherein the housing portion is curved and further including an insert contacting the reinforcing fiber and plastic and a roller assembly extending into the insert.

26. A movable machine having a motor and a drive mechanism for transmitting motion from the motor to a machine tool, a housing extending adjacent at least part of the motor and having a housing wall formed from a composite of fiber reinforced plastic extending over a body layer and further including at least one insert bonded to at least one of the fiber reinforced plastic and the body layer.

27. The machine of claim 26 further including a fastener extending into the insert.

28. The machine of claim 26 further including a roller assembly extending into the insert.

29. The machine of claim 26 further including a carriage for the motor and for the drive mechanism wherein the carriage includes a wall formed from a composite of fiber reinforced plastic extending over a closed cell foam body layer.

30. The machine of claim 29 wherein the fiber reinforced plastic is bonded to the foam.

31. The machine of claim 29 wherein the fiber reinforced plastic is a carbon fiber reinforced plastic.

32. The machine of claim 29 wherein the foam is a high-density closed cell foam.

33. The machine of claim 29 wherein the carriage includes first and second wall portions extending at an angle relative to each other wherein the first wall portion includes a first composite fiber skin and the second wall portion includes a second composite fiber skin and wherein the first and second skins overlap.

34. The machine of claim 33 wherein the first and second skins are bonded to each other where they overlap.

35. The machine of claim 34 wherein one of the first and second skins are bonded to the foam.

36. The machine of claim 29 further including an insert in the carriage bonded to the fiber reinforced plastic and a roller assembly supported by the insert.

37. The machine of claim 26 wherein the insert is formed from a material that is substantially non-reactive with a composite fiber reinforced plastic.

38. A movable machine having a motor and a drive mechanism for transmitting motion from the motor to a machine tool and a housing for part of the machine formed from a fiber reinforced plastic and a UV radiation absorbing material on the housing.

39. The movable machine of claim 38 wherein the UV radiation absorbing material is applied to the fiber reinforced plastic as a coating.

40. The movable machine of claim 39 wherein the UV radiation absorbing material is incorporated in the plastic when the fiber reinforced plastic is hardened.

41. The movable machine of claim 38 further including a saw blade and wherein the housing houses the drive mechanism.

42. The movable machine of claim 41 further including a carriage formed from a fiber reinforced plastic having a UV absorbing material.

43. A wall saw having a motor mounted on a carriage and a drive mechanism linked to the motor wherein the carriage is formed from a fiber reinforced material bonded to a foam and wherein the drive mechanism is housed in a housing having a housing portion formed from a fiber reinforced material.

44. The saw of claim 43 further including at least one insert supported by the carriage and bonded to the fiber reinforced material.

45. The saw of claim 43 wherein the carriage includes a side wall having an inwardly curving side wall portion.

46. The saw of claim 45 further including a first roller assembly at a first end portion of the side wall and a second roller assembly at a second end portion of the side wall and wherein the inwardly curving side wall portion is between the first and second end portions.

47. The saw of claim 45 further including an outwardly extending reinforcing portion adjacent the inwardly curving side wall portion.

48. The saw of claim 47 wherein the outwardly extending reinforcing portion extends in an arc.

* * * * *